(12) United States Patent
Etwaru et al.

(10) Patent No.: US 11,682,101 B2
(45) Date of Patent: Jun. 20, 2023

(54) OVERLAYING DISPLAYED DIGITAL CONTENT TRANSMITTED OVER A COMMUNICATION NETWORK VIA GRAPHICS PROCESSING CIRCUITRY USING A FRAME BUFFER

(71) Applicant: MOBEUS INDUSTRIES, INC., Sparta, NJ (US)

(72) Inventors: Dharmendra Etwaru, Sparta, NJ (US); Michael R. Sutcliff, Inlet Beach, FL (US)

(73) Assignee: MOBEUS INDUSTRIES, INC., Sparta, NJ (US)

( * ) Notice: Subject to any disclaimer, the term of this patent is extended or adjusted under 35 U.S.C. 154(b) by 0 days.

(21) Appl. No.: 17/675,819

(22) Filed: Feb. 18, 2022

(65) Prior Publication Data

US 2022/0351327 A1    Nov. 3, 2022

Related U.S. Application Data

(60) Provisional application No. 63/189,434, filed on May 17, 2021, provisional application No. 63/182,391, filed on Apr. 30, 2021.

(51) Int. Cl.
*G06T 1/60* (2006.01)
*G06T 1/20* (2006.01)
(Continued)

(52) U.S. Cl.
CPC ............... *G06T 1/60* (2013.01); *G06T 1/20* (2013.01); *H04L 65/70* (2022.05); *H04L 65/75* (2022.05)

(58) Field of Classification Search
None
See application file for complete search history.

(56) References Cited

U.S. PATENT DOCUMENTS

| 7,013,428 B1 | 3/2006 | Kamen |
| 8,813,154 B1 | 8/2014 | Sivertsen |

(Continued)

FOREIGN PATENT DOCUMENTS

TW    201031177    8/2010

OTHER PUBLICATIONS

Demuynck et al, 'Magic Cards: A New Augmented-Reality Approach', IEEE Computer Graphics and Applications, pp. 12-19. (Year: 2013).*

(Continued)

*Primary Examiner* — Patrick F Valdez
(74) *Attorney, Agent, or Firm* — Oblon, McClelland, Maier & Neustadt, L.L.P.

(57) ABSTRACT

A method that includes accessing a frame buffer of a graphics processing unit (GPU), analyzing, in the frame buffer of the GPU, a frame representing a section of a stream of displayed data that is being displayed by a first device, identifying a reference patch that includes a unique identifier associated with secondary digital content that is insertable in the displayed data, the unique identifier including encoded data that identifies the secondary digital content, retrieving the secondary digital content from the remote device via the data communication network based on the unique identifier and a device parameter of the first device, and overlaying the secondary digital content into the displayed data in accordance with the display parameters of the customized secondary digital content.

21 Claims, 39 Drawing Sheets

(51) Int. Cl.
  *H04L 65/70* (2022.01)
  *H04L 65/75* (2022.01)

(56) References Cited

U.S. PATENT DOCUMENTS

| | | |
|---|---|---|
| 9,325,809 B1 | 4/2016 | Barros et al. |
| 9,411,789 B1 | 8/2016 | Chitta |
| 9,792,895 B2 | 10/2017 | Khintsitskiy |
| 9,924,236 B2 | 3/2018 | Nguyen |
| 10,089,633 B2 | 10/2018 | Thiyagarajan |
| 10,236,006 B1 | 3/2019 | Gurijala et al. |
| 10,567,733 B2 | 2/2020 | Cole |
| 10,742,634 B1 | 8/2020 | Shahbazi et al. |
| 10,853,903 B1 | 12/2020 | Deshmukh |
| 11,064,149 B1 | 7/2021 | Paun |
| 2002/0056136 A1 | 5/2002 | Wistendahl et al. |
| 2003/0234790 A1 | 12/2003 | Hochmuth |
| 2004/0130552 A1 | 7/2004 | Duluk, Jr. et al. |
| 2005/0219241 A1 | 10/2005 | Chun |
| 2006/0242607 A1 | 10/2006 | Hudson |
| 2007/0009179 A1* | 1/2007 | Easwar ........... G06F 16/51 707/E17.031 |
| 2007/0050411 A1 | 3/2007 | Hull et al. |
| 2007/0156708 A1 | 7/2007 | Takayama |
| 2008/0066092 A1 | 3/2008 | Laude et al. |
| 2008/0137848 A1 | 6/2008 | Kocher et al. |
| 2008/0140714 A1 | 6/2008 | Rhoads et al. |
| 2008/0152016 A1 | 6/2008 | Nagahara |
| 2009/0245516 A1 | 10/2009 | Ravikiran |
| 2010/0153848 A1 | 6/2010 | Saha |
| 2011/0022599 A1 | 1/2011 | Chidlovskii et al. |
| 2011/0304646 A1* | 12/2011 | Kato ........... A63F 13/525 345/632 |
| 2012/0032977 A1* | 2/2012 | Kim ........... G06T 19/006 345/633 |
| 2012/0088543 A1 | 4/2012 | Lindner et al. |
| 2012/0095958 A1 | 4/2012 | Pereira et al. |
| 2012/0114249 A1 | 5/2012 | Conwell |
| 2012/0169928 A1 | 7/2012 | Casagrande et al. |
| 2012/0207208 A1 | 8/2012 | Wyatt |
| 2012/0272279 A1 | 10/2012 | Lim |
| 2013/0044129 A1 | 2/2013 | Latta et al. |
| 2013/0047180 A1 | 2/2013 | Moon et al. |
| 2013/0183952 A1 | 7/2013 | Davis et al. |
| 2013/0294648 A1 | 11/2013 | Rhoads et al. |
| 2014/0172429 A1 | 6/2014 | Butcher et al. |
| 2014/0201769 A1 | 7/2014 | Neumeier et al. |
| 2014/0304316 A1 | 10/2014 | Thulasiraman et al. |
| 2015/0039993 A1 | 2/2015 | Ishimaru |
| 2015/0074735 A1 | 3/2015 | Herigstad et al. |
| 2015/0097850 A1 | 4/2015 | Craik et al. |
| 2015/0112962 A1 | 4/2015 | Simhon et al. |
| 2015/0113557 A1 | 4/2015 | Kim |
| 2015/0163345 A1 | 6/2015 | Cornaby |
| 2015/0195288 A1 | 7/2015 | Hoyos et al. |
| 2015/0287220 A1 | 10/2015 | Jain et al. |
| 2015/0034141 A1 | 11/2015 | Schrempp |
| 2015/0319510 A1 | 11/2015 | Ould Dellahy, VIII et al. |
| 2015/0358525 A1 | 12/2015 | Lord |
| 2016/0109954 A1 | 4/2016 | Harris |
| 2016/0328871 A1 | 11/2016 | Chen |
| 2017/0026621 A1 | 1/2017 | Vellanki et al. |
| 2017/0052654 A1 | 2/2017 | Cervelli et al. |
| 2017/0155933 A1 | 6/2017 | Del Strother |
| 2017/0185251 A1 | 6/2017 | Jain |
| 2017/0195753 A1 | 7/2017 | Dakss |
| 2017/0255614 A1 | 9/2017 | Vukosavljevic et al. |
| 2017/0278289 A1 | 9/2017 | Marino et al. |
| 2017/0286933 A1 | 10/2017 | Medeiros, III et al. |
| 2017/0304725 A1 | 10/2017 | Perlman et al. |
| 2017/0344552 A1 | 11/2017 | Golbandi |
| 2018/0004204 A1 | 1/2018 | Rider |
| 2018/0046602 A1 | 2/2018 | Sisson |
| 2018/0096502 A1 | 4/2018 | Kansara |
| 2018/0122114 A1 | 5/2018 | Luan et al. |
| 2018/0124370 A1 | 5/2018 | Bejot |
| 2018/0143950 A1 | 5/2018 | Al-Arnaouti et al. |
| 2018/0150696 A1 | 5/2018 | Li |
| 2018/0189922 A1 | 7/2018 | Chinnadurai et al. |
| 2018/0219814 A1 | 8/2018 | Maarek |
| 2018/0307846 A1* | 10/2018 | Hertling ............ G09C 5/00 |
| 2018/0308257 A1 | 10/2018 | Boyce |
| 2018/0343481 A1 | 11/2018 | Loheide et al. |
| 2019/0065152 A1 | 2/2019 | Jaroch |
| 2019/0206113 A1 | 7/2019 | Kipp et al. |
| 2019/0207885 A1 | 7/2019 | Kozhemiak et al. |
| 2019/0213625 A1 | 7/2019 | Bhattacharjee |
| 2019/0236816 A1 | 8/2019 | Wang et al. |
| 2019/0259124 A1 | 8/2019 | Barnett |
| 2019/0295208 A1 | 9/2019 | Hoatry |
| 2019/0317763 A1 | 10/2019 | Sakamoto et al. |
| 2019/0332883 A1 | 10/2019 | Ivanovic |
| 2019/0335233 A1 | 10/2019 | Harvey |
| 2020/0110482 A1 | 4/2020 | Vu et al. |
| 2020/0162788 A1 | 5/2020 | Cremer |
| 2020/0169736 A1 | 5/2020 | Petajan |
| 2020/0184658 A1 | 6/2020 | Cui |
| 2020/0245021 A1 | 7/2020 | Kitazato |
| 2020/0257920 A1 | 8/2020 | Kumar et al. |
| 2020/0273251 A1* | 8/2020 | Palos ............. G06T 7/70 |
| 2020/0387700 A1 | 12/2020 | Wu |
| 2020/0389293 A1 | 12/2020 | Lambert et al. |
| 2020/0396521 A1 | 12/2020 | Weiner et al. |
| 2021/0004650 A1 | 1/2021 | Frank |
| 2021/0168416 A1 | 6/2021 | Weiner |
| 2021/0192302 A1 | 6/2021 | Wang |
| 2021/0200501 A1 | 7/2021 | Stankoulov |
| 2021/0344991 A1 | 11/2021 | Todd |
| 2022/0019780 A1 | 1/2022 | Ozserin et al. |
| 2022/0067415 A1 | 3/2022 | Kerofsky |
| 2022/0105193 A1 | 3/2022 | Rockel |
| 2022/0114584 A1 | 4/2022 | Conley et al. |
| 2022/0138994 A1* | 5/2022 | Viswanathan ........ G06T 11/00 345/633 |

OTHER PUBLICATIONS

Oh et al, 'CAMAR: Context-aware Mobile Augmented Reality in Smart Space', IWUVR, pp. 48-51. (Year: 2009).*

International Search Report and Written Opinion of the International Searching Authority dated Jul. 20, 2022, in PCT/US22/20263, filed Mar. 14, 2022, 9 pages.

International Search Report and Written Opinion of the International Searching Authority dated Aug. 3, 2022, in PCT/US22/20215, filed Mar. 14, 2022, 10 pages.

International Search Report and Written Opinion of the International Searching Authority dated Aug. 1, 2022, in PCT/US22/20267, filed Mar. 14, 2022, 12 pages.

International Search Report and Written Opinion of the International Searching Authority dated Jul. 7, 2022, in PCT/US22/20258, filed Mar. 14, 2022, 9 pages.

International Search Report and Written Opinion of the International Searching Authority dated Nov. 23, 2021, in PCT/US 21/46976, filed Aug. 20, 2021, 10 pages.

International Search Report and Written Opinion of the International Searching Authority dated Jun. 1, 2022, in PCT/US 22/20244, filed March 14, 2022, 12 pages.

International Search Report and Written Opinion of the International Searching Authority dated Jun. 9, 2022, in PCT/US 22/20226, filed Mar. 14, 2022, 12 pages.

International Search Report and Written Opinion of the International Searching Authority dated Jun. 9, 2022, in PCT/US 22/20234, filed Mar. 14, 2022, 8 pages.

International Search Report and Written Opinion of the International Searching Authority dated Jun. 9, 2022, in PCT/US 22/20184, filed Mar. 14, 2022, 8 pages.

International Search Report and Written Opinion of the International Searching Authority dated Jun. 3, 2022, in PCT/US2022/020254, filed Mar. 14, 2022, 13 pages.

(56) References Cited

OTHER PUBLICATIONS

International Search Report and Written Opinion of the International Searching Authority dated Jun. 7, 2022, in PCT/US2022/022840, filed Mar. 31, 2022, 8 pages.
Office Action dated Mar. 1, 2023 in Taiwanese Patent Application No. 111126583.

* cited by examiner

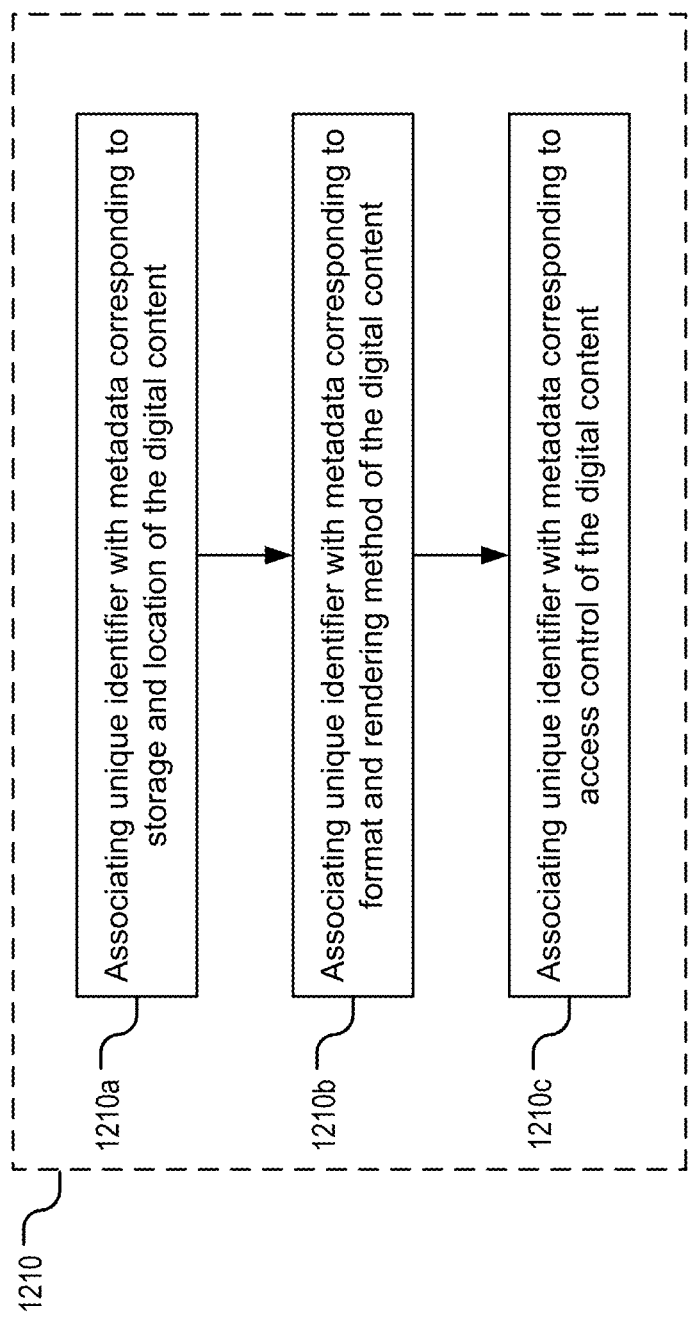

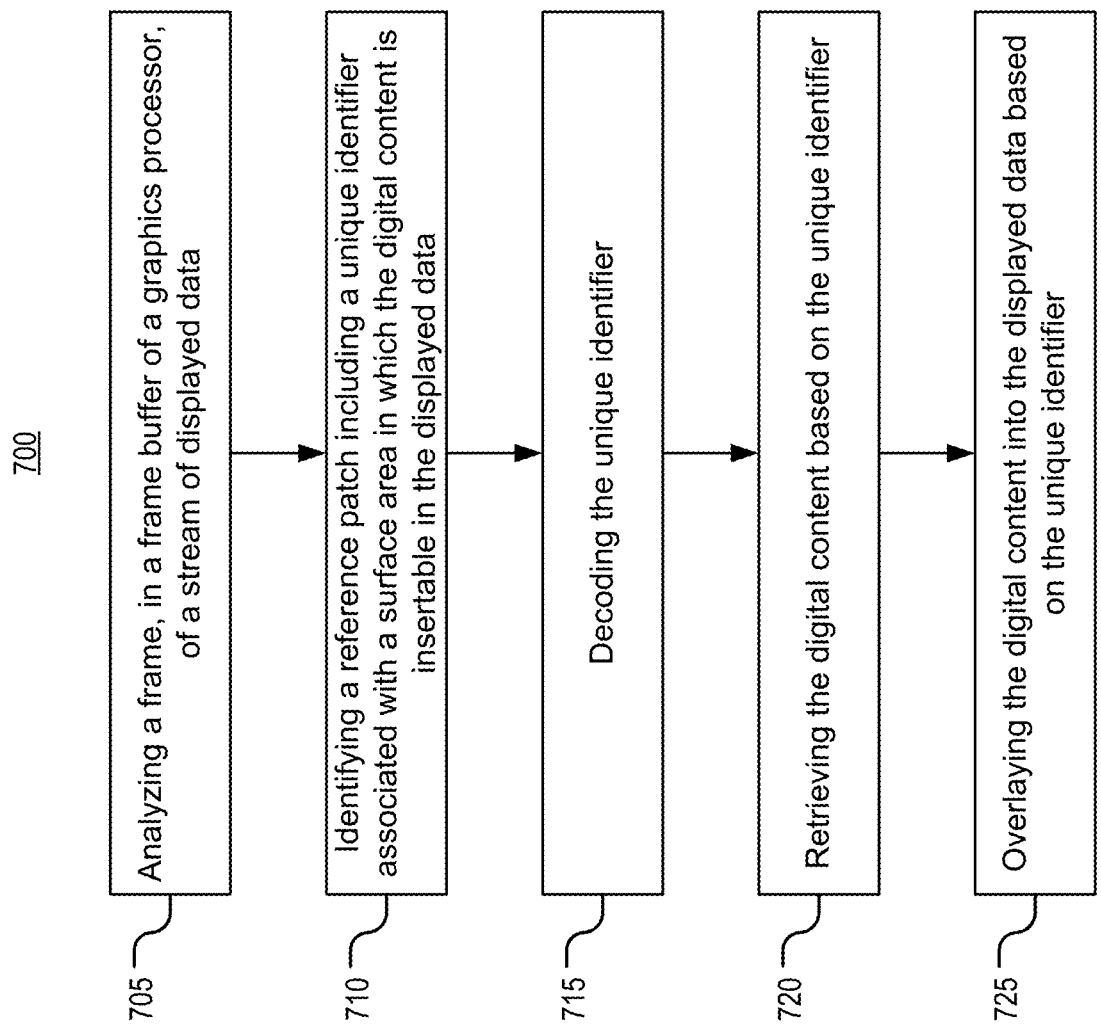

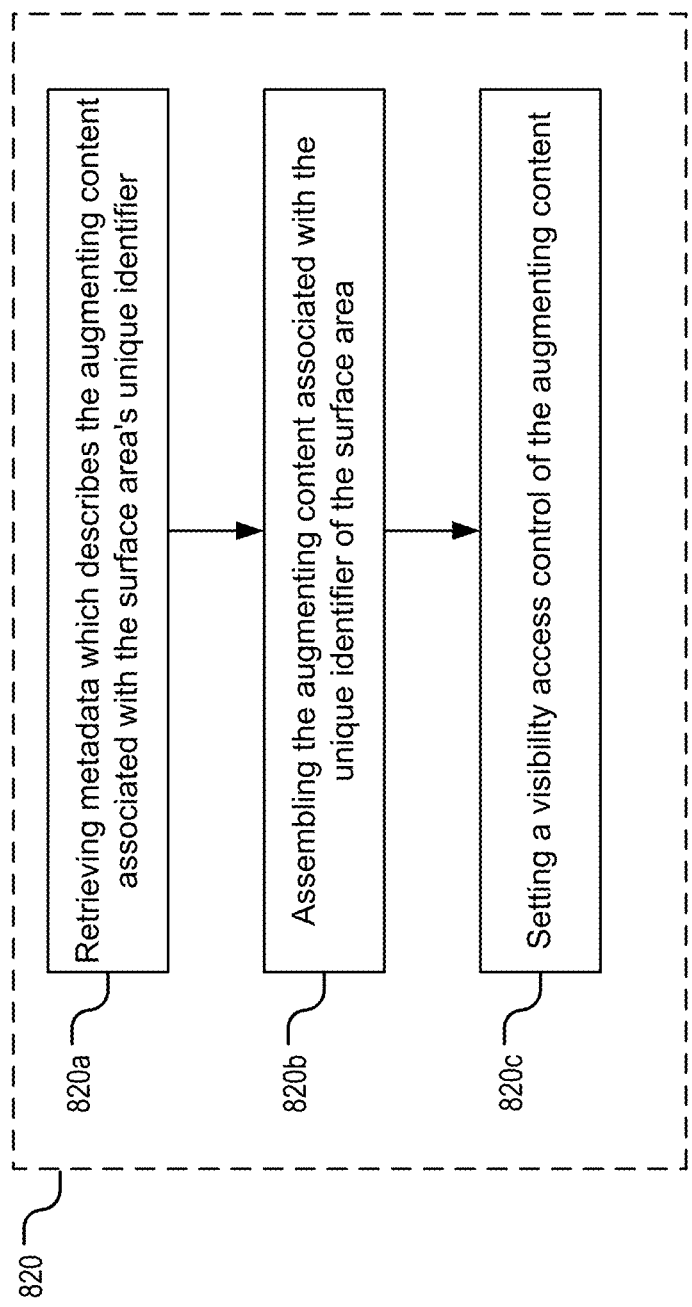

FIG. 5B

OVERLAYING DISPLAYED DIGITAL CONTENT TRANSMITTED OVER A COMMUNICATION NETWORK VIA GRAPHICS PROCESSING CIRCUITRY USING A FRAME BUFFER

CROSS-REFERENCE TO RELATED APPLICATIONS

The present application claims priority to U.S. Provisional Application No. 63/189,434, filed May 17, 2021, and U.S. Provisional Application No. 63/182,391, filed Apr. 30, 2021, the entire content of each of which is incorporated by reference herein in its entirety for all purposes.

BACKGROUND

Field of the Disclosure

The present disclosure relates to overlaying digital content into displayed data via graphics processing circuitry.

Description of the Related Art

Displayed data has traditionally been presented within the bounds of a two-dimensional geometric screen. The visual experience of such displayed data is thus lacking in dynamism that allows for the layering of functionality within a given display frame.

The foregoing "Background" description is for the purpose of generally presenting the context of the disclosure. Work of the inventors, to the extent it is described in this background section, as well as aspects of the description which may not otherwise qualify as prior art at the time of filing, are neither expressly or impliedly admitted as prior art against the present disclosure.

SUMMARY

According to an embodiment, the present disclosure relates to a device communicating with a remote device over a data communication network, the device including: processing circuitry, including a graphics processing unit (GPU), configured to access a frame buffer of the GPU, analyze, in the frame buffer of the GPU, a frame representing a section of a stream of displayed data that is being displayed by the device, based on the analyzed frame, identify a reference patch that includes a unique identifier associated with secondary digital content that is insertable in the displayed data that is being displayed by the device, the unique identifier including encoded data that identifies the secondary digital content, a location address of the secondary digital content at the remote device, and display parameters of the secondary digital content when inserted in the displayed data; retrieve the secondary digital content from the remote device via the data communication network based on the unique identifier and a device parameter of the device, the secondary digital content being customized to the device based on the unique identifier and the device parameter of the device, the device parameter of the device being different from a device parameter of another device that also receives a reference patch; and after retrieving the secondary digital content from the remote device, overlay the secondary digital content into the displayed data in accordance with display parameters of the customized secondary digital content.

According to an embodiment, the present disclosure relates to a method of communicating with a remote device over a data communication network, including: accessing a frame buffer of a graphics processing unit (GPU); analyzing, in the frame buffer of the GPU, a frame representing a section of a stream of displayed data that is being displayed by a first device; based on the analyzed frame, identifying a reference patch that includes a unique identifier associated with secondary digital content that is insertable in the displayed data that is being displayed by the first device, the unique identifier including encoded data that identifies the secondary digital content, a location address of the secondary digital content at the remote device, and display parameters of the secondary digital content when inserted in the displayed data; retrieving the secondary digital content from the remote device via the data communication network based on the unique identifier and a device parameter of the first device, the secondary digital content being customized to the first device based on the unique identifier and the device parameter of the first device, the device parameter of the first device being different from a device parameter of a second device that also receives a reference patch; and after retrieving the secondary digital content from the remote device, overlaying the secondary digital content into the displayed data in accordance with the display parameters of the customized secondary digital content.

According to an embodiment, the present disclosure relates to a non-transitory computer-readable storage medium for storing computer-readable instructions that, when executed by a computer, cause the computer to perform a method, the method including: accessing a frame buffer of a graphics processing unit (GPU); analyzing, in the frame buffer of the GPU, a frame representing a section of a stream of displayed data that is being displayed by a first device; based on the analyzed frame, identifying a reference patch that includes a unique identifier associated with secondary digital content that is insertable in the displayed data that is being displayed by the first device, the unique identifier including encoded data that identifies the secondary digital content, a location address of the secondary digital content at a remote device, and display parameters of the secondary digital content when inserted in the displayed data; retrieving the secondary digital content from the remote device via a data communication network based on the unique identifier and a device parameter of the first device, the secondary digital content being customized to the first device based on the unique identifier and the device parameter of the first device, the device parameter of the first device being different from a device parameter of a second device that also receives a reference patch; and after retrieving the secondary digital content from the remote device, overlaying the secondary digital content into the displayed data in accordance with the display parameters of the customized secondary digital content.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein:

FIG. 2C is a flow chart of a sub-method of associating the surface area with secondary digital content, according to an exemplary embodiment of the present disclosure;

FIG. 3A is a flow chart of a method of inspecting the reference patch, according to an exemplary embodiment of the present disclosure;

FIG. 4C is a flow chart of a sub-method of associating the unique identifiers with digital content, according to an exemplary embodiment of the present disclosure;

FIG. 5B is an illustration of a reference patch within a frame of a display, according to an exemplary embodiment of the present disclosure;

DETAILED DESCRIPTION

Figure 1:
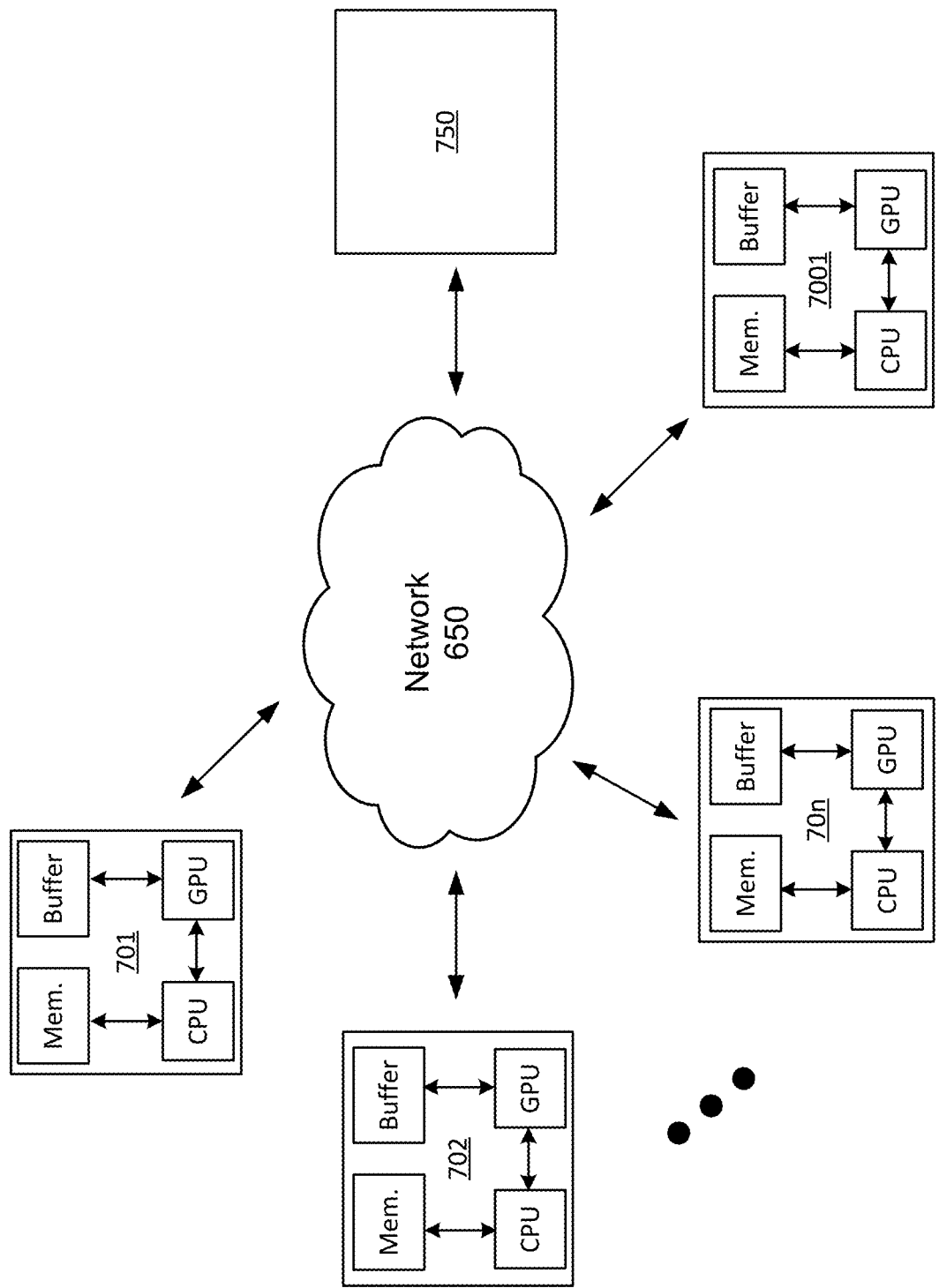
FIG. 1 is a schematic view of user devices communicatively connected to a server, according to an exemplary embodiment of the present disclosure.

The terms "a" or "an", as used herein, are defined as one or more than one. The term "plurality", as used herein, is defined as two or more than two. The term "another", as used herein, is defined as at least a second or more. The terms "including" and/or "having", as used herein, are defined as comprising (i.e., open language). Reference throughout this document to "one embodiment", "certain embodiments", "an embodiment", "an implementation", "an example" or similar terms means that a particular feature, structure, or characteristic described in connection with the embodiment is included in at least one embodiment of the present disclosure. Thus, the appearances of such phrases or in various places throughout this specification are not necessarily all referring to the same embodiment. Furthermore, the particular features, structures, or characteristics may be combined in any suitable manner in one or more embodiments without limitation.

According to an embodiment, the present disclosure relates to augmentation of a digital user experience. The augmentation may include an overlaying of digital objects onto a viewable display area of a display. The display may be a display of a mobile device such as a smartphone, tablet, and the like, a display of a desktop computer, or another interactive display. The digital objects can include text, symbols images, videos, and other graphical elements, among others. The digital objects can be interactive. The digital objects can be associated with third-party software vendors.

In order to realize the augmentation of a digital user experience, a reference patch can be used. In one embodiment, the reference patch or other visually detectable element may serve to indicate a position at which digital content is to be placed onto a display. In some embodiments and as described herein, the reference patch can include encoded information that can be used to retrieve digital content and place that digital content into a desired location or locations in displayed data. The digital content can include at least one digital object. The reference patch can be embedded within displayed data (such as, but not limited to, an image, a video, a document, a webpage, or any other application that may be displayed by an electronic device). The reference patch can include unique identifying data in the form of a unique identifier, a marker, or encoding corresponding to predetermined digital content. The reference patch can indicate to the electronic device the particular digital content that is to be displayed, the position at which the digital content is to be placed, and the size with which the digital content is to be displayed. Accordingly, when a portion of displayed data comprising the reference patch is visible, the corresponding augmentation can be overlaid on the current frame of the displayed data wherein the augmentation includes secondary digital content (i.e., content that is secondary to (or comes after) the primary displayed data), herein referred to as "digital content," and/or digital objects. For example, an augmentation can include additional images to be displayed with the current frame of displayed data for a seamless visual experience.

In an embodiment, a window containing a portion of the displayed data (e.g., word processing document) to be augmented can provide a region, or a surface area, for augmentation resulting from an identified reference patch within the displayed data. The window may thereby function as an anchor for the digital content, indicating where digital content can be relatively arranged. In an embodiment, digital content can be realized within a viewable area of a device software application or may reside within an entire viewable display area of the display. For instance, if a user is viewing a portable document format (PDF) document, a reference patch corresponding to given digital content may be within a viewable area of the PDF document and the digital content can be generated in a corresponding window through which the PDF document is being viewed. Additionally or alternatively, the digital content can be generated within the entire viewable display area of the display and may not reside only within the corresponding window through which the PDF document is being viewed.

The above-described augmentations are particularly relevant to environments where the underlying content is static. Static content may include textual documents or slide decks. Often, the static content is stored locally in the electronic device. Due to its nature, the static content is not capable of being dynamically adjusted according to complex user interactions, in real-time, during a user experience. Such a digital user experience is cumbersome and inefficient. Thus, a heightened, augmented user experience is desired to provide increased convenience, engagement, and agility. The augmentations described herein reduce cumbrousness by providing a visual representation/aid of retrieved external digital content, and provide improved engagement of the user, agility of navigation through the displayed data, and overall performance of the user device.

Described herein is a device and method to incorporate a reference patch with encoded identifier attributes, where the reference patch serves as a conduit for delivering content into the displayed data.

FIG. 1 is a schematic view of an electronic device, such as a client/user device (a first device 701) communicatively connected, via a network 650, to a second electronic device, such as a server (a networked device 750), and a generating device 7001, according to an embodiment of the present disclosure. Further, in an embodiment, additional client/user devices can be communicatively connected to both the first device 701 and the networked device 750. A second client/user device 702 can be communicatively connected to the first device 701 and the networked device 750. As shown, a plurality of the client/user devices can be communicatively connected to, for example, an nth user device 70n. The devices can be connected via a wired or a wireless network. In one embodiment, the first device 701 can be responsible for transmitting displayed data over the communication network 650 to the second client/user device 702 and/or the nth user device 70n.

An application may be installed or accessible on the first device 701 for executing the methods described herein. The application may also be integrated into the operating system (OS) of the first device 701. The first device 701 can be any electronic device such as, but not limited to, a personal computer, a tablet pc, a smart-phone, a smart-watch, an integrated AR/VR (Augmented Reality/Virtual Reality) headwear with the necessary computing and computer vision components installed (e.g., a central processing unit (CPU), a graphics processing unit (GPU), integrated graphics on the CPU, etc.), a smart-television, an interactive screen, a smart projector or a projected platform, an IoT (Internet of things) device or the like.

Figure 10:
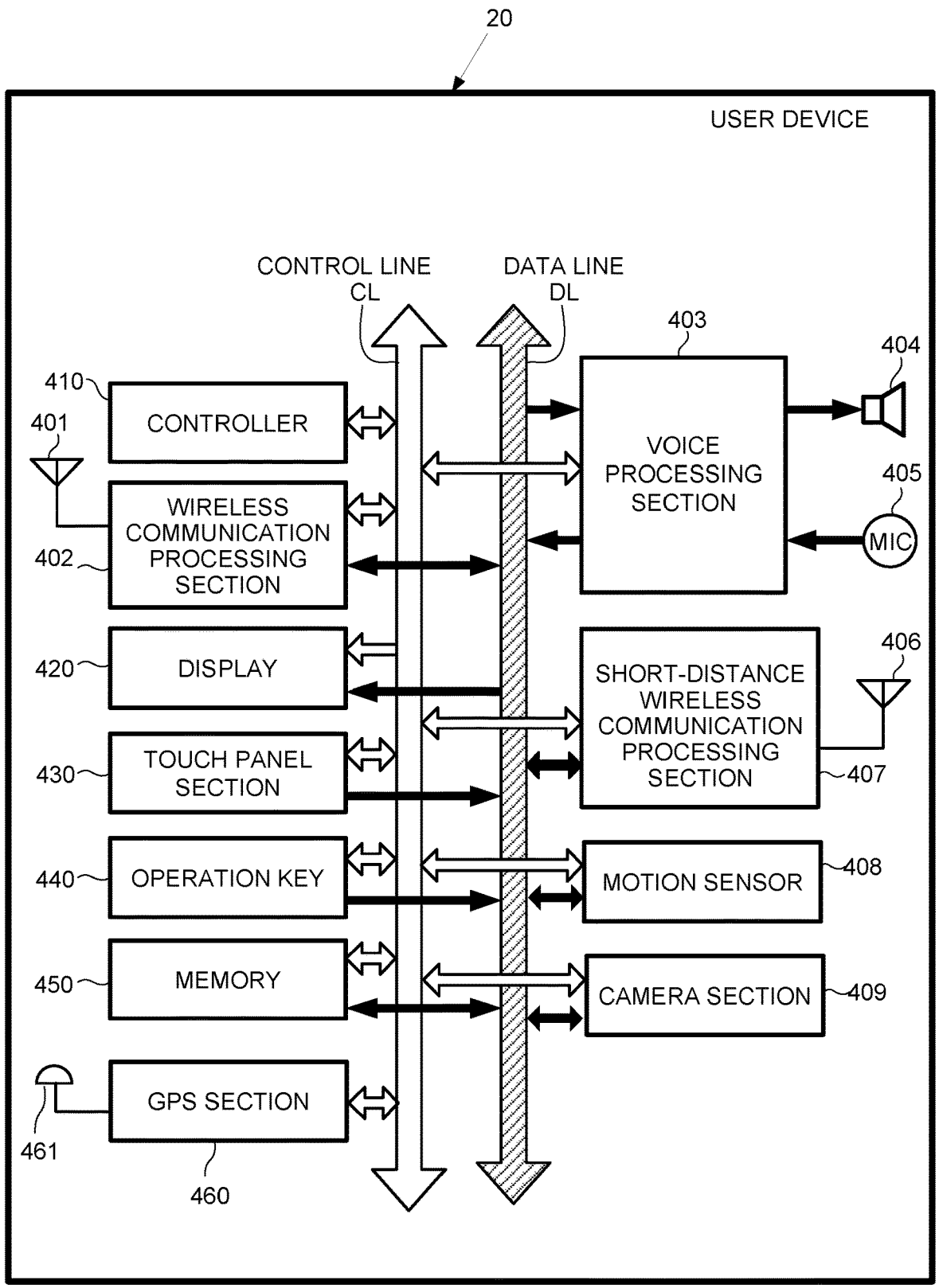
FIG. 10 is a schematic of a user device for performing a method, according to an exemplary embodiment of the present disclosure.
Figure 11:
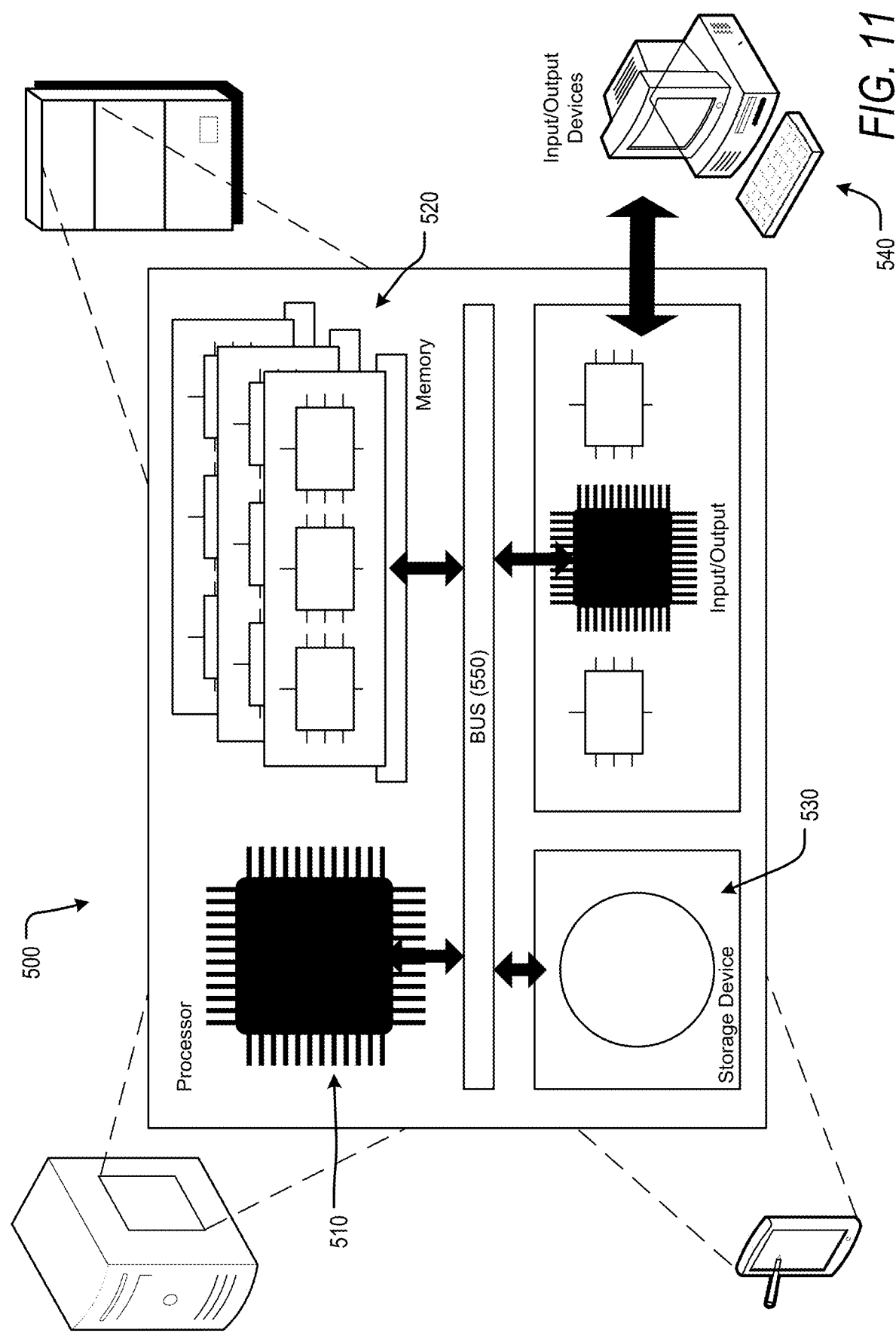
FIG. 11 is a schematic of a hardware system for performing a method, according to an exemplary embodiment of the present disclosure.
Figure 12:
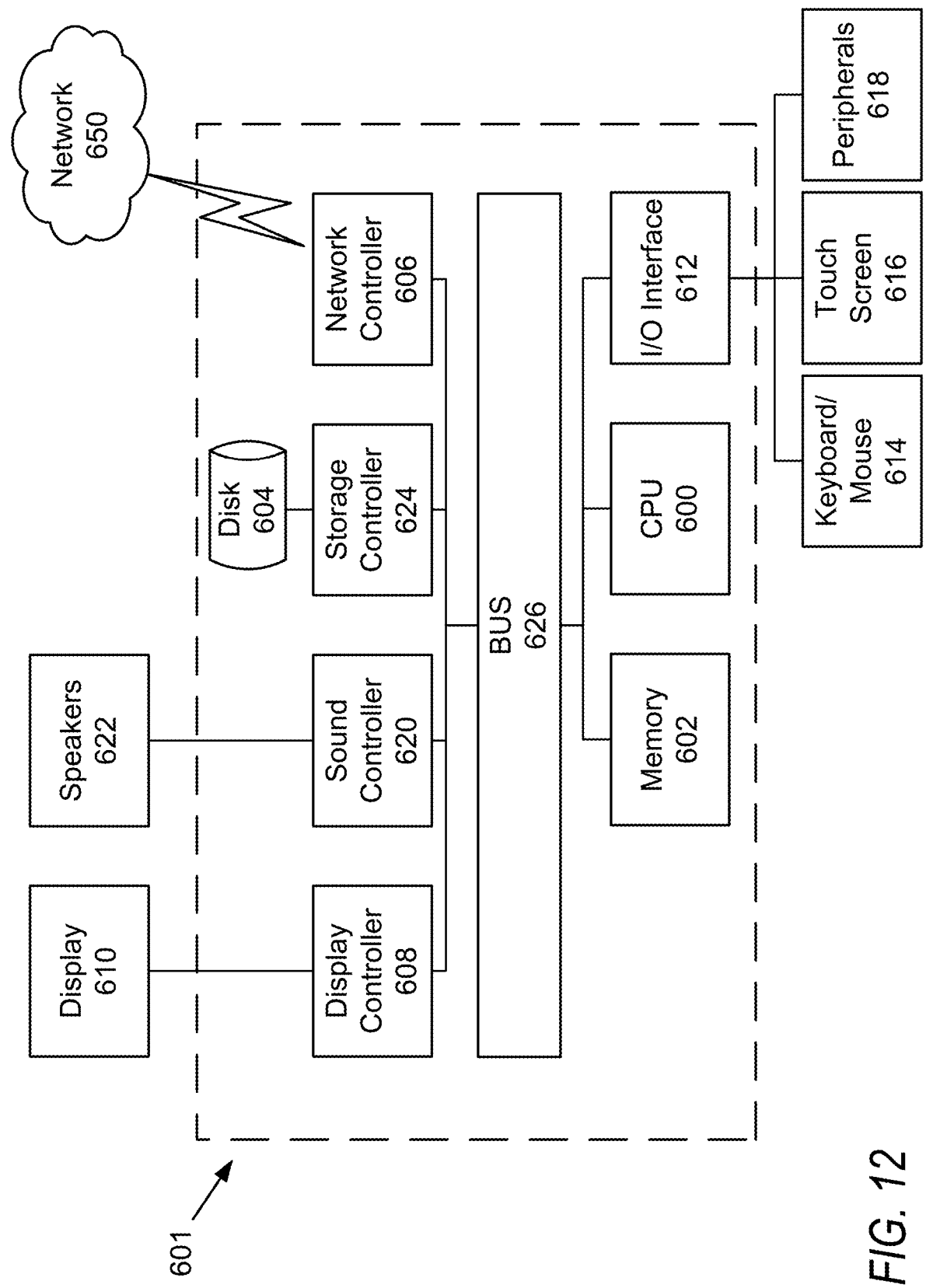
FIG. 12 is a schematic of a hardware configuration of a device for performing a method, according to an exemplary embodiment of the present disclosure.

As illustrated in FIG. 1, the first device 701 includes a CPU, a GPU, a main memory, and a frame buffer, among other components (discussed in more detail in FIGS. 10-12). In an embodiment, the first device 701 can call graphics that are displayed on a display. The graphics of the first device 701 can be processed by the GPU and rendered in frames stored on the frame buffer that is coupled to the display. In an embodiment, the first device 701 can run software applications or programs that are displayed on a display. In order for the software applications to be executed by the CPU, they can be loaded into the main memory, which can be faster than a secondary storage, such as a hard disk drive or a solid state drive, in terms of access time. The main memory can be, for example, random access memory (RAM) and is physical memory that is the primary internal memory for the first device 701. The CPU can have an associated CPU memory and the GPU can have an associated video or GPU memory. The frame buffer can be an allocated area of the video memory. It can be understood that the CPU may have multiple cores or may itself be one of multiple processing cores in the first device 701. The CPU can execute commands in a CPU programming language such as C++. The GPU can execute commands in a GPU programming language such as HLSL. The GPU may also include multiple cores that are specialized for graphic processing tasks. Although the above description was discussed with respect to the first device 701, it is to be understood that the same description applies to the other devices (702, 70n, and 7001) of FIG. 1. Although not illustrated in FIG. 1, the networked device 750 can also include a CPU, GPU, main memory, and frame buffer.

Figure 2A:
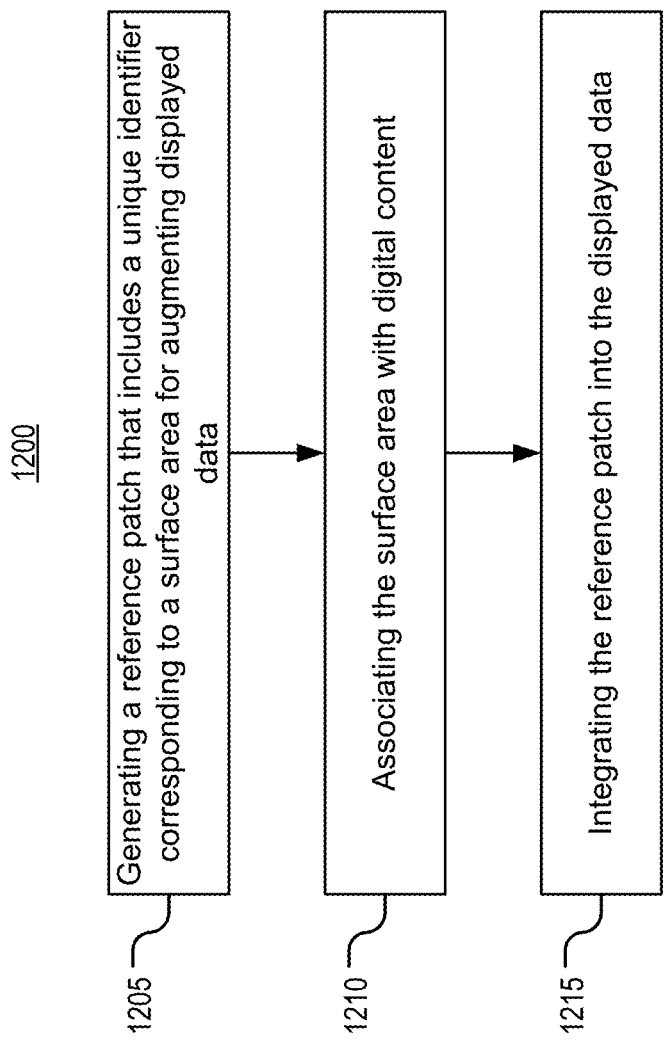
FIG. 2A is a flow chart of a method of generating a reference patch and embedding the reference patch into displayed data, according to an exemplary embodiment of the present disclosure.

FIG. 2A is a flow chart for a method 1200 for generating a reference patch and embedding the reference patch into displayed data according to one embodiment of the present disclosure. The present disclosure describes generation of the reference patch and embedding of this patch into the displayed data content in order to integrate additional content. In an embodiment, the first device 701 can incorporate (secondary) digital content into what is already being displayed (displayed data) for a more immersive experience.

In this regard, the first device 701 can generate the reference patch in step 1205. The reference patch can be an object having an area and shape that is embedded in the displayed data at a predetermined location. For example, the reference patch can be a square overlayed and disposed in a corner of a digital document (an example of displayed data), wherein the reference patch can be fixed to a predetermined page for a multi-page (or multi-slide) digital document. The reference patch can thus also represent a surface area in the digital document. The reference patch can be an object that, when not in a field of view of the user, is inactive. The reference patch can, upon entering the field of view of the user, become active. For example, the reference patch can become active when detected by the first device 701 in the displayed data. When active, the reference patch can enable the first device 701 to retrieve digital content and augment the displayed data by incorporating the retrieved digital content into the displayed data. Alternatively, the reference patch can become active when located within the frame of the screen outputting the displayed data. For example, even if another window or popup is placed over top of the reference patch, the reference patch may continue to be active so long as the reference patch remains in the same location after detection and the window including the document incorporating the reference patch is not minimized or closed. As will be described further below, the reference patch can have a predetermined design that can be read by the first device 701, leading to the retrieval and displaying of the digital content.

In an embodiment, the first device 701 can use a geometrical shape for the reference patch and place the reference patch into displayed data using applications executed in the first device 701. The reference patch can take any shape such as a circle, square, rectangle or any arbitrary shape. In step 1210, the reference patch can also have predetermined areas within its shape for including predetermined data. The predetermined data can be, for example, unique identifiers that correspond to a surface area of the displayed data. In one embodiment, the unique identifier can include encoded data that identifies the digital content, a location address of the digital content (e.g., at the networked device 750), a screen position within the surface area at which the digital content is insertable in the displayed data, and a size of the digital content when inserted in the displayed data (adjustable before being displayed). In one embodiment, the unique identifier can include a marker. As will be described below, the marker can take the form of patterns, shapes, pixel arrangements, pixel luma, and pixel chroma, among others. Digital content can be displayed at the surface areas, or locations in the displayed data, corresponding to the unique identifier. In one embodiment, the surface areas are reference points for the relative location of digital content. In one embodiment, surface area refers to empty space wherein additional digital content can be inserted without obscuring displayed data. In one embodiment, the designation of empty space prioritizes preserving visibility of the reference patch.

For example, the first device 701 can use computer vision (described below) to detect displayed data. For example, the first device 701 can inspect an array to determine locations of objects in the displayed data. For example, a slide in a slide deck can include text, pictures, logos, and other media, and the surface area is the blank space or spaces around the aforementioned objects. Thus, the digital content can be displayed somewhere in the blank spaces. In an embodiment, the surface area of the displayed data can include portions of the displayed data that already include objects and the digital content can be displayed at the same location as the objects. For example, a slide in a slide deck can include a picture of a user, and the reference patch can be the area representing a face of the user and the additional digital content can be displayed at the same location as a body of the user. In another example, a slide in a slide deck can include an image of a vehicle wherein the image of the vehicle is the surface area for the digital content. The reference patch can be disposed in a blank space of the displayed data, and digital content retrieved (e.g., images of a new car paint color and new rims) as a result of the reference patch is displayed over the image of the vehicle to modify the appearance of the vehicle. In other words, the digital content may be placed in a blank area of the displayed data and/or in an area that is not blank (i.e., an area that includes text, image(s), video(s), etc.).

In step 1215, the first device 701 can embed the reference patch into the displayed data, such as a word processing document file (i.e., DOC/DOCX) provided by e.g., Microsoft® Word, in a Portable Document Format (PDF) file such as the ones used by Adobe Acrobat®, in a Microsoft® PowerPoint presentation (PPT/PPTX), or in a video sequence file such as MPEG, MOV, AVI or the like. These file formats are illustrative of some file types which a user may be familiar with; however, applications included in the first device 701 are not limited to these types and other applications and their associated file types are possible.

The reference patch (or similar element) can be embedded into any displayed data, where the displayed data may be generated by an application running on or being executed by the first device 701. The reference patch can encompass the whole area designated by the displayed data, or just a portion of the area designated by the displayed data. The method of generating the reference patch and embedding the reference patch into the displayed data has been described as being performed by the first device 701, however, the networked device 750 can instead perform the same functions. In order to be detected in the displayed data on the first device 701, the reference patch may only be simply displayed as an image on the screen. The reference patch may also simply be a raster image or in the background of an image. The reference patch is also able to be read even when the image containing the reference patch is low resolution. The reference patch can be encoded in a hardy and enduring manner such that even if a portion of the reference patch is corrupted or undecipherable, the reference patch can still be activated and used.

In an embodiment, the reference patch can be embedded inside of a body of an email correspondence. The user can use any electronic mail application such as Microsoft Outlook®, Gmail®, Yahoo®, etcetera. As the application is running on the first device 701, it allows the user to interact with other applications. In an embodiment, the reference patch can be embedded on a video streaming or two-way communication interface such as a Skype® video call or a Zoom® video call, among others. In an embodiment, the reference patch can be embedded in displayed data for multi-party communication on a live streaming interface such as Twitch®.

One way in which the first device 701 can embed the reference patch into the displayed data is by arranging the generated reference patch in the displayed data such as in a desired document or other media. The reference patch can include a facade of the digital content which becomes an integrated part of the displayed data. The facade can act as a visual preview to inform the user of the digital content linked to the reference patch. The facade can include, for example, a screenshot of a video to be played, a logo, an animation, or an image thumbnail, among others. In one embodiment, the facade can be an altered version of the digital content. For example, the facade is a more transparent version of the digital content. The facade can be a design overlay. The design overlay can be a picture that represents the digital content superimposed over the reference patch. In an embodiment, the facade can indicate the content that is represented by the reference patch. The facade can be contained within the shape of the reference patch or have a dynamic size. For example, attention of the user can be brought to the facade by adjusting the size of the facade when the reference patch is displayed. The adjustment of the size of the facade can also be dynamic, wherein the facade can enlarge and shrink multiple times. By the same token, a position and/or a rotation of the facade can also be adjusted to produce a shaking or spinning effect, for instance.

Unlike traditional means of sending displayed data, in one embodiment the first device 701 may not send the whole digital content with a header file (metadata) and a payload (data). Instead, the reference patch that may include a facade of the underlying digital content is placed within the displayed data. If a facade is present, it indicates to the first device 701 that the surface area can have digital content that can be accessed with selection (clicking with a mouse, touchpad, eye contact, eye blinks, or via voice command) of the facade. The digital content can also be accessed or activated automatically, e.g., when the reference patch is displayed on the display of the first device 701. Other means of visualization can be employed to indicate to the user that the surface area is likely to include information for obtaining digital content. For example, a highlighting effect can be applied along a perimeter of the reference patch with varying intensity to bring attention to the presence of the reference patch. As another example, dashed lines perpendicular to the perimeter of the reference patch can appear and disappear to provide a flashing effect. Other means can be employed to indicate to the user that the surface area is likely to include information for obtaining digital content, such as an audio cue.

Figure 2B:
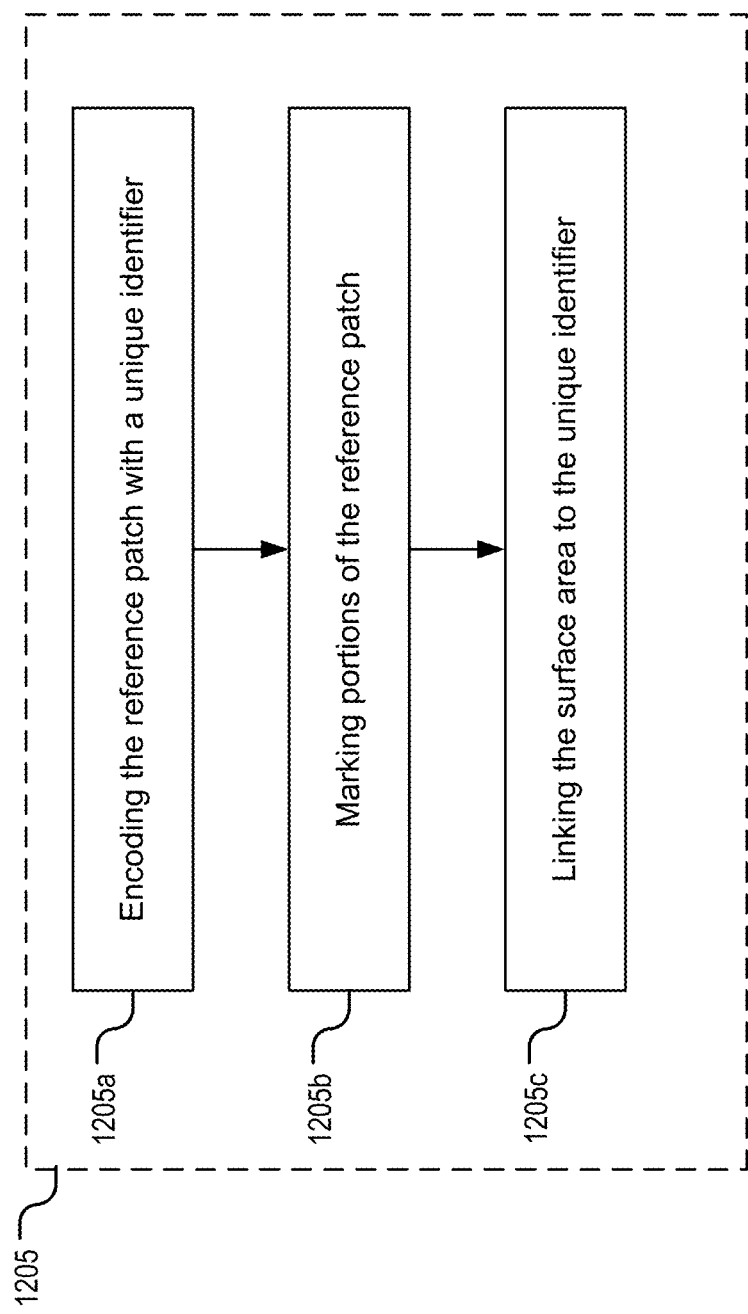
FIG. 2B is a flow chart of a sub-method of generating the reference patch, according to an exemplary embodiment of the present disclosure.

The first device 701 employs further processes before embedding the reference patch into the displayed data. These processes and schemas are further discussed in FIG. 2B. FIG. 2B is a flow chart of a sub-method 1205 of generating the reference patch, according to an embodiment of the present disclosure. The first device 701 can associate the digital content with the surface area corresponding to the reference patch (e.g., via the unique identifiers included therein) generated by the first device 701. In an embodiment, the surface area may encompass the whole of the displayed data or a portion of it. The reference patch, which includes the unique identifiers corresponding to the surface area associated with the digital content, is then embedded into the displayed data by the first device 701. In some use cases, the displayed data including the reference patch can be sent or transmitted to the second client/user device 702 including the same application, which then allows the second client/user device 702 to access information within the surface area and obtain the digital content for display. That is, the second client/user device 702 can overlay the augmenting digital content on the displayed data on the display of the second client/user device 702 in the location or locations (surface areas) defined by the reference patch.

In FIG. 2B, the generating device 7001 uses additional processes to generate the reference patch, which is obtained and embedded by the first device 701. In an embodiment, the generating device 7001 encodes the reference patch with the unique identifiers corresponding to the surface area in step 1205*a*. The generating device 7001 can mark areas of the reference patch in step 1205*b* to form a marker. The marker can take the form of patterns, shapes, pixel arrangements, or the like. In an example, the marker can have a shape that corresponds to the shape of the surface area. In an example, the marker can have a size that corresponds to the size of the surface area. In an example, the marker can have a perimeter that corresponds to the perimeter of the surface area. The marker can use any feasible schema to provide identifying information that corresponds to the surface area within the displayed data. In an embodiment, the marker can incorporate hidden watermarks that are only detectable by the first device 701, which has detection functionality implemented therein, for example having an application installed or the functionality built into the operating system. The generating device 7001 can further link the surface area with unique identifiers in step 1205*c*. A unique identifier can be used to define or reference a surface area on the display. In one embodiment, the unique identifiers are used to set the content, position, sizing, and/or other visual properties of augmenting digital content. The unique identifiers can be hashed values (such as those described above) that are generated by the generating device 7001 when the reference patch is generated (such as the one having the area of the reference patch divided into the subset of squares).

The marker can incorporate patterns which can then be extracted by the first device 701. In an example, the first device 701 can perform the embedding, then send the displayed data having the embedded reference patch to the second client/user device 702. The encoding can be performed by the generating device 7001 and may use any variety of encoding technologies, such as those used to generate ArUco markers, to encode the reference patch by marking the reference patch with the marker. The first device 701 may also be used as the generating device 7001. In one embodiment, the networked device 750, the second client/user device 702, and/or the nth client/user device 70*n* can obtain, embed, and/or detect the reference patch from the generating device 7001.

In an embodiment, the marker can be comprised of a set of points. In one embodiment, the set of points can be equidistant from each other and/or make up equal angles when measured from a reference point, such as the center of the reference patch. That is, the fiducial points corresponding to the marker can provide a set of fixed coordinates or landmarks within the displayed data with which the surface area can be mapped. In an embodiment, the marker can be comprised of a set of unique shapes, wherein combinations of the unique shapes can correspond to a target surface area (or available area, or areas) for displaying the displayed data. The combinations of the unique shapes can also correspond to digital content for displaying in the surface area. The combinations of the unique shapes can also correspond to/indicate a position/location where the digital content should be displayed at the surface area relative to a portion of the surface area and/or the displayed data. A combination of the set of points and unique identifiers can be used as well. In one embodiment, pixel coordinates of the reference patch can be determined, and the objects can be displayed relative to the pixel coordinates of the reference patch.

For example, the unique identifiers can be unique shapes that correlate to digital content as well as indicating where the digital content should be overlayed on the display (the screen position). In one embodiment, the position of the digital content is determined relative to a set of points marked on the reference patch. The unique identifiers can also indicate a size of the digital content to be overlayed on the display, which can be adjustable based on the size of the surface area (also adjustable) and/or the size of the display of the first device 701. The unique identifiers can be relatively invisible or undetectable to the user, but readable by the first device 701 and cover predetermined areas of the reference patch. The unique identifiers, and by extension, the marker, can have an appearance that is different from an appearance of the area of the reference patch. In one embodiment, the unique identifiers use metamers or other visual effects such that the difference between the unique identifiers and the reference patch is only fully discernible by an electronic device. For example, the area of the reference patch can appear white to the user and the unique identifiers can also appear white to the user but may actually have a slightly darker pixel color that can be detected and interpreted by a device, such as the first device 701. In another example, the appearance of the unique identifiers can be 0.75% darker than the white color of the area of the reference patch. Such a small difference can be identified and discerned by the first device 701 while being substantially imperceptible to the user.

In an embodiment, the area of the reference patch can be divided into sections, for instance a set of squares, wherein a marker is included within each square. An example of a marker includes a letter. For example, a reference patch is divided into 16 squares, wherein each square is designated to represent different information, e.g., a timestamp, a domain, a version. Thus, the marker in each square is interpreted according to the designation of that square. An identification based on the set of squares can be, for example, an 18-character (or "letter") hexadecimal. The set of squares can further include additional subsets for a randomization factor, which can be used for calculating a sha256 hash prior to encoding the reference patch with the hash. Together, the set of squares having the marker included therein can comprise the unique identifiers.

Moreover, the generating device 7001 can also employ chroma subsampling to mark the reference patch with attributes represented by a particular pattern. In an embodiment, the generating device 7001 can mark parts of the reference patch with predetermined patterns of pixel luma and chroma manipulation that represent a shape, a size, or a position of the surface area for displaying the digital content. In one embodiment, the generating device 7001 can mark a perimeter of the reference patch with a predetermined edging pattern of pixel luma and chroma manipulation that represents a perimeter of the surface area for displaying the digital content.

FIG. 2C is a flow chart of a sub-method of associating the surface area with digital content, according to an embodiment of the present disclosure. In FIG. 2C, the generating device 7001 uses additional processes to associate the surface area with digital content. In an embodiment, the generating device 7001 can associate the unique identifiers corresponding to the surface area with metadata. In step 1210*a*, the unique identifiers can be associated with metadata embodying information about the storage and location of the digital content. In step 1210*b*, the generating device 7001 can associate the unique identifier of the surface area with metadata which embodies information about the format and rendering information used for the digital content. In step 1210*c*, the generating device 7001 can associate the unique identifiers of the surface area with metadata which embodies access control information to the digital content.

In an embodiment, the storage of the digital content can be on a remote server, such as the networked device 750, and the location of the digital content can be the location address of the memory upon which it is stored at the remote server. The storage and location of the digital content can thus be linked with the metadata and/or the unique identifier wherein the metadata and/or the unique identifier point to how a device can obtain the digital content. The digital content is thus not directly embedded into the displayed data. In an embodiment, the format and rendering information about the digital content can be embodied in the metadata and associated with the unique identifiers. This information is helpful when the first device 701 or the second client/user device 702 are on the receiving end of the transmitted displayed data and need to properly retrieve and process the digital content.

Moreover, in an embodiment, the access control of the digital content can also be encompassed in the metadata and associated with the unique identifiers corresponding to the surface area. The access control can be information defining whether the digital content can be accessed by certain devices or users. In one embodiment, the access control is restricted by geographical location, time, date, device type, display type, software version, and/or operating system version. For example, a user may wish to restrict access to the digital content to certain types of devices, such as smartphone or tablets. Thus, the metadata defining a display requirement would encompass such an access control parameter. In one embodiment, the access control further includes how long a device can access the digital content, sharing settings, and/or password protection of the digital content.

Figure 2D:
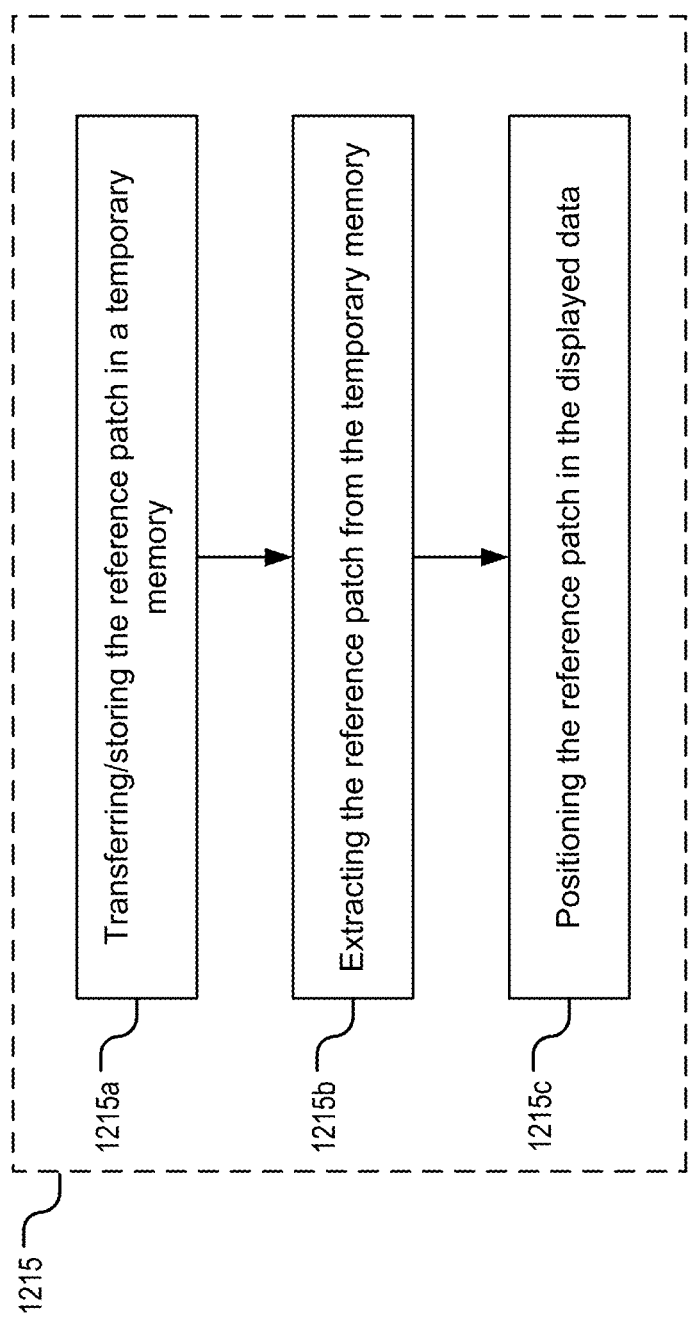
FIG. 2D is a flow chart of a sub-method of integrating the reference patch into the displayed data, according to an exemplary embodiment of the present disclosure.

FIG. 2D is a flow chart of a sub-method for integrating the reference patch into the displayed data, according to an embodiment of the present disclosure. In an embodiment, the generating device 7001 can temporarily transfer to or store the reference patch in a storage of the first device 701 in step 1215*a*. The storage can be accessed by the first device 701 for embedding the reference patch into the displayed data at any time. The first device 701 can extract the reference patch from the storage for embedding purposes in step 1215*b*. The first device 701 can also arrange the reference patch at a predetermined location and with a predetermined reference patch size in step 1215*c*. The first device 701 can further embed the reference patch such that a document, for example, having the reference patch embedded therein can be sent to a recipient, for example the second client/user device 702, where the second client/user device 702 can access the document using an application. Note that the features of the generating device 7001 can be performed by the first device 701.

The displayed data can be output from a streaming application or a communication application with a data stream having the reference patch embedded therein. The actual digital content may not be sent along with the underlying displayed data or data stream, but only the reference patch, the unique identifier, and/or a facade of the digital content is sent. In one embodiment, the unique identifier and/or the metadata can be stored in a database such as MySQL which can point to the networked device 750 or a cloud-based file hosting platform that houses the digital content. No limitation is to be taken with the order of the operation discussed herein; such that the sub-methods performed by the first device 701 can be carried out synchronous to one another, asynchronous, dependently or independently of one another, or in any combination. These stages can also be carried out in series or in parallel fashion.

There can be a plurality of ways to identify a reference patch within a frame of displayed data. In one embodiment, the displayed data can be stored in a frame buffer. A frame buffer is a segment of memory that stores pixel data as a bitmap, or an array of bits. Each pixel in the display is defined by a color value. The color value is stored in bits. In one embodiment, the frame buffer can include a color lookup table, wherein each pixel color value is an index that references a color on the lookup table. A frame buffer can store a single frame of displayed data or multiple frames of displayed data. In order to store multiple frames of displayed data, the frame buffer includes a first buffer and at least one additional buffer. A currently displayed frame of displayed data is stored in the first buffer, while at least one subsequent frame is stored in the at least one additional buffer. When the subsequent frame is displayed, the first buffer is then filled with new displayed data. Frame buffers can be stored in a graphics processing unit (GPU). In one embodiment, each of the plurality of second electronic devices (e.g., the first device 701, the second client/user device 702, the nth user device 70*n*) can access the frame buffer in the GPU and analyze the pixel data in order to identify a reference patch.

FIG. 3A is a flow chart for a method 700 of identifying the reference patch included in the displayed data and overlaying the digital content onto displayed data according to an embodiment of the present disclosure. In an embodiment, in step 705, the first device 701 can inspect the stream of data being outputted by the first device's 701 video or graphics card and onto the display of the first device 701. That is, the first device 701 can access a frame buffer of the GPU and analyze, frame by frame, in the frame buffer, the outputted stream of data which can include the displayed data. In an embodiment, a frame represents a section of the stream of the displayed data that is being displayed by the first device 701. In that regard, the first device 701 can inspect the outputted stream of data. The first device 701 can achieve this by intercepting and capturing data produced from the first device 701's video card or GPU that is communicated to the first device 701's display. Inspecting the frame buffer is a method for visually identifying the reference patch as part of the display content.

In an embodiment, in step 710, the first device 701 can process attributes of each pixel included in a single frame and detect groups of pixels within that frame with a known predetermined pattern of pixel luma and chroma manipulation in order to find the reference patch. In one embodiment, the first device 701 can identify the reference patch based on a confidence level for a predetermined pattern of pixel luma and chroma manipulation and/or a predetermined edge pattern of pixel luma and chroma manipulation. For example, the first device 701 can identify a reference patch wherein the reference patch is a uniform gray rectangle surrounded by a white background. The pattern of chroma manipulation of gray rectangle in contrast with the surrounding pixel data is identifiable as a reference patch. In another embodiment, the first device 701 can identify a line segment separating a reference patch from the remainder of the displayed data based on the color and/or brightness of the line segment. In one embodiment, the first device 701 can inspect pixels in batches. In one embodiment, identifying the reference patch is done by inspecting the frame buffer using computer vision, including, but not limited to, image recognition, semantic segmentation, edge detection, pattern detection, object detection, image classification, and/or feature recognition. Examples of artificial intelligence computing systems and techniques used for computer vision include, but are not limited to, artificial neural networks (ANNs), generative adversarial networks (GANs), convolutional neural networks (CNNs), thresholding, and support vector machines (SVMs). Computer vision is useful when the displayed data includes complex imagery and/or when the reference patch would otherwise blend into the displayed data. For example, an image of a car is a reference patch, and the displayed data includes multiple images of cars. Computer vision enables the first device 701 to accurately identify the specific image of the car that is the reference patch in the displayed data.

In a non-limiting example, the processor-based computer vision operation can include sequences of filtering operations, with each sequential filtering stage acting upon the output of the previous filtering stage. For instance, when the processor is a graphics processing unit (GPU), these filtering operations are carried out by fragment programs. In the event an input to the operation is an image, the input images are initialized as textures and then mapped onto quadrilaterals. Displaying the input in quadrilaterals ensures a one-to-one correspondence of image pixels to output fragments. Similarly, when the input to the operation is an encoded image, a decoding process may be integrated into the processing steps described above. A complete computer vision algorithm can be created by implementing sequences of these filtering operations. After the texture has been filtered by the fragment program, the resulting image is placed into texture memory, either by using render-to-texture extensions or by copying the frame buffer into texture memory. In this way, the output image becomes the input texture to the next fragment program. This creates a pipeline that runs the entire computer vision algorithm. However, often a complete computer vision algorithm will require operations beyond filtering. For example, summations are common operations. Furthermore, more-generalized calculations, such as feature tracking, can also be mapped effectively onto graphics hardware.

In an embodiment, the reference patch can be identified by use of edge detection methods. In an example, the edge detection method may be a Canny edge detector. The Canny edge detector may be run on the GPU. In one instance, the Canny edge detector can be implemented as a series of fragment programs, each perform a step of the algorithm.

In an embodiment, the identified reference patch can be tracked from frame to frame using feature vectors. Calculating feature vectors at detected feature points is a common operation in computer vision. A feature in an image is a local area around a point with some higher-than-average amount of "uniqueness." This makes the point easier to recognize in subsequent frames of video. The uniqueness of the point is characterized by computing a feature vector for each feature point. Feature vectors can be used to recognize the same point in different images and can be extended to more generalized object recognition techniques.

Feature detection can be achieved using methods similar to the Canny edge detector that instead search for corners rather than lines. If the feature points are being detected using sequences of filtering, the GPU can perform the filtering and read back to the central processing unit (CPU) a buffer that flags which pixels are feature points. The CPU can then quickly scan the buffer to locate each of the feature points, creating a list of image locations at which the feature vectors will be calculated on the GPU.

In step 715, the first device 701 can decode the encoded unique identifier included with the reference patch wherein the unique identifier corresponds to a surface area for augmentation. In one embodiment, a reference patch includes a plurality of unique identifiers. In one embodiment, the unique identifier is a hashed value. In one embodiment, the unique identifier was generated by the first device 701. In one embodiment, the unique identifier was generated by an external device, e.g., the networked device 750, the second client/user device 702, the nth user device 70n.

In step 720, the first device 701 uses the unique identifier to retrieve digital content. In one embodiment, the unique identifier describes the content, the location address, metadata, or other identifying information about the digital content. In one embodiment, the first device 701 retrieves the digital content from a server, e.g., the networked device 750. In one embodiment, the first device 701 retrieves the digital content from main memory.

In step 725, the first device 701 overlays digital content as an augmentation of the displayed data. In one embodiment, the location of the digital content is the surface area described by the unique identifier. The digital content is overlaid as an additional layer to the displayed data. Although the digital content is visually merged with the displayed data, the data itself is isolated from the displayed data and can be modified independently of the rest of the displayed data.

Again, the method of identifying the reference patch included in the displayed data and augmenting the displayed data is described as performed by the first device 701, however, the networked device 750 can instead perform the same functions.

Figure 3B:
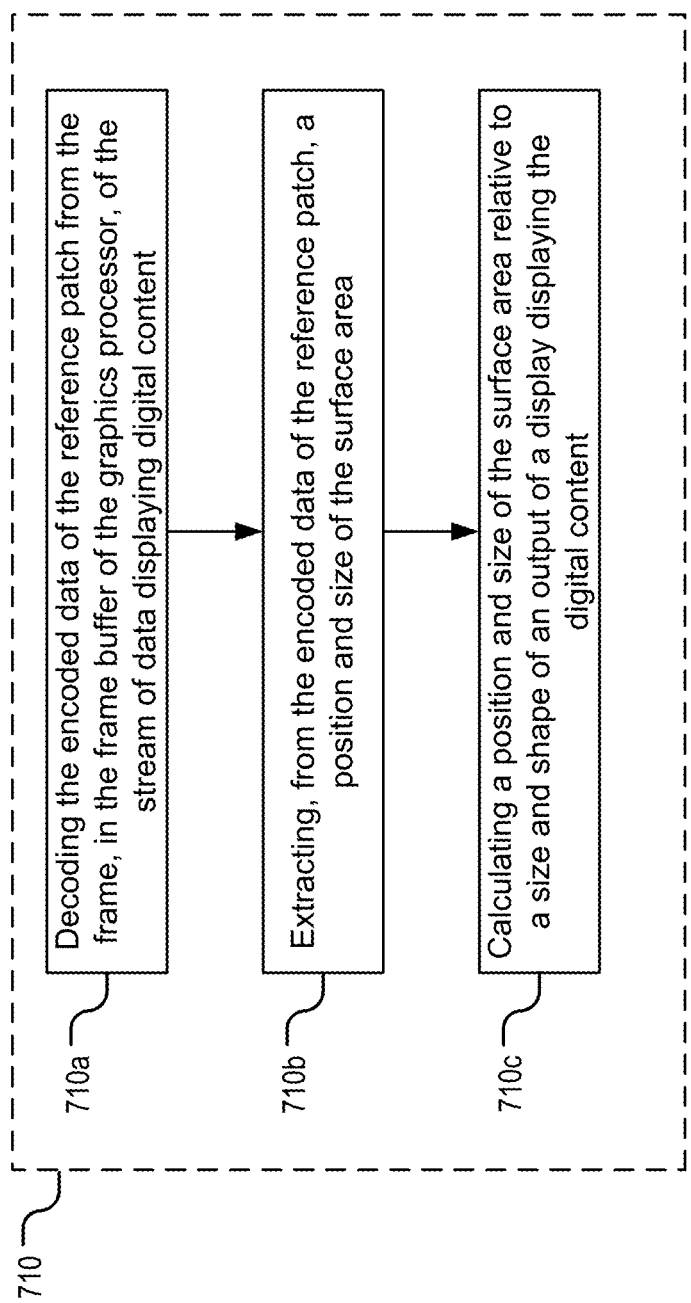
FIG. 3B is a flow chart of a sub-method of identifying the reference patch with unique identifiers corresponding to the surface area from the stream of data, according to an exemplary embodiment of the present disclosure.

In an embodiment, the first device 701 identifies the surface area corresponding to the reference patch by employing further processes to process the frames. To this end, FIG. 3B is a flow chart of a sub-method of identifying the reference patch with the unique identifiers corresponding to the surface area from the stream of data, according to an embodiment of the present disclosure.

In step 710a, the first device 701 can decode the encoded reference patch from the frame. The encoded reference patch can include the marker that makes up the unique identifiers within the reference patch incorporated previously. The reference patch can also include other identifying information. The marker can be disposed within the reference patch, such as within the area of the reference patch or along a perimeter of the reference patch, or alternatively, outside of the area of the reference patch.

Whatever schema is used to encode the marker in the reference patch is also used in reverse operation to decode the underlying information contained within the reference patch. As stated above, in an embodiment, the encoded marker can be patterns generated and decoded using the ArUco algorithm or by other algorithms that encode data according to a predetermined approach.

In step 710b, the first device 701 can also extract attributes of the surface area from the reference patch. In an embodiment, the position, size, shape, and perimeter of the surface area are extracted, although other parameters can be extracted as well. Other parameters include boundary lines, area, angle, depth of field, distance, ratio of pairs of points, or the like. In an embodiment, where shape and perimeter are designated as the attributes, the first device 701 makes determinations of size, shape, and perimeter and outputs that result. Specifically, the size or shape of the surface area can be determined by evaluating a predetermined or repeatable pattern of pixel luma and chroma manipulation in the reference patch. The predetermined pattern can be marked on, within the area, or outside of the area of the reference patch. The predetermined pattern can correspond to the size or shape of the surface area. The predetermined pattern can correspond to the size or shape of the digital content. The perimeter of the surface area can also be determined by evaluating a predetermined edging pattern of pixel luma and chroma manipulation. The predetermined edging pattern can be marked on, within the area, or outside of the area of the reference patch. That is, the predetermined edging pattern of the reference patch can correspond to the perimeter of the surface area. The predetermined edging pattern of the reference patch can correspond to the perimeter of the digital content.

In step 710c, the first device 701 can also calculate a position and size of the surface area relative to the size and shape (dimensions) of the output signal from the display that is displaying the displayed data. In an embodiment, the calculating of the size, relative to the size and shape of the outputted signal from the display, includes determining the size of the surface area by inspecting a furthest measured distance between the edges of the surface area. Furthermore, the calculating of a location of the surface area, relative to the size and shape of the outputted signal from the display, includes determining the location of the surface area relative to the size and shape of the displayed data outputted through the display. This includes calculating the distance between the outer edges of the surface area and the inner edges of the displayed data being outputted by the display. The determined size and location of the surface area can be outputted as a result. Notably, prior to overlaying the digital content into the displayed data, the first device 701 can adjust, based on the predetermined pattern and the predetermined edging pattern, the size and perimeter of the digital content for displaying in the display of the first device 701. For example, the size and perimeter of the digital content for displaying in the display of the first device 701 can be scaled based on the size and perimeter of the surface area and/or the size of the display.

The first device 701 can provide information regarding the characteristics of the output video signal, such that the digital content that is later overlaid can correctly be displayed to account for various manipulations or transformations that may take place due to hardware constraints, user interaction, image degradation, or application intervention. Such manipulations and transformations may be the relocation, resizing, and scaling of the reference patch and/or the surface area, although the manipulations and transformations are not limited to those enumerated herein.

In an embodiment, the reference patch itself can be used as the reference for which the digital content is displayed on the surface area. In one example, the location at which to display the digital content in the surface area can be determined relative to the location of the reference patch on the displayed data. In one example, the size of the surface area can be determined relative to the size of the reference patch on the displayed data. In an example employing a combination of the two properties of the reference patch, the reference patch displayed in the displayed data on a smart phone having a predetermined size and a surface area can be scaled relative to the predetermined size of the display of the smart phone. This can be further adjusted when the reference patch in the same displayed data is displayed on a desktop monitor, such that the predetermined size of the reference patch in the displayed data displayed on the desktop monitor is larger and thus the size of the surface area can be scaled to be larger as well. Furthermore, the location of the surface area can be determined via a function of the predetermined size of the reference patch. For example, the location at which to display the digital content in the surface area can be disposed some multiple widths laterally away from the location of the reference patch as well as some multiple heights longitudinally away from the location of the reference patch. As such, the predetermined size of the reference patch can be a function of the size of the display of the first device 701. For example, the predetermined size of the reference patch can be a percentage of the width and height of the display, and thus the location and the size of the surface area are also a function of the width and height of the display of the first device 701.

In an embodiment, the first device 701 can determine an alternative location at which to display the digital content based on behaviors of the user. For example, the first device 701 can compare the encoded data corresponding to the location at which to display the digital content in the surface area to training data describing movement and focus of the user's eyes while viewing the displayed data. Upon determining the location at which to display the digital content in the surface area (as encoded in the reference patch) is not the same as the training data, the first device 701 can instead display the digital content at the location described by the training data as being where the user's eyes are focused in the displayed data at a particular time. For example, the user's eyes may be predisposed to viewing a bottom-right of a slide in a slide deck. The first device 701 can decode the reference patch and determine the digital content is to be displayed in a bottom-left of the slide deck. The training data can indicate that, for example, the user's eyes only focus on the bottom-left of the slide 10% of the time, while user's eyes focus on the bottom-right of the slide 75% of the time. Thus, the first device 701 can then display the digital content in the bottom-right of the slide instead of the bottom-left. The training data can also be based on more than one user, such as a test population viewing a draft of the slide deck. For example, the training data can be based on multiple presentations of the slide deck given to multiple audiences, wherein eye tracking software determines the average location of the audience's focus on each of the slides.

Figure 3C:
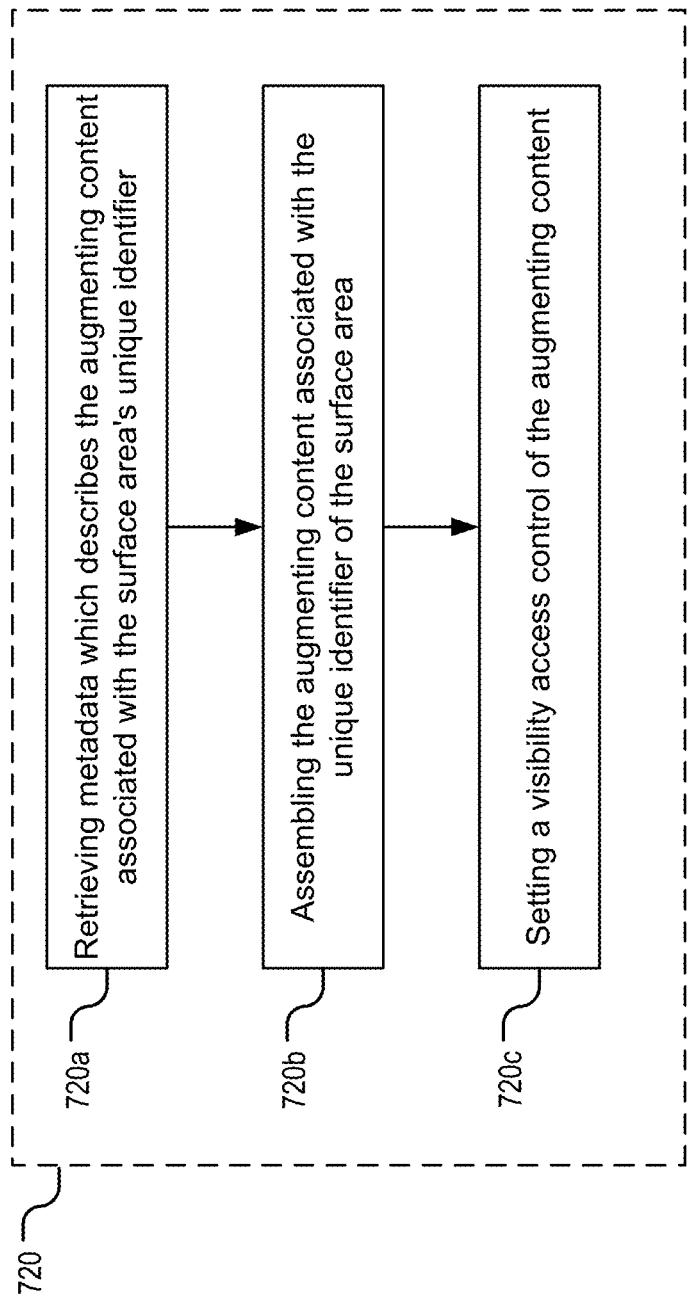
FIG. 3C is a flow chart of a sub-method of associating the unique identifiers with digital content, according to an exemplary embodiment of the present disclosure.

In an embodiment, the first device 701 employs other processes to associate the unique identifiers with the digital content. To this end, FIG. 3C is a flow chart of a sub-method of associating the unique identifiers with digital content, according to an embodiment of the present disclosure. In step 720a, the first device 701 can send the unique identifiers to the networked device 750 and the networked device 750 can retrieve metadata that describes the digital content, the digital content being associated with the surface area through the unique identifiers. This can be done by querying a remote location, such as a database or a repository, using the unique identifiers of the surface area as the query key. In an embodiment, the first device 701 sends the unique identifiers to the networked device 750 and the networked device 750 associates the unique identifier of the reference patch to corresponding digital content based on the metadata. The metadata associated with the surface area's unique identifier can be transmitted to the first device 701 with the augmentation content.

In step 720b, the first device 701 can assemble the digital content that is associated with the surface area's unique identifier. The assembly can entail loading the necessary assets for assembling the digital content. In an embodiment, this can entail loading manipulation software or drivers in order to enable the first device 701 to process the digital content. Other assembling processes can be the loading of rendering information in order to transform and manipulate an individual portion of the digital content. Furthermore, the loaded manipulation software, drivers, or rendering information can be used to compile all the individual portions of the entire digital content together. In an embodiment, this can include adapting the file formats of the digital content, delaying the playback for the digital content, converting from one format to another, scaling the resolution up or down, converting the color space, etc.

In step 720c, the first device 701 can provide access control parameters for the digital content. The access control parameters can dictate whether the digital content is visible to some users, or to some geographical locations, or to some types of displays and not others, as well as the date and time or duration of time a user can access the digital content. In an embodiment, visibility of the digital content can be defined for an individual. For example, the digital content can be a video that is appropriate for users over a certain age. In an embodiment, visibility of the digital content can be defined for a geographic location. For example, the digital content can be a video that is region-locked based on a location of the first device 701. In an embodiment, visibility of the digital content can be defined for a type of display displaying the displayed data. For example, the digital content can be VR-based and will only display with a VR headset. In an embodiment, visibility of the digital content can be defined for a predetermined date and a predetermined time. For example, the digital content can be a video that will only be made publicly available after a predetermined date and a predetermined time. In an embodiment, visibility of the digital content can be defined for a time period. For example, the digital content can be a video that is only available for viewing during a holiday. The first device 701 thus calculates the user's access level based on those parameters and provides an output result as to the user's ability to access the digital content, i.e., whether the digital content will be visible or invisible to the user. Note that the access control parameters can be global, for all the displayed data, or it can be localized per surface area and the underlying digital content.

Referring again to FIG. 3A, in step 725, the first device 701 can carry on the processes of overlaying the surface area with the digital content into the displayed data in accordance with the surface area, the position, and the size identified by the unique identifier. The first device 701 can determine or adjust the size and location of the assembled digital content on the surface area relative to the size and shape of the displayed data being outputted by the display. Then, the first device 701 can render the associated digital content (or the assembled individual portions) over the surface area's shape and perimeter using the size and location information. Thus, the digital content is superimposed on top of the surface area.

In one embodiment, a device (e.g., the first device 701) can inspect the memory of the device in order to identify the reference patch. A frame buffer stores a limited number of frames of displayed data. Displayed data can also be stored in the main memory of a device, wherein the main memory refers to internal memory of the device. The operating system (OS) and software applications can also be stored in the main memory of a device.

Figure 4A:
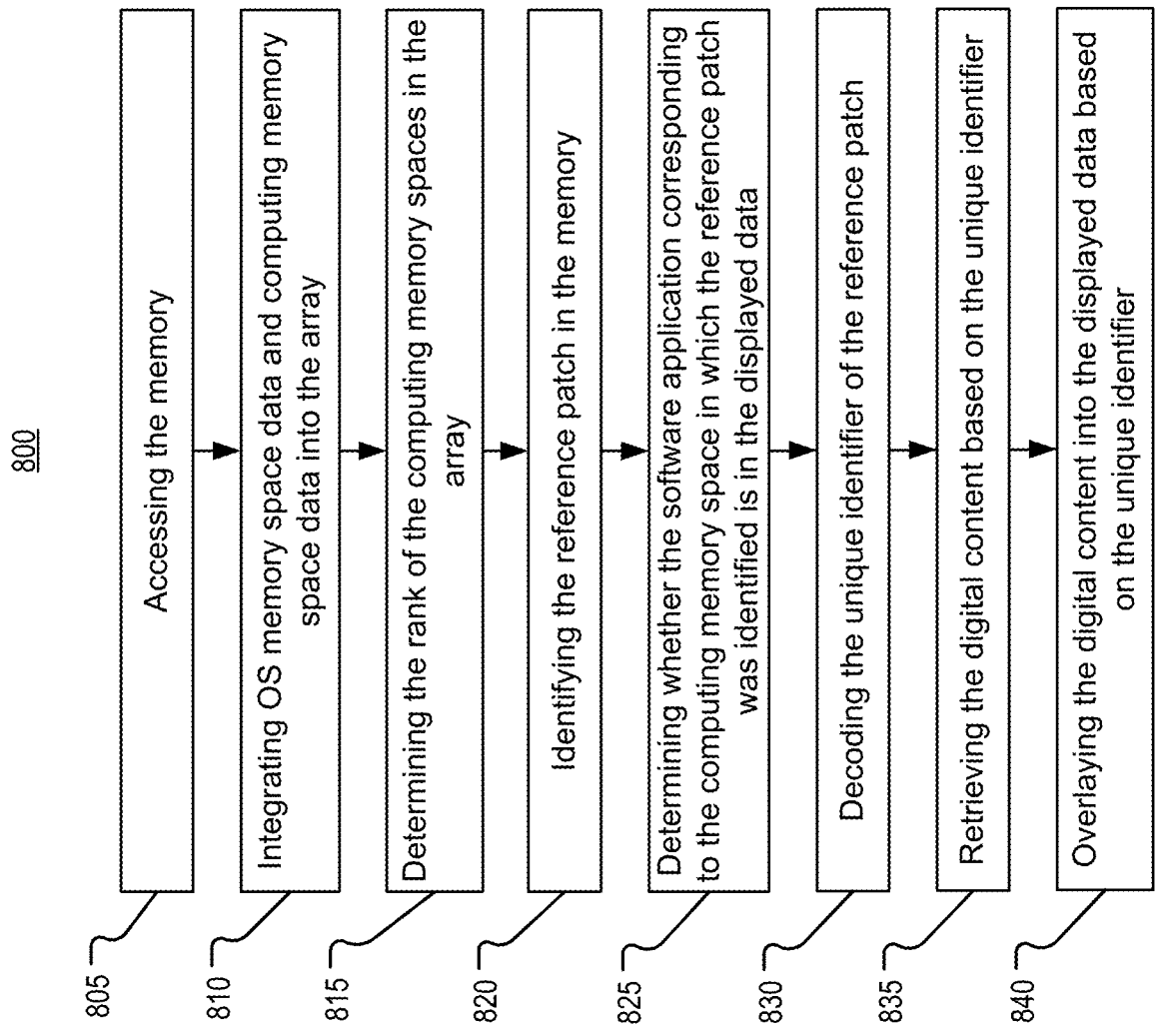
FIG. 4A is a flow chart of a method of identifying the reference patch included in the displayed data and overlaying the secondary digital content into displayed data, according to an exemplary embodiment of the present disclosure.

FIG. 4A is a flow chart for a method 800 of identifying the reference patch included in the displayed data and overlaying the digital content into displayed data, according to an embodiment of the present disclosure. In an embodiment, in step 805, the first device 701 can inspect the main memory on the first device 701. Again, the main memory of the first device 701 refers to physical internal memory of the first device 701 where all the software applications are loaded for execution. Sometimes complete software applications can be loaded into the main memory, while other times a certain portion or routine of the software application can be loaded into the main memory only when it is called by the software application. The first device 701 can access the main memory of the first device 701 including an operating system (OS) memory space, a computing memory space, and an application sub-memory space for the computing memory space in order to determine, for example, which software applications are running (computing memory space), how many windows are open for each software application (application sub-memory space), and which windows are visible and where they are located (or their movement) on the display of the first device 701 (OS memory space). That is to say, the OS memory takes up a space in (or portion of) the main memory, the computing memory takes up a space in (or portion of) the main memory, and the application sub-memory takes up a space in (or portion of) the computer memory. This information can be stored, for example, in the respective memory spaces. Other information related to each software application can be obtained and stored and is not limited to the aforementioned features.

In an embodiment, in step 810, the first device 701 can aggregate the various memory spaces into an array (or table or handle). That is, the first device 701 can integrate data corresponding to the OS memory space and data corresponding to the computing memory space into the array. The array can be stored on the main memory of the first device 701 and include information regarding the software applications running on the first device 701. In an embodiment, the computing memory spaces (including the application sub-memory spaces) can be aggregated into the array. This can be achieved by querying the main memory for a list of computing memory spaces of all corresponding software applications governed by the OS and aggregating all the computing memory spaces obtained from the query into the array. This can be, for example, aggregating the computing memory space of a PowerPoint file and the computing memory space of a Word file into the array. The information in the computing memory spaces stored in the array can include metadata of the corresponding software application. For example, for PowerPoint, the information in the array can include a number of slides in a presentation, notes for each slide, etc. Moreover, each window within the PowerPoint file and/or the Word file can be allocated to a sub-memory space. For example, the array can include the location of each window for each software application running on the first device 701, which can be expressed as an x- and y-value pixel coordinate of a center of the window. For example, the array can include the size of each window for each software application running on the first device 701, which can be expressed as a height and a width value.

In an embodiment, in step 815, the first device 701 can determine a rank or a hierarchy of the computing memory spaces in the array. The rank can describe whether a window of a software application or the software application itself is active or more active as compared to another software application running on the first device 701. An active window or software application can correspond to the window or software application that is currently selected or clicked in or maximized. For example, an active window can be a window of a web browser that the user is scrolling through. In an embodiment, this can be achieved by querying the OS memory space and each computing memory space in the main memory for existing sub-memory spaces, querying the OS memory space and each computing memory space in the main memory for a rank or hierarchical relationship between (software application) sub-memory spaces found, recording the list of sub-memory spaces and the rank relationship between sub-memory spaces, and associating the list of sub-memory spaces and the rank relationship between the sub-memory spaces with the array. For example, a window of a first application can be an active window on the first device 701 and has a higher rank than an inactive window of a second application also running on the first device 701. The active window can be the window the user has currently selected and displayed over all other windows on the display of the first device 701. Notably, there can be multiple visible windows, but one of said multiple visible windows can have a higher rank because it is currently selected by the user and the active window.

For example, two documents can be viewed in a split-screen side-by-side arrangement without any overlap of one window over another window, and a third document can be covered by the two documents in the split-screen side-by-side arrangement. In such an example, the user can have one of the two split-screen documents selected, wherein the selected document is the active window and would have a higher rank (the highest rank) than the other of the two split-screen documents since the higher (highest) ranked document is selected by the user. The third document behind the two split-screen documents would have a lower rank (the lowest rank) than both of the two split-screen documents since it is not visible to the user. Upon bringing the third document to the front of the display and on top of the two split-screen documents, the third document rank would then become the highest rank, while the two split screen documents' rank would become lower (the lowest) than the third document (and the rank of the two split screen documents can be equal).

In an embodiment, the rank can be determined based on eye or gaze tracking of the user (consistent with or independent of whether a window is selected or has an active cursor). For example, a first window and a second window can be visible on the display, wherein the first window can include a video streaming from a streaming service and the second window can be a word processing document. The rank of the first window and the second window can be based on, for example, a gaze time that tracks how long the user's eyes have looked at one of the two windows over a predetermined time frame. The user may have the word processing document selected and active while the user scrolls through the document, but the user may actually be watching the video instead. In such a scenario, an accrued gaze time of the first window having the video can be, for example, 13 seconds out of a 15 second predetermined time frame, with the other 2 seconds in the predetermined time frame being attributed to looking at the first window having the word processing document. Thus, the rank of the first window having the video can be higher than the rank of the second window because the gaze time of the first window is higher than the gaze time of the second window. Notably, if there is only one open window, the rank of that window would be ranked as the top-ranked window (because it is the only window) regardless of/independent from other user input, such as gaze, selection, etc.

In an embodiment, the rank can be determined based on the eye tracking and a selection by the user. For example, the user can select the first window having the video and looking at a description of the video playing in the same first window. In such a scenario, both the eye tracking accruing a longer gaze time (than the second window) and the user selecting the first window to make it the active window can make the first window the top-ranked window.

Thus, the rank can be determined based on one or a plurality of elements. The more elements being used, the more accurate the determination of the rank. Hence, the rank can be determined by a combination of eye or gaze tracking, an input selection by a user (for example, the user clicking on an icon or a display element in a window (the first window or the second window), a user hovering a mouse or pointer over a portion of a window (without necessarily clicking or selecting anything), etc. The rank determination can also go beyond these elements/factors to include preset settings related to a particular user and/or past behavior/experiences. For example, the user can preset certain settings and/or the user's device can learn from user's past behavior/experiences about his/her preference when two or more windows are displayed at the same time side by side.

For example, this particular user may always play a video in the first window while working on a presentation in the second window. In such case, the user's device can learn from this behavior and use this knowledge to more accurately determine the rank (for example, when the first window has a video playing and the second window corresponds to a work processing document or a presentation, the active window is likely the second window). Such knowledge can be paired with eye gaze direction and other factors such as mouse/cursor movement, etc. in order to more accurately determine the rank.

In an embodiment, in step 820, the inspected main memory data can also include a reference patch therein and the first device 701 can identify the reference patch in the main memory data. In an embodiment, the first device 701 can detect and identify the reference patch in the main memory by a value, such as a known encoding, where the format of the of the data itself can indicate to the application where the reference patch is located. For example, the known encoding can be 25 bytes long and in a predetermined position within the binary bits of the main memory. In one embodiment, the first device 701 inspects the main memory data for bit data corresponding to the reference patch. For example, the bit data corresponding to the reference patch is an array of bits corresponding to pixel data making up a reference patch. In one embodiment, the presence of the reference patch is an attribute of an object or a class. In one embodiment, the reference patch is a file used by an application wherein the file is loaded into the main memory when the reference patch is displayed by the application. In one embodiment, the presence of the reference patch is indicated in metadata, e.g., with a flag. In an embodiment, the reference patch can be identified by parsing an application (e.g. a Word document), looking through the corresponding metadata in the computing memory space, and finding the reference patch in the metadata by attempting to match the metadata with a predetermined indicator indicating the presence of the reference patch, such as the unique identifier.

In step 825, the first device 701 can determine whether the software application corresponding to the computing memory space (and sub-memory space) in which the reference patch was identified is active or in the displayed data. Referring to the example of step 815, while the window of the first application can include the reference patch, the inactive window of the second application can become active and overlay over the window of the first application which was previously the active window. In such a scenario, the reference patch in the window of the first application can become covered by the window of the second application. As such, the digital content of the reference patch in the window of the first application need not be displayed or can cease being displayed. However, in an alternative scenario, the window of the first application, including the reference patch, can be active and the reference patch therein can be uncovered and visible. In one embodiment, the active window refers to the window with the most recent interaction, e.g., a click, a movement. In one embodiment, the first device 701 uses a priority list to determine which window is the active window. For example, digital content for a first application with higher priority than a second application will be displayed even if the second application covers the reference patch of the first application.

In step 830, upon determining the software application corresponding to the computing memory space (and sub-memory space) in which the reference patch was identified is active or in the displayed data, the first device 701 can decode the encoded data of the unique identifiers from the area of the reference patch, wherein the unique identifiers correspond to the surface area.

In step 835, the first device 701 can use the unique identifiers to link the surface area with the digital content using metadata and retrieve the digital content based on the unique identifiers.

In step 840, the first device 701 can overlay the digital content onto the surface area of the displayed data based on the unique identifiers.

Again, the method of identifying the reference patch included in the displayed data and augmenting the displayed data is described as performed by the first device 701, however, the networked device 750, the second client/user device 702, and/or the nth device 70n can alternatively or additionally perform the same functions.

Figure 4B:
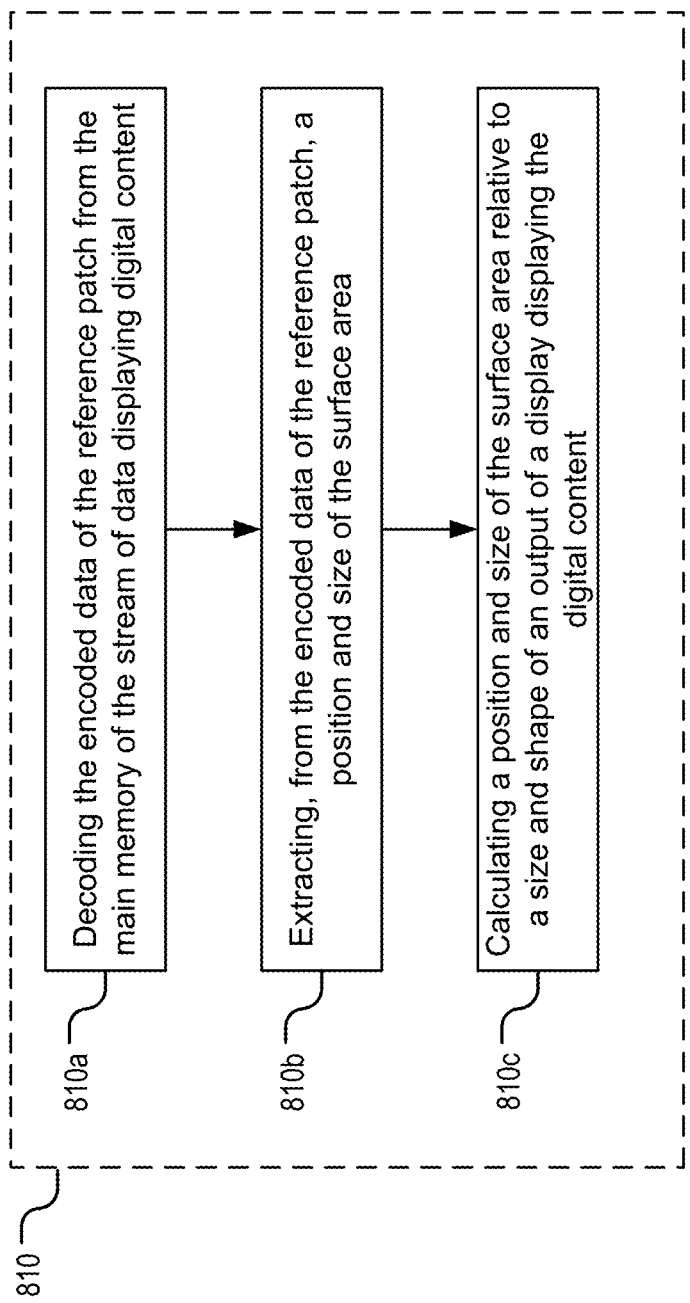
FIG. 4B is a flow chart of a sub-method of identifying the reference patch with the unique identifiers corresponding to the surface area from the stream of data, according to an exemplary embodiment of the present disclosure.

In an embodiment, the first device 701 identifies the surface area corresponding to the reference patch by employing further processes. To this end, FIG. 4B is a flow chart of a sub-method of identifying the reference patch with the unique identifiers corresponding to the surface area from the stream of data, according to an embodiment of the present disclosure.

In step 810a, the first device 701 can decode the encoded reference patch from the main memory. The encoded reference patch can include the marker that makes up the unique identifiers within the reference patch incorporated previously. The reference patch can also include other identifying information. The marker can be disposed within the reference patch, such as within the area of the reference patch or along a perimeter of the reference patch, or alternatively, outside of the area of the reference patch.

Again, whatever schema is used to encode the marker in the reference patch is also used in reverse operation to decode the underlying information contained within the reference patch. As stated above, in an embodiment, the encoded marker can be patterns generated and decoded using the ArUco algorithm or by other algorithms that encode data according to a predetermined approach.

Similarly, as described above, in step 810*b*, the first device 701 can also extract attributes of the surface area from the reference patch.

Similarly, as described above, in step 810*c*, the first device 701 can also calculate a position and size of the surface area relative to the size and shape (dimensions) of the output signal from the display that is displaying the displayed data.

Similarly, as described above, the first device 701 can provide information regarding the characteristics of the output video signal, such that the digital content that is later overlaid can correctly be displayed to account for various manipulations or transformations that may take place due to hardware constraints, user interaction, image degradation, or application intervention. Such manipulations and transformations may be the relocation, resizing, and scaling of the reference patch and/or the surface area, although the manipulations and transformations are not limited to those enumerated herein.

Similarly, as described above, the reference patch itself can be used as the reference for which the digital content is displayed on the surface area.

Similarly, as described above, the first device 701 can determine an alternative location at which to display the digital content based on behaviors of the user.

In an embodiment, the first device 701 employs other processes to associate the unique identifiers with the digital content. To this end, FIG. 4C is a flow chart of a sub-method of associating the unique identifiers with digital content, according to an embodiment of the present disclosure. In step 820*a*, the first device 701 can send the unique identifiers to the second device 850 and the second device 850 can retrieve metadata that describes the digital content, the digital content being associated with the surface area through the unique identifiers. This can be done by querying a remote location, such as a database or a repository, using the unique identifiers of the surface area as the query key. In an embodiment, the first device 701 sends the unique identifiers to the second device 850 and the second device 850 associates the unique identifier of the reference patch to corresponding digital content based on the metadata. The metadata associated with the surface area's unique identifier can be transmitted to the first device 701 with the augmentation content.

In step 820*b*, the first device 701 can assemble the digital content that is associated with the surface area's unique identifier. The assembly can entail loading the necessary assets for assembling the digital content. In an embodiment, this can entail loading manipulation software or drivers in order to enable the first device 701 to process the digital content. Other assembling processes can be the loading of rendering information in order to transform and manipulate an individual portion of the digital content. Furthermore, the loaded manipulation software, drivers, or rendering information can be used to compile all the individual portions of the entire digital content together. In an embodiment, this can include adapting the file formats of the digital content, delaying the playback for the digital content, converting from one format to another, scaling the resolution up or down, converting the color space, etc.

In step 820*c*, the first device 701 can provide access control parameters for the digital content. The access control parameters can dictate whether the digital content is visible to some users, or to some geographical locations, or to some types of displays and not others, as well as the date and time or duration of time a user can access the digital content or is allowed to access. In an embodiment, visibility of the digital content can be defined for an individual. For example, the digital content can be a video that is appropriate for users over a certain age. In an embodiment, visibility of the digital content can be defined for a geographic location. For example, the digital content can be a video that is region-locked based on a location of the first device 701. In an embodiment, visibility of the digital content can be defined for a type of display displaying the displayed data. For example, the digital content can be VR-based and will only display with a VR headset. In an embodiment, visibility of the digital content can be defined for a predetermined date and a predetermined time. For example, the digital content can be a video that will only be made publicly available after a predetermined date and a predetermined time. In an embodiment, visibility of the digital content can be defined for a time period. For example, the digital content can be a video that is only available for viewing during a holiday. The first device 701 thus calculates the user's access level based on those parameters and provides an output result as to the user's ability to access the digital content, i.e., whether the digital content will be visible or invisible to the user. Note that the access control parameters can be global, for all the displayed data, or it can be localized per surface area and the underlying digital content.

Referring again to FIG. 4A, in step 840, the first device 701 can carry on the processes of overlaying the surface area with the digital content into the displayed data in accordance with the surface area, the position, and the size identified by the unique identifier. The first device 701 can determine or adjust the size and location of the assembled digital content on the surface area relative to the size and shape of the displayed data being outputted by the display. Then, the first device 701 can render the associated digital content (or the assembled individual portions) over the surface area's shape and perimeter using the size and location information. Thus, the digital content is superimposed on top of the surface area.

The first device 701 can continuously monitor changes that are taking place at the end user's device (such as the networked device 750 of the second user) to determine whether the reference patch and/or the surface area has moved or been transformed in any way (see below for additional description). Thus, the first device 701 can continuously inspect subsequent frames of the stream of the data (for example, every 1 ms or by reviewing every new frame), displaying the displayed data, to determine these changes. The first device 701 can further continuously decode the reference patch's data from the identified reference patch. Then the first device 701 can continuously extract attributes from the data, the attributes being of size, shape, and perimeter and comparing those changes between the current frame and last frame. Further, the first device 701 can continuously calculate the size and location of the surface area and compare changes between the size and location of the surface area from the current and the last frame and then continuously overlay the digital content on the surface area by incorporating the changes in the reference patch's attributes and the changes in the size and location of the surface area. As stated above, when the user manipulates his/her display device by scaling, rotating, resizing or even shifting the views from one display device and onto another display device, the first device 701 can track these changes and ensure that the digital content is properly being superimposed onto the surface area.

In an embodiment, the methodologies discussed with reference to FIG. 3 that use the frame buffer can be used without using the methodologies discussed with reference to FIG. 4 that use the memory space and vice-versa. In other words, in an embodiment, either the methodologies of FIG. 3 or the methodologies of FIG. 4 can be used to identifying a reference patch and overlay the digital content in displayed data.

However, in an embodiment, both the methodologies discussed with reference to FIG. 3 that use the frame buffer and the methodologies discussed with reference to FIG. 4 that use the memory space can be used together. In such embodiment, a device can use both approaches to accurately identify the same reference patch (applying both approaches can yield better results). In an embodiment, both approaches can be used to identify different reference patches. For example, if a document includes a plurality of reference patches, the first device can apply the methodologies discussed with reference to FIG. 3 to a first reference patch, while applying the methodologies discussed with reference to FIG. 4 to a second reference patch.

An illustrative example will now be discussed: a scenario where a user (for example, a user at the first device 701) receives (from another device such as the second client/user device 702) an email with the embedded reference patch in the body of the email or as an attached document. The reference patch within the displayed data (email) can show a facade of the digital content or the reference patch. The application on the first device 701 can scan the display to find the reference patch and the surface area and the attributes within the displayed data as it is being displayed. Furthermore, the first device 701 can access the digital content using the unique identifier and metadata and prepare it for overlaying. At which point, the user (i.e., the recipient) can select the digital content by various ways such as by clicking on the digital content's facade or the surface area, or otherwise indicating that it intends to access the digital content.

Thereafter, the digital content can be retrieved from the networked device 750 using the unique identifier and the metadata saved within a database that directs the networked device 750 to where the digital content is saved and can be obtained. That is, the networked device 750 can determine the digital content corresponding to the derived unique identifier and send the digital content corresponding to the unique identifier (and the metadata) to the first device 701. Then, the first device 701 can superimpose (overlay) the digital content on the surface area. While the digital content is being received and overlayed on the surface area, the first device 701 can continually monitor the location, size and/or shape of the reference patch and/or the surface area to determine movement and transformation of the reference patch and/or the surface area. If the user has moved the location of the reference patch and/or the surface area, or has resized or manipulated the screen for whatever purpose, the new location, shape and/or size information of the reference patch and/or the surface area is determined in order to display the digital content properly within the bounds of the surface area. Thus, the digital content moves with the displayed data as the displayed data is moved or resized or manipulated.

In an embodiment, a user that has received the displayed data embedded with the reference patch can access the digital content on his/her first device 701, as described above. The user may want to transfer the ongoing augmenting experience from the first device 701 to another device, such as the device 70n, in a seamless fashion. In that scenario, the user is able to continue the augmenting experience on his/her smartphone, smartwatch, laptop computer, display connected with a webcam, and/or tablet pc. The user therefore can capture the embedded reference patch and therefore the encoded attributes, as the digital content is being accessed and overlaid unto the surface area. The user can capture the embedded reference patch by taking a picture of it or acquiring the visual information using a camera of the second client/user device 702 as mentioned above. The user can capture the embedded reference patch by accessing the main memory of the second client/user device 702 as mentioned above.

Assuming the user also has the functionality included or the application installed or running on the device 70n, the device 70n would recognize that an embedded reference patch and encoded unique identifiers are in the captured image/video stream or in the main memory of the device 70n, such as in the corresponding computing memory space as the software application currently active on the device 70n. Once the surface area has been determined and the reference patch decoded, the digital content can be obtained from the networked device 750, using the unique identifiers and the metadata and then overlaid on the surface area within the displayed data displayed on the device 70n. In an embodiment, as soon as the device 70n superimposes the digital content onto the surface area, the networked device 750 or the backend determines that the stream has now been redirected onto the device 70n and thus pushes a signal to the first device 701 to stop playing the digital content on the first device 701. The device 70n that is overlaying the digital content therefore resumes the overlaying at the very same point that the first device 701 stopped overlaying the digital content (for instance, when the content is a video). Thus, the user is able to handoff the digital content from one device to another without noticing delay or disruption in the augmenting experience.

In one embodiment, the visibility of the digital content is dynamic and can be adjusted. For example, in one context an augmentation overlaps with another image and obscures the image by being displayed in front of the image. At a later time, the augmentation is displayed behind the image such that the image obscures the augmentation when the augmentation is no longer needed. In one embodiment, the transparency of an augmentation can be adjusted to show objects in the same location as the augmentation. In one embodiment, the interactive properties of digital content are also dynamic and can be modified. Click-ability refers to whether an object can be clicked or otherwise activated by a trigger, thus causing an action to be performed. The action includes, but is not limited to, sending data, receiving data, and/or modifying display content. When the click-ability of an object is on, the trigger causes the action to be performed. When click-ability of an object is off, the trigger does not cause the action to be performed. Touch-ability is a subset of click-ability wherein the trigger is a touch using a touch panel. In one embodiment, a trigger is a contactless gesture. The trigger can be collected by an input device, including, but not limited to, a mouse, a keyboard, a touch panel, a camera, and/or a microphone.

The click-ability of any augmentation layer and/or object of digital content can be modified. In one embodiment, the click-ability of an object in a layer can be modified independently of other objects in that layer. For example, only one button is active (clickable) while other buttons in the augmentation are not active. In addition, objects in different layers can simultaneously be clickable. For example, the original displayed data is a slide deck wherein a slide in the slide deck includes a button for proceeding to a next slide. The slide includes a reference patch, and an electronic device identifies the reference patch and displays an augmentation including a multiple-choice survey. The answers to the multiple-choice survey and the button for proceeding to the next slide are all clickable, enabling a user to interact with the augmentation as well as the original displayed data. In another embodiment, the button for proceeding to the next slide is not clickable until an answer to the multiple-choice survey has been collected. Thus, inputs and interactions on one layer can be used to affect another layer. In one embodiment, transparency and click-ability can be adjusted at a pixel level. For example, if an object is partially obscured, only the visible part of the object is clickable.

In one embodiment, click-ability and transparency can be connected. For example, a first clickable object in a first layer and a second clickable object in a second layer are located on the same surface area of a display. The click-ability of the first clickable object is on and the click-ability of the second clickable object is off for a period of time. During this period of time, the second clickable object is transparent and only the first clickable object is visible on the display. After the period of time elapses, the click-ability of the first clickable object is turned off, while the click-ability of the second clickable object is turned on. Accordingly, the first clickable object is then transparent while the second clickable object is not transparent. The transparency and click-ability of the objects can be set independently of the order in which layers are created, edited, retrieved, and/or displayed. In another example, an electronic device displays a full-screen Microsoft PowerPoint® presentation and full-screen scrolling speaker's notes at the same time in one window, wherein the click-ability of any of the pixels of the presentation and the notes can be adjusted to be on or off. The result is a multi-layered content stack experience wherein attributes such as transparency and click-ability for any layer in the stack can be adjusted at the pixel level.

In one embodiment, pixels in one layer can have click-ability on, while pixels in the remaining layers can have click-ability off. Further, portions of pixels within layers that have click-ability off can have their click-ability turned on, while the remaining pixels in that layer remain off (and vice versa). The determination of which pixels have click-ability on and off can be determined based on parameters including, but not limited to, user settings, hot spots, application settings, user input. Hot spots can refer to regions of a computer program, executed by circuitry of a device, where a high percentage of the computer program's instructions occur and/or where the computer program spends a lot of time executing its instructions. Examples of hot spots can include play/pause buttons on movies, charts on presentations, specific text in documents, et cetera.

Referring back to the digital composition discussed above, in an example, the digital composition can be a page of a website. The webpage may be dedicated to discussions of strategy in fantasy football, a popular online sports game where users manage their own rosters of football players and points are awarded to each team based on individual performances from each football player on the team. After reading the discussion on the website page, the reader may wish to update his/her roster of football players. Traditionally, the reader would be required to open a new window and/or a new tab and then navigate to his/her respective fantasy football platform, to his/her team, and only then may the reader be able to modify his/her team. Such a digital user experience is cumbersome and inefficient. With augmentation, however, the reader may not need to leave the original webpage as a reference patch corresponding to a fantasy football augmentation may be positioned within the viewable area of the website page. The corresponding augmentation may be, for instance, an interactive window provided by a third-party fantasy football platform that allows the reader to modify his/her roster without leaving the original website. Thus, instead of navigating to a different website and losing view of the informative fantasy football discussion, the reader can simply interact with the digital object of the augmentation in the current frame of displayed data because of the presence of the reference patch.

Figure 5A:
FIG. 5A is an illustration of a display, according to an exemplary embodiment of the present disclosure.
Figure 5B:
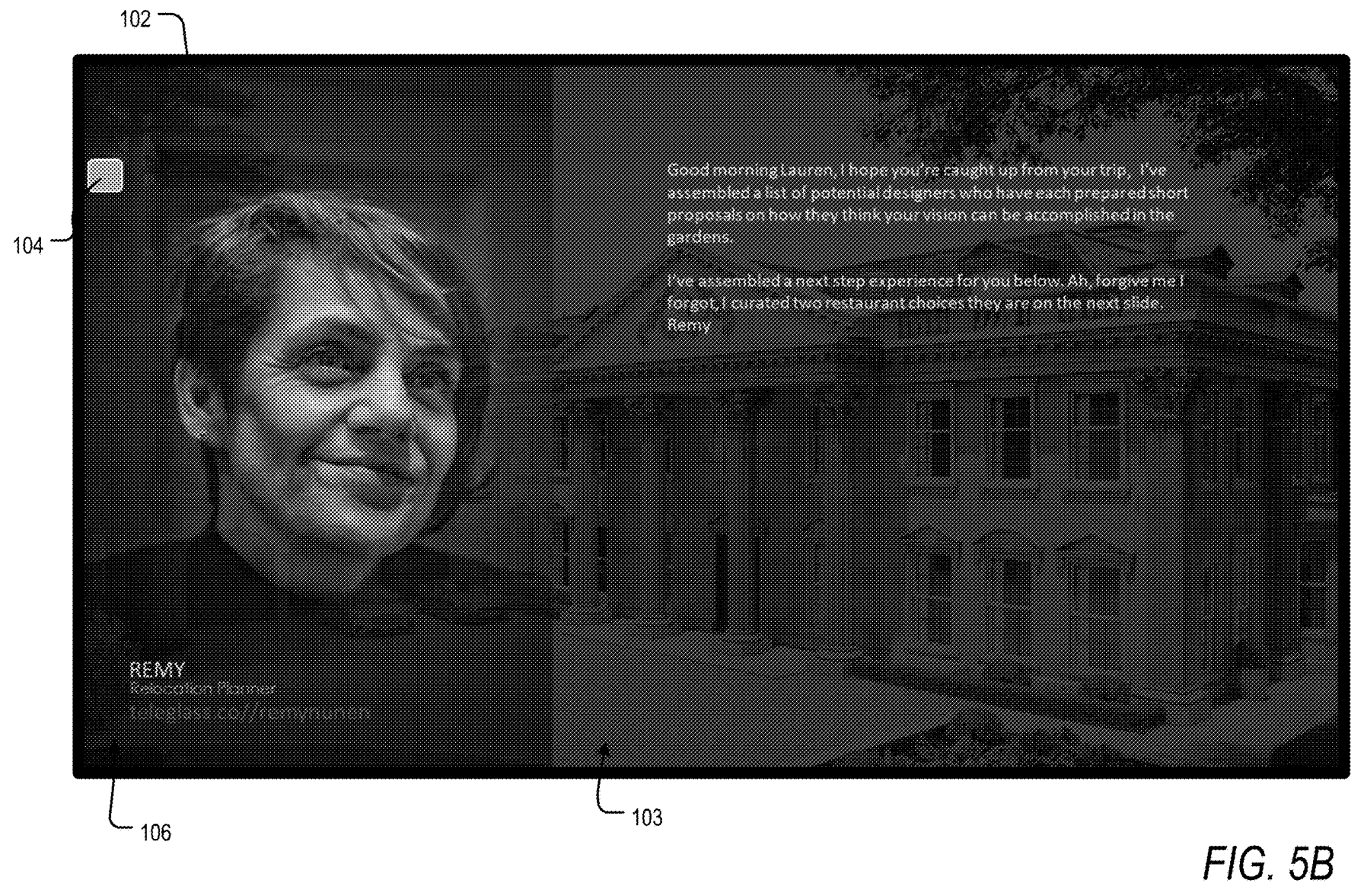
Figure 5C:
FIG. 5C is an illustration of an augmentation within a frame of a display, according to an exemplary embodiment of the present disclosure.

In another example, as will be described with reference to FIG. 5A through FIG. 5C, the digital composition can be a slide deck. The slide deck may be generated by a concierge-type service that seeks to connect a client with potential garden designers. As in FIG. 5A, the slide deck may be presented to the client within a viewable area 103 of a display 102. The presently viewable content of the slide deck within the viewable area 103 of the display 102 may be a current frame 106 of displayed data. Traditionally, the slide deck may include information regarding each potential garden designer and may direct the client to third-party software applications that allow the client to contact each designer. In other words, in order to connect with one or more of the potential garden designers, the client, traditionally, may need to exit the presentation and navigate to a separate internet web browser in order to learn more about the garden designers and connect with them. Such a digital user experience is cumbersome and inefficient. With augmentation, however, the client need not leave the presentation in order to set up connections with the garden designers. For instance, as shown in FIG. 5B, a reference patch 104 can be positioned within the slide deck so as to be in the current frame 106 and viewable within the viewable area 103 of the display 102 at an appropriate moment. As shown in FIG. 5C, the reference patch 104 may correspond to one or more augmentations 105 and, when the reference patch 104 is visible, the augmentations 105 are displayed and brought to life. The one or more augmentations 105 can include, as shown in FIG. 5C, interactive buttons, images, videos, windows, and icons, among others, that allow the client to interact with the secondary digital content and to, for instance, engage with the garden designers without leaving the presentation. In an example, the interactive augmentations 105 may allow for scheduling an appointment with a given garden designer while still within the slide deck. In one embodiment, the augmentations are only presented when the reference patch is included in the digital composition. In one embodiment, the reference patch identifies the digital content of the augmentation. The digital content of the augmentations is visually integrated into the digital composition.

The above-described augmentations are particularly relevant to environments where the underlying content is static. Static content may include textual documents or slide decks. Often, the static content is stored locally. A result of the static content is static augmentations that are not capable of dynamically adjusting to or being adjusted dynamically according to complex user interactions, in real-time, during a user experience. The addition of dynamic augmentations improves user experience by providing additional data and personalized, interactive elements.

Such a dynamic environment includes one where, for instance, a video conversation is occurring. A first participant of the video conversation may share his/her screen with a second participant of the video conversation and wish to remotely control an augmentation on a display of a device of the second participant. By including a reference patch within the displayed data that is being 'shared', which may be the video itself or another digital item, where sharing the displayed data includes transmitting the displayed data over a communication network from the first participant to the second participant, the second participant may be able to experience the augmentation when the device of the second participant receives the transmitted displayed data and processes it for display to the user.

Generally, and as introduced in the above example of a dynamic environment, a reference patch can be inserted into displayed data displayed on a first computer. The display of the first computer can be streamed to a second computer. In an example, the second computer decodes the streamed display and identifies the reference patch in the displayed data. Based on the identified presence of the reference patch, the second computer can locally augment the display of the second computer to overlay the intended augmentation on the 'streamed' display from the first computer. The design and the arrangement of the augmentation can be provided relative to the reference patch placed into the displayed data on the first computer. The augmentation can include a number of objects to be displayed and may be configured to display different subsets of objects based on interactions of a user with the augmentation. The objects, therefore, can be interactive. In one embodiment, the second computer can retrieve the augmentation from a server. Thus, the augmentation is not included directly in the displayed data streamed from the first computer to the second computer but is retrieved and included in the display at a later time. In one embodiment, the unique identifier included in the reference patch provides further information and/or instructions for retrieving the augmentation.

The above-discussed techniques can be implemented into a one-to-many concept, where a reference patch can be transmitted from a first electronic device to a plurality of second electronic devices. Such a concept will be discussed with reference to FIGS. 6A through 6D. In one embodiment, the first electronic device 701 is an example of a first electronic device transmitting a reference patch to a plurality of second electronic devices, while the second client/user devices 702-70n are an example of the plurality of second electronic devices.

Figure 6A:
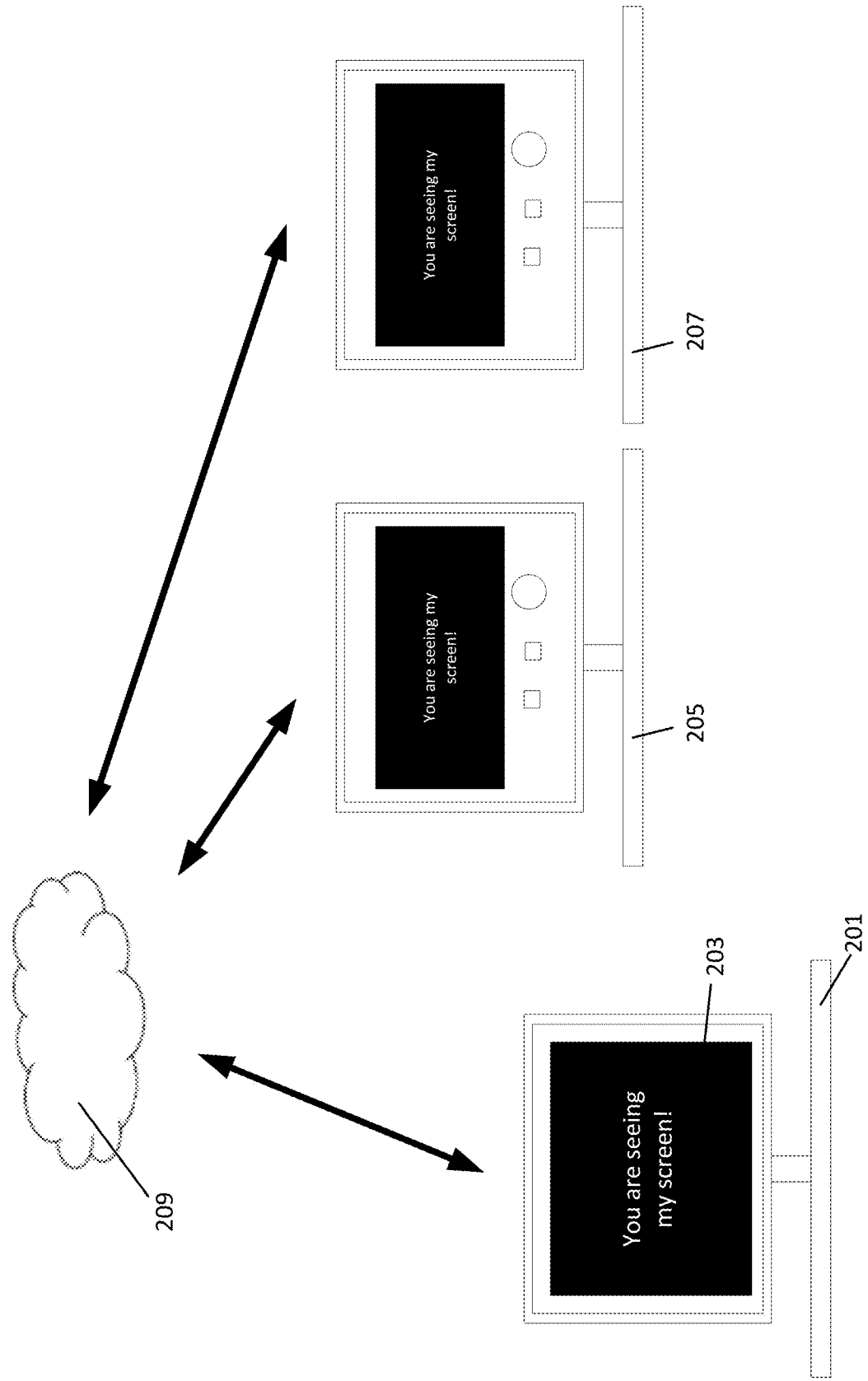
FIG. 6A is an illustration of viewing displayed data on a native layer of a display, according to an exemplary embodiment of the present disclosure.

As shown in FIG. 6A, an electronic device 201 (for example, the first electronic device 701) shares its screen 203 with electronic device 205 (for example, any of devices 702-70n) and electronic device 207 (for example, any of devices 702-70n) over a network 209 (for example, network 650 of FIG. 1). As shown, the electronic devices 205, 207 view the same displayed data shared on the screen 203 as that of the electronic device 201. This displayed data could be, for example, a slide in a PowerPoint presentation or a page in a PDF document.

Figure 6B:
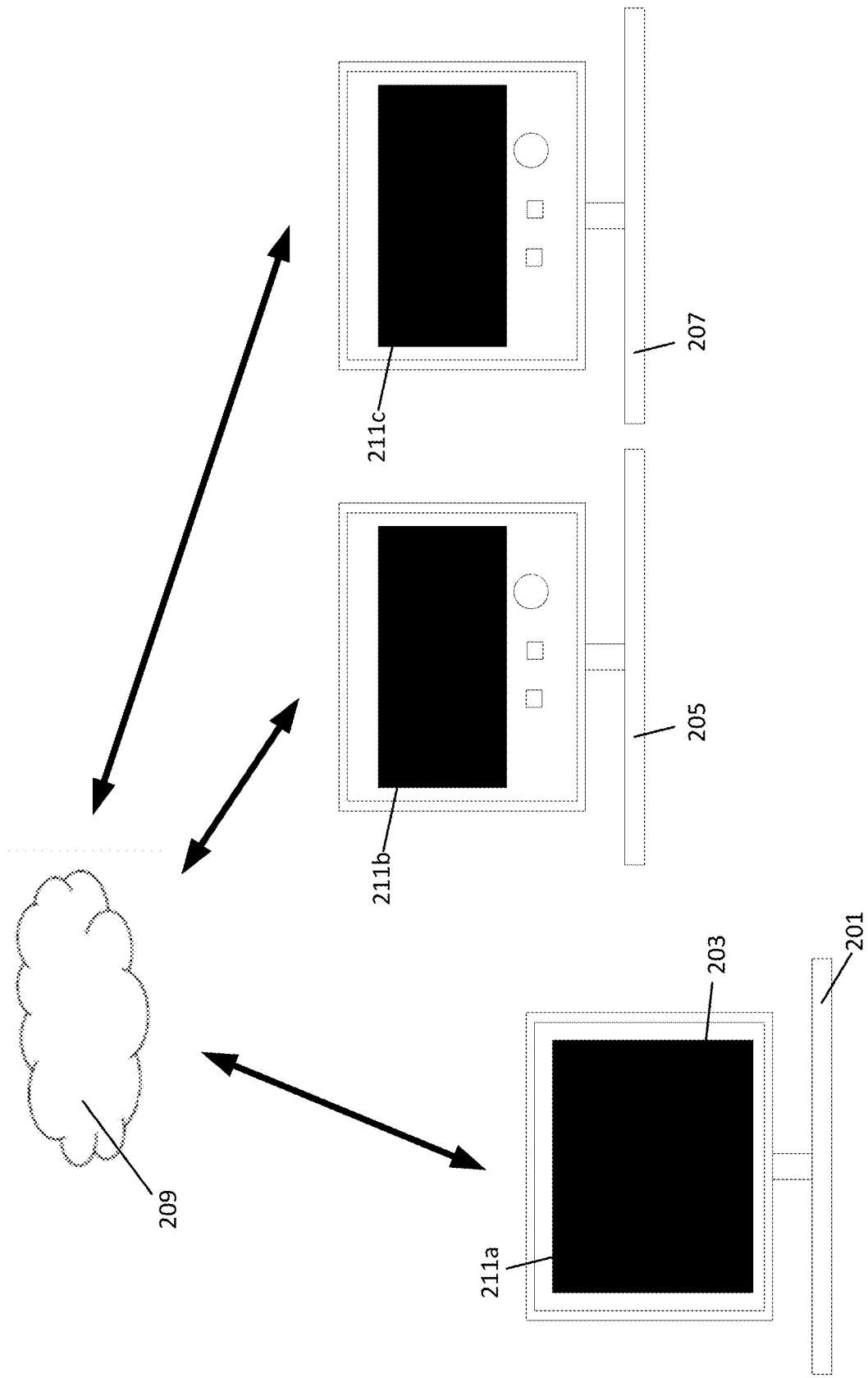
FIG. 6B is an illustration of identifying a reference patch from a frame of displayed data associated with the displayed data, according to an exemplary embodiment of the present disclosure.

Next, as shown in FIG. 6B, the electronic device 201 updates its screen 203 to display a reference patch 211a. The reference patches 211b, 211c are then transmitted to both electronic devices 205, 207, respectively. In one embodiment, the reference patches 211b, 211c are transmitted by the electronic device 201 sharing its screen with the electronic devices 205, 207. Thus, the reference patches 211a, 211b, 211c can be identical in appearance. In one embodiment, the electronic device 201 can transmit different reference patches 211b, 211c to the electronic devices 205, 207, respectively. In one embodiment, the reference patches 211a, 211b, 211c can have the same unique identifiers. In one embodiment, the reference patches 211a, 211b, 211c can have different unique identifiers.

Figure 6C:
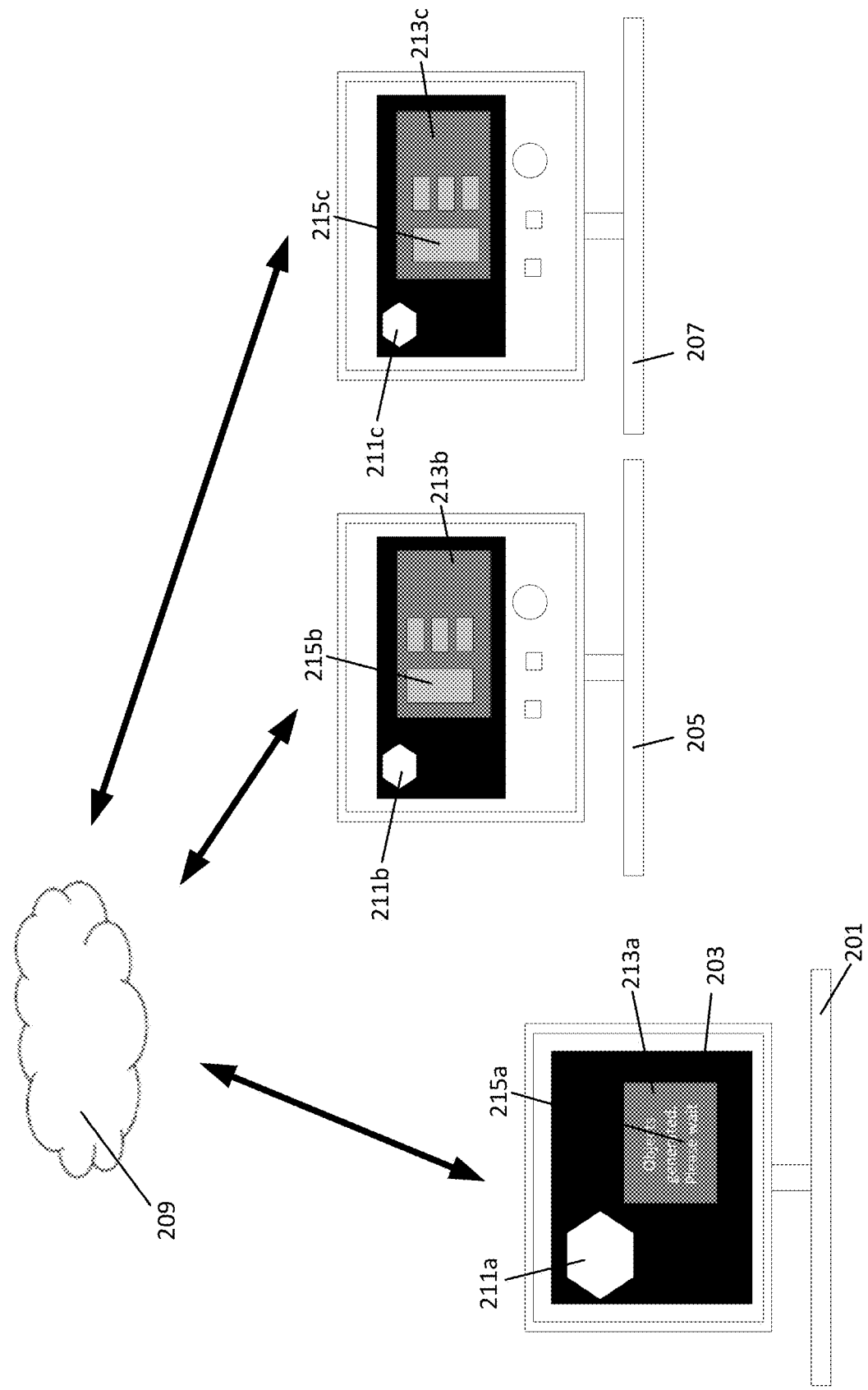
FIG. 6C is an illustration of an augmentation having a set of objects within a transparent layer overlaid over the native layer, according to an exemplary embodiment of the present disclosure.

Next, as shown in FIG. 6C, the presence of the reference patches 211a, 211b, 211c is detected respectively by the electronic devices 201, 205, 207. The identified reference patches 211a, 211b, 211c can be used by the electronic devices 201, 205, 207, respectively, to retrieve digital content 213a, 213b, 213c associated respectively with the reference patches for overlaying on each of the electronic devices 201, 205, 207, where the instructions can be the same or different. Thereafter, the digital content 213a, 213b, 213c are overlayed on the electronic devices 201, 205, 207, based on the unique identifiers for the reference patches 211a, 211b, 211c, respectively. The digital content 213a, 213b, 213c can include digital objects 215a, 215b, 215c overlayed within a transparent layer of the display on a viewable display area over the native layer. These digital objects 215a, 215b, 215c can provide additional interactions for one or more users. The digital objects 215a, 215b, and 215c can be different digital objects resulting from identical reference patches 211a, 211b, 211c. Further, the content of the digital objects 215a, 215b, 215c can be dynamic, updating depending on user interactions and/or third-party interactions. The updated objects can be retrieved for overlaying the digital content 213a, 213b, 213c. Note that the reference patches do not themselves retrieve the instructions for overlaying digital content, but rather, the electronic devices each retrieve a specific set of instructions based on the detected reference patch and the unique identifier.

Figure 6D:
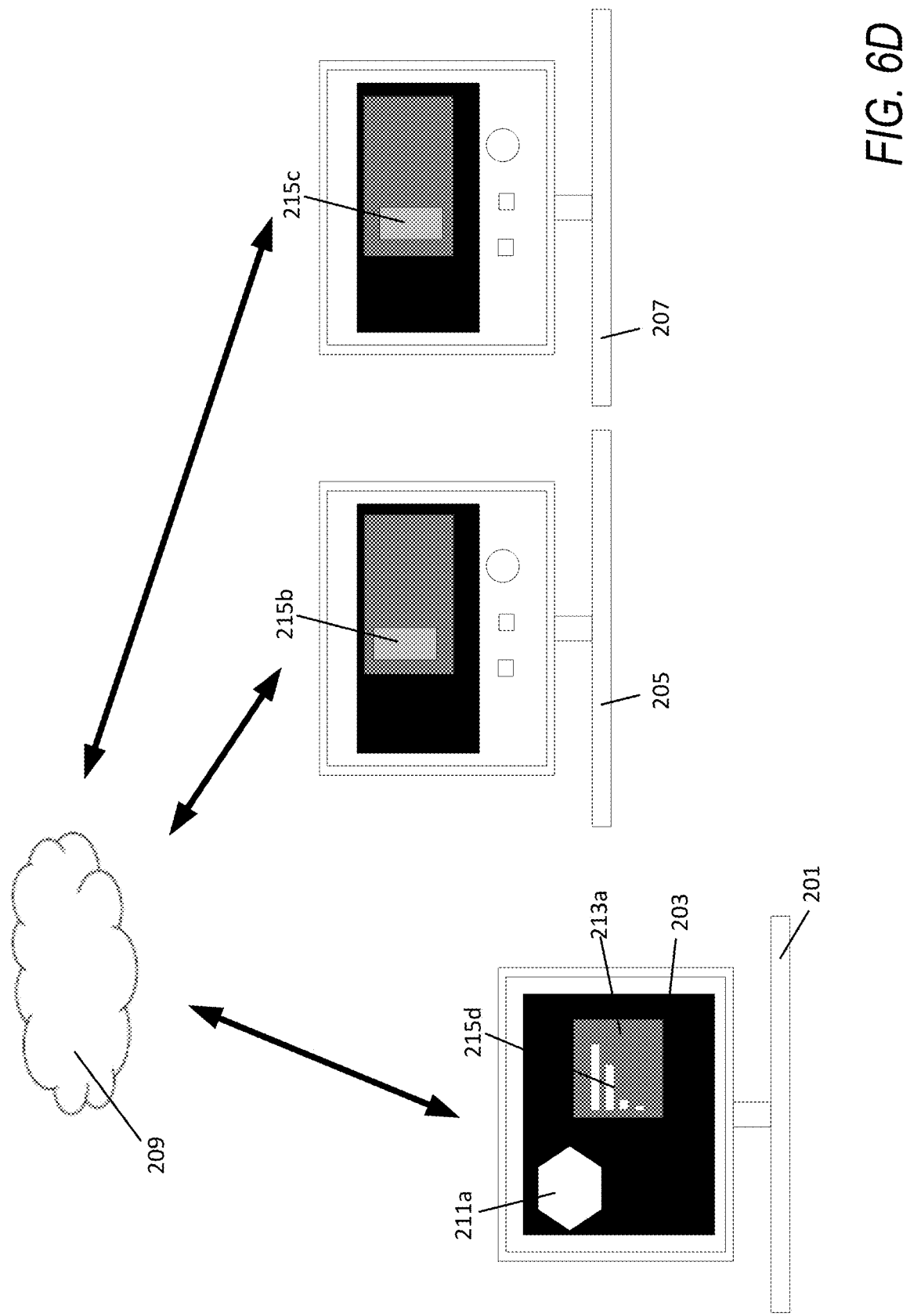
FIG. 6D is an illustration of viewing the results from user interactions, according to an exemplary embodiment of the present disclosure.

As shown in FIG. 6D, the interactions between the electronic devices 205, 207 and the digital objects 215b, 215c can be collected, analyzed, and/or visualized back onto the electronic device 201 as an updated digital object 215d. This digital object 215d can be visible to electronic devices 205, 207 or only visible to the electronic device 201. This could be, for example, survey results, recorded voice or video responses, or images.

Figure 6E:
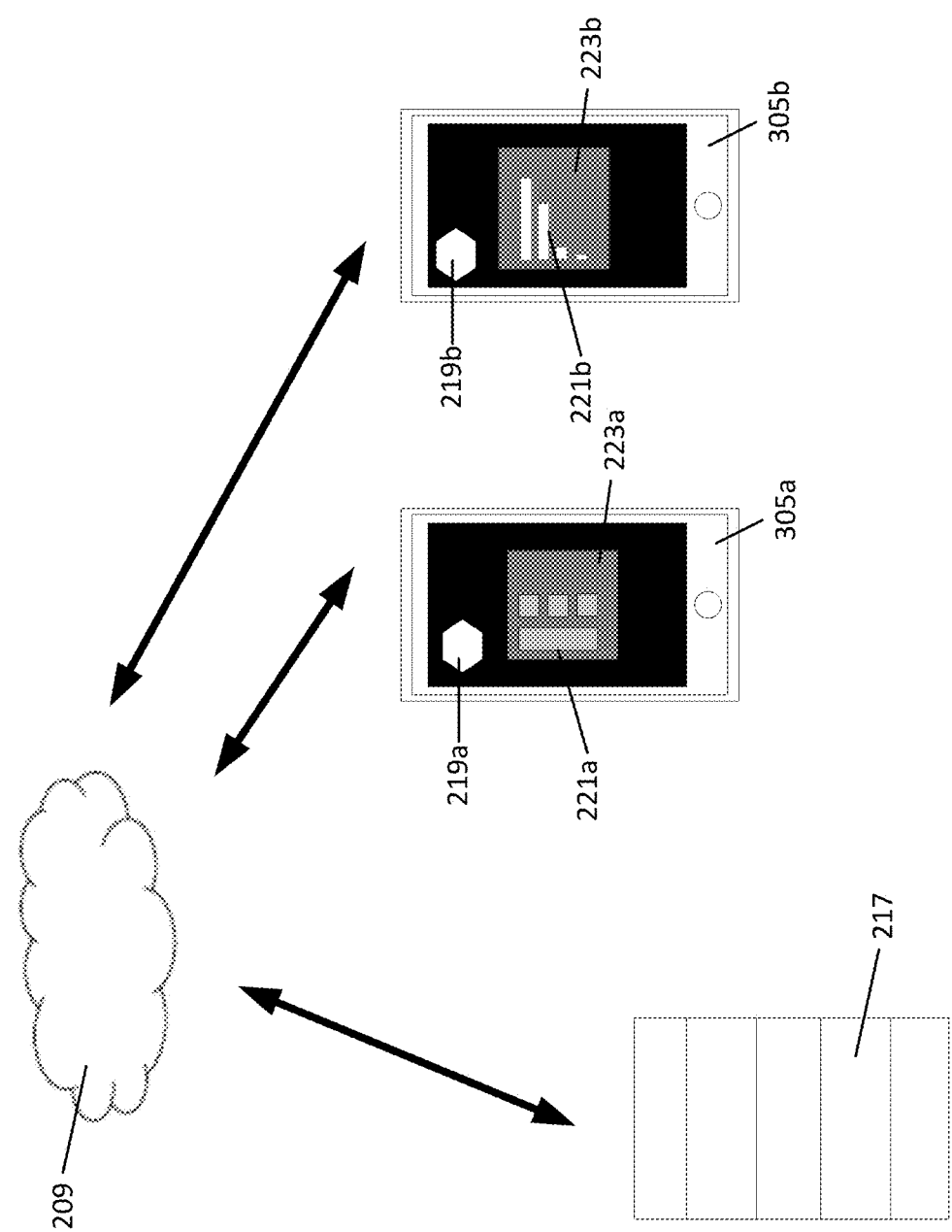
FIG. 6E is an illustration of mobile devices displaying objects from reference patches sent from a server, according to an exemplary embodiment of the present disclosure.

In one embodiment, the electronic device can be any electronic device capable of receiving and/or transmitting a reference patch, such as a server or remotely controlled user device. For example, as shown in FIG. 6E, a server 217 can transmit reference patches 219a, 219b to mobile devices 305a, 305b via a network 209 to retrieve instructions for rendering a set of digital objects 221a, 221b on digital content 223a, 223b, respectively.

Of course, the discussion with reference to FIG. 6A-6E provide one embodiment, and many variations can exist. Additional embodiments will be discussed below.

The digital objects in the digital content can be the same as each other, different, or a combination thereof. Further, the digital objects can be updated depending on a user's interactions. For example, electronic devices receiving a shared screen can have the same set of digital objects, while the electronic device sharing its screen can have a different set of digital objects (or no digital objects at all). As another example, both the electronic device sharing its screen and the electronic devices seeing the shared screen can have the same set of digital objects generated; thereafter the digital objects can be interacted with to generate updated digital objects unique to each user.

To reiterate, the digital content for an augmentation can be different for different electronic devices. The same reference patch can be shown to and/or identified by different electronic devices, but each electronic device can be configured to retrieve different instructions associated with rendering an augmentation based on additional parameters, such as location, IP address, user preferences, user interactions, and/or hardware capability. In other words, the same reference patch shared with multiple electronic devices may be associated with different sets of rendering instructions, and thus different sets of displayed objects, based on the electronic device.

In one embodiment, different electronic devices can retrieve different digital content associated with the same reference patch by providing at least one additional parameter when retrieving the digital content, wherein the at least one additional parameter is specific to each electronic device. In one embodiment, the digital content is customized for each electronic device that identifies the reference patch. In one embodiment, the electronic devices retrieve the digital content from the networked device 750. Each electronic device identifies the reference patch and decodes the unique identifier, including, for example, the encoded data. The unique identifier can reference or be associated with a type of digital content stored in the networked device 750. For example, the unique identifier references a set of images and the location of the set of images in memory in the networked device 750. Each electronic device then transmits the unique identifier to the networked device 750 along with at least one device parameter specific to the respective electronic device. For example, an electronic device can transmit location data and the unique identifier to the networked device 750. Based on the location data, the networked device 750 can transmit an image from the set of images referenced by the unique identifier to the electronic device. The transmitted image can depend on the location of the electronic device. For example, an image of a vehicle with various displayed dimensions in the metric system may be sent to an electronic device that is in France, whereas an image of a vehicle (or the same vehicle) with displayed dimensions in the U.S. customary system may be sent to an electronic device that is in the U.S. Thus, each electronic device can receive different digital content after identifying identical reference patches.

In one embodiment, the networked device 750 can transmit the set of images to the electronic device in response to receiving the decoded unique identifier. The electronic device can then use the location data to determine which image from the set of images to overlay on the displayed data. In one embodiment, the electronic device and/or the networked device 750 can access a mapping function wherein the at least one device parameter is mapped to the digital content. For example, a device parameter is mapped to a location address in memory where digital content is stored.

In one example, one or more user preferences can be used to determine the digital content. In one embodiment, the user preferences can be set in an application running on the electronic device. The electronic device can identify the reference patch and decode the encoded data. The electronic device can then transmit the unique identifier and a user preference to the networked device 750. For example, a user preference can include a preferred language. The networked device 750 can then transmits digital content to the electronic device in the preferred language. The digital content can be referenced by the unique identifier, while the language depends on the user preference of each electronic device. In one example, the electronic device can receive and store multiple versions of the digital content and can display one version of the digital content based on a device parameter. For example, the electronic device can store digital content in multiple languages in memory. After the electronic device identifies the reference patch, the electronic device can retrieve digital content in the language being used by the OS of the electronic device and overlay the digital content on the displayed data. The electronic device and the networked device 750 are both able to determine the customized digital content based on a combination of the reference patch and at least one parameter from the electronic device. In one embodiment, a combination of parameters can be used to determine the customized digital content.

In one embodiment, the networked device 750 can query the electronic device for the data needed to determine the digital content. For example, the electronic device transmits the unique identifier to the networked device 750. The networked device 750 then requests additional data from the electronic device, e.g., a location. Once the electronic device provides the additional data to the networked device 750, the networked device 750 transmits the customized digital content to the electronic device based on the unique identifier and the provided additional data. In one embodiment, the networked device 750 can request security data from the electronic device. For example, a version of the digital content can be password-protected. The networked device 750 can request a password from the electronic device. If the electronic device provides the correct password, the networked device 750 can transmit the protected digital content to the electronic device. If the electronic device does not provide the correct password, the networked device 750 can transmit a different version of the digital content or no digital content at all.

In one embodiment, the unique identifier of the reference patch can indicate the at least one parameter. In one embodiment, the unique identifier can include a property wherein value of the property can be assigned by the electronic device. The unique identifier can then be transmitted to the networked device 750. The networked device 750 can identify the property and transmit the customized digital content to the electronic device. In one embodiment, the unique identifier can include the parameters needed to access the digital content. The electronic device is then configured to determine and transmit the necessary parameters after decoding the unique identifier. Including the parameters in the unique identifier reduces unnecessary data being retrieved and transmitted from the electronic device.

In one embodiment, each electronic device can decode the unique identifier differently. For example, the decoding of the unique identifier can require a key, and each electronic device has a different key. In one embodiment, the networked device 750 transmits a different key to each electronic device. In one embodiment, the application provides a different key to each electronic device for example, upon application installation, based on the at least one parameter of the respective electronic device. Thus, the decoded data for each electronic device will be different, resulting in each electronic device retrieving different digital content. In one example, each electronic device can decode a portion of the unique identifier. Each portion of the unique identifier references different digital content. Thus, each electronic device can retrieve different digital content based on which portion of the unique identifier is decoded. In one embodiment, an electronic device can receive instructions for how to decode the unique identifier. For example, an electronic device in a first region is instructed to decode a first portion of a unique identifier, while an electronic device in a second region is instructed to decode a second portion of the unique identifier.

The networked device 750 is one non-limiting example of a source for transmitting digital content to an electronic device. In one embodiment, a first electronic device can retrieve customized digital content from a second electronic device. The second electronic device can use the combination of the reference patch and at least one device parameter to determine the customized digital content for the first electronic device. For example, a second client/user device 702 transmits the digital content to a first device 701. Combining the reference patch with at least one device parameter expands the potential digital content that can be associated with a single reference patch. In addition, the digital content can be tailored to each electronic device to provide an enhanced user experience for a variety of users. In one embodiment, an electronic device only transmits data from the reference patch without a device parameter and can retrieve generic digital content to overlay onto the displayed data.

Examples of digital content that are rendered on different electronic devices include, but are not limited to, text translations, text definitions, text formatting (e.g., spacing, highlighting, size changes, font changes), image descriptions, image transformations (e.g., color transformations, size transformations), audio output, and animation. In one embodiment, the digital content can be interactive. The electronic device can accept input, e.g., text input, clicks, gestures, touches, audio input, and/or visual input from a user. In one embodiment, the input can be used to change and/or control the digital content. In one embodiment, an object can be interactive on a first electronic device and not interactive on a second electronic device. In one embodiment, digital content can be applied based on a user profile linked to the electronic device.

In one embodiment, the reference patch can be configured such that, even though many electronic devices identify the presence of the reference patch, only those devices meeting certain criteria (e.g. a device type, a current location, an IP address) are able to decode the encoded data of the unique identifier for retrieving and overlaying the digital content; those that do not meet the criteria are blocked from being able to decode the encoded data or retrieving the digital content. In one embodiment, additional data can be incorporated with the reference patch wherein the additional data specifies conditions for displaying the reference patch. In an example embodiment, digital content can be only available to electronic devices in a specified location. In one embodiment, the augmentations can be only available to electronic devices within a geofence. A geofence is a virtual perimeter corresponding to a physical location. Location data from an electronic device is used to determine whether the electronic device is inside the geofence. An example of location data used to identify presence within a geofence is an IP address.

In another example, a reference patch can only be displayed on an electronic device with certain cybersecurity requirements. In one embodiment, an electronic device that does not meet the cybersecurity requirements receives the reference patch as part of the displayed data but cannot display the reference patch (e.g., load the reference patch in a frame buffer) because the electronic device does not meet the requirements. In one embodiment, the electronic device can display the reference patch but does not retrieve the digital content corresponding to the reference patch. As another example, an electronic device can only retrieve digital content when the electronic device is using a private network for Internet access. In another embodiment, digital content is only available to certain users and/or electronic devices (e.g., on a whitelist) or is not available to certain users and/or electronic devices (e.g., on a blacklist) wherein the users are identified by a user profile linked to an electronic device. In one embodiment, the electronic device stores the whitelist and/or the blacklist and applies or does not apply the digital content accordingly. In one embodiment, the whitelist and/or the blacklist can be stored on a server, and the server communicates or does not communicate the digital content to the electronic device based on the whitelist and/or the blacklist. In one embodiment, not all electronic devices receiving a reference patch display digital content. Factors such as hardware capacity or user preferences can be used to override displaying digital content even if a reference patch is identified and the electronic device has access to the digital content.

In one embodiment, different reference patches can be transmitted to selected electronic devices. Various factors can be used to determine whether a particular reference patch is delivered to an electronic device, such as location, hardware capability, user preferences, a user profile and/or identity, security features, and more. For example, electronic devices at a first location can receive a first type of reference patch, electronic devices at a second location can receive a second type of reference patch, and electronic devices at a third location can receive no reference patches. One technique for performing such a task can be only sharing a first reference patch via screen share to electronic devices identified to be located at a first location, while not allowing the electronic devices outside the first location to receive the shared screen. Afterwards, the electronic devices outside the first location receive a different shared screen with a second reference patch, while the electronic devices in the first location do not receive the shared screen. In one embodiment, the unique identifier of each reference patch can be different, thus resulting in each electronic device retrieving different digital content.

In one embodiment, the reference patch can be transmitted using a video being shown on an electronic device. An example of a video is a screen share. The reference patch can be within one or more frames of the video. In an embodiment, the video can be live or pre-recorded.

In one embodiment, the size of the augmentation can vary for each electronic device. In one embodiment, the size of the augmentation can be large enough to contain the secondary digital content being displayed.

In one embodiment, inputs to an electronic device can be used to determine digital content and objects that are overlayed on the display of the electronic device. Examples of inputs include, but are not limited to, audio input, image data, and/or interactions with the electronic devices (e.g., clicking, touching, typing, motion). In one embodiment, an artificial intelligence model is implemented to analyze the inputs and determine digital content that corresponds to the inputs. For example, a speech recognition module (e.g., using Mel frequency cepstral coefficients, vector quantization) detects the phrase "schedule a meeting" and thus triggers an overlay of the digital content, enabling a user to schedule a meeting while still maintaining the original displayed data. In one embodiment, the digital content will only be activated if the phrase is detected and if a reference patch is identified on the displayed data. In another example, a speech recognition module (implemented for example by circuitry of the electronic device) recognizes a language being spoken and ensures that the digital content is presented in that language. The speech recognition module is also operable to directly receive voice commands. For example, the electronic device displays digital content asking a user to choose between two options. The user can then respond by stating his/her preference aloud, and the electronic device will modify the augmentation accordingly. In one embodiment, image data captured by the electronic device (e.g., with a camera) is analyzed and used to provide appropriate digital content. For example, the electronic device uses a computer vision technique (e.g., image classification, object tracking) to detect that a user is confused while viewing the displayed data. The electronic device then overlays digital content designed to help alleviate the user's confusion. In one embodiment, the electronic device is operable to determine conditions of an external environment, e.g., ambient lighting, ambient sound, user location, user position, and the conditions are used to modify and/or create digital content. For example, digital content can include a brightened version of an image when the electronic device is in a low-light environment.

Additional discussion related to various embodiments will now be discussed using exemplary use cases.

In one example, a content creator is running a livestream from their electronic device, such as a Twitch stream or Instagram live, to multiple content consumers. During a point in the livestream, the content creator shows a reference patch on his/her electronic device, thereby generating an augmentation and corresponding digital objects for the content consumers to interact with on their electronic devices. One object from the set of objects could include a survey created by the content creator via his/her device, such as the next game a Twitch streamer should play or the next song a DJ should play, that the content consumer can vote on. After the survey is run, the results of the survey can be shown to the content creator as an object. Optionally, the results of the survey can also be shown to the content consumers. For example, each electronic device displays customized digital content that shows what the user chose compared to the results of the survey. Each digital content overlay can be different depending on the user's survey choice. Another object from the set of objects could allow a user to donate, via his/her device, to the content creator, guiding him/her through the steps of selecting a donation amount and entering payment information. Lastly, a third object from the set of objects could be shown to selective content consumers, such as those who have paid extra to have additional privileges (e.g., a VIP package). While every electronic device viewing the livestream receives, displays, and identifies the same reference patch, only electronic devices associated with user profiles that have access to the additional privileges can display the third object intended for those user profiles.

Further on the above example, a third party can use an electronic device to generate the reference patch on the electronic device of the content creator to generate an augmentation on the electronic devices of the content consumers. This can be useful in cases where the original content creator is pre-occupied. For example, a Twitch streamer may be viewing a screen shared with them by their manager (i.e. third party) on a small portion of their screen, while the rest of their screen is dedicated to playing a match that is being streamed to the electronic devices of multiple content consumers. When desired, the manager can share a reference patch on their screen, which will be shown on the screen of the Twitch streamer, and subsequently, streamed to the screens of the content consumers. The reference patch is identifiable regardless of its source as long as it is displayed on an electronic device. Additionally, the manager can configure that reference patch so that the electronic device being used by the Twitch streamer will not have the digital content generated (e.g., by blacklisting an IP address), while other electronic devices watching the stream do overlay the digital content.

In one embodiment, a plurality of electronic devices can be configured to merge displayed data including a reference patch into a single display wherein the single display is controlled by the plurality of electronic devices. For example, a first electronic device can be streaming a video to a plurality of second electronic devices. A third-party electronic device, which can also be viewing the video stream from the first electronic device, generates and inserts a reference patch into the video, and the reference patch is then also streamed to the plurality of second electronic devices and used to create digital content on the video stream for each of the plurality of second electronic devices. The first electronic device and the third-party electronic device are both able to control the display. Enabling a plurality of electronic devices to control a display and reference patches enables administrative oversight and is also helpful in situations where a single user is unable to manage the displayed data.

As another example, a PowerPoint can be shown during a teleconference meeting (e.g. Zoom, Skype). When a slide containing a first reference patch is reached, an augmentation containing a set of objects associated with the first reference patch is generated on each attendee's screen by their respective electronic devices. One object asks the meeting attendees about their opinion on a certain issue. Thereafter, each attendee can record his/her thoughts via text, voice message, video recording, etc. using the additional objects. After everyone has submitted their thoughts, the user sharing the PowerPoint shows a next slide, without a reference patch, thereby removing the augmentations on the attendees' screens. Later, a second reference patch is shown on the last slide of the PowerPoint. The reference patch results in each electronic device generating an augmentation having an object asking the meeting attendees if they would like to be sent a copy of the PowerPoint. For those who select yes, updated objects can be shown on the augmentation asking them for their email address, preferred language and format of the PowerPoint, etc.

As another example, during a teleconference, the device associated with a first user (e.g., the presenter) can display a presentation (e.g., in the English language). A reference patch is included in each frame of the presentation. Via the augmentation noted above, this presentation may be shown on a device of a second user (a participant) in another language (e.g., Japanese), while being shown on a device of a third user (another participant) in yet another language (e.g., French). Hence, by identifying the reference patch and retrieving corresponding digital content, different users can see different content. The different languages can be implemented in a variety of ways, for example, by an automated translator (e.g., Google Translate).

In one embodiment, the above example can be accomplished as follows: (1) the device associated with the first user (i.e. first electronic device) displays, within the presentation, one reference patch to the device associated with the second user (i.e. second electronic device) and the device associated with the third user (i.e. third electronic device) through screen sharing a presentation; (2) the second electronic device and the third electronic device detect the reference patch (discussion on how a reference patch can be identified is discussed in more detail below); (3) the second electronic device and the third electronic device retrieve digital content from a server based on the detected reference patch; (4) the second electronic device and the third electronic device render and display the digital content over the presentation; and (5) the digital content includes a translation of the presentation (e.g., using Google Translate) displayed on the second electronic device and the third electronic device according to a preferred language pre-set for the second electronic device (e.g. Japanese) and for the third electronic device (e.g., French). The preferred language can be set at the electronic device, e.g., in an app setting. Alternatively or additionally, the preferred language can be automatically detected based on the location of the electronic device or the language used by the operating system of the electronic device.

Additionally or alternatively, the example can be accomplished as follows: (1) the device associated with the first user (i.e. first electronic device) stores a first version of the presentation pre-translated into Japanese and a second version of the presentation pre-translated into French onto a server; (2) the first electronic device displays one reference patch to the device associated with the second user (i.e. second electronic device) and the device associated with the third user (i.e. third electronic device) through screen sharing of the presentation (written in English), (3) the second electronic device and the third electronic device detect the reference patch; (4) the second electronic device, which is located in Japan, is configured to retrieve from the server the presentation pre-translated into Japanese and to generate digital content with the presentation pre-translated into Japanese overlaid on the original presentation; (5) the third electronic device, which is located in an English-speaking region of Canada, overrides the generation the digital content, and continues viewing the presentation in English.

As another example, a recorded video (e.g., YouTube video) on trucks is being watched by two people. At one point in the video, a reference patch is shown. In one embodiment, the reference patch can be generated and added to the video by a video-hosting platform/server (e.g., YouTube). In one embodiment, the reference patch can be generated and added to the video before the video is uploaded to the video-hosting platform/server (e.g., YouTube) and is still visible. Depending on factors such as the particular video being shown, location of the viewer, viewer demographics, viewing history, etc., secondary digital content related to and/or targeting the user can be generated by and shown on the electronic devices displaying the recorded video. For example, the first person could see an object in his/her digital content for scheduling a visit to truck dealerships located near his/her location, while the second person could see an object for scheduling a visit to truck dealership located near his/her (different) location. Furthermore, those who indicate that they are interested in visiting a dealership can schedule an appointment on an updated object directly in the digital content (without having to leave the page). In one embodiment, additional data including, but not limited to, Internet browsing history and associated metrics (clickthrough activity, time spent, redirects), web cookies, web tokens, and similar device usage tracking mechanisms can be used to generate digital content.

As another example, a TV network can send reference patches to viewers watching a football game. These reference patches can allow the viewers to have objects overlaid over the football game (e.g., bets, social media posts, live reactions, polls) for the user to interact with; some of these interactions can then be compiled by the TV network and shared with other viewers to provide for a more dynamic watching experience. Furthermore, during commercials, additional reference patches can be shown asking users if they would like to learn more about a particular product/service; for those who indicate yes (e.g., by voice), an augmentation showing related objects can be added to the display. Thus, different viewers may receive different digital content/augmentations. In one embodiment, digital content can include an application programming interface (API) call to an external or third-party application in order to integrate the services of the external application. For example, the digital content can enable an electronic device to log in to a third-party social media platform and read and/or create social media posts on the third-party social media platform using a visual overlay on top of the original displayed data. In another example, the digital content can enable an electronic device to log in to a third-party payment platform in order to transfer funds.

As another example, digital content can be used to accommodate differences in a user's ability to process the displayed data. Accessibility as a design principle enables a wider range of people to perceive and interact with displayed data by accommodating visual impairments and other conditions that make it difficult for a user to process displayed data. For example, people with impaired color vision are unable to navigate displayed data where color, and especially low-contrast color, is the only visual means for communicating information. A user who cannot distinguish the color red may be unable to tell when an error message is outlined in red, and the error message will not attract their attention in the intended manner. To solve this issue, digital content can be added to the displayed data wherein the digital content includes a text box next to the red outline to indicate that there is an error that needs to be addressed. Alternatively, or additionally, digital content can transform the color and/or contrast of the display to improve visibility of the error message. Alternative text, or alt text, is another feature of accessible design wherein images are accompanied by written descriptions. The written descriptions are useful if the images cannot be loaded, if a user is unable to see an image, or if a user is using a screen reader to access the displayed data. In one embodiment, an augmentation can include alternative text. Additional embodiments of augmentations to displayed data can be used to meet the Web Content Accessibility Guidelines published by the Web Accessibility Initiative. In one embodiment, each electronic device can apply different accessibility augmentations based on user needs. For example, a first electronic device receiving displayed data can identify a reference patch and apply alternative text to images while a second electronic device can receive the same displayed data with the same reference patch and apply contrast modifications to the displayed data based on the settings of each electronic device and/or a user input.

The techniques discussed herein are not limited to being applied in situations where one electronic device is simultaneously transmitting a reference patch to multiple electronic devices. Such techniques can also be applied in situations where one electronic device is transmitting a reference patch to one electronic device at a given time. Although an electronic device transmits a reference patch to one electronic device for generating an augmentation with objects, it can later transmit the same reference patch to a different electronic device for generating an augmentation with differing objects. An example of this interaction will be discussed below.

Figure 7A:
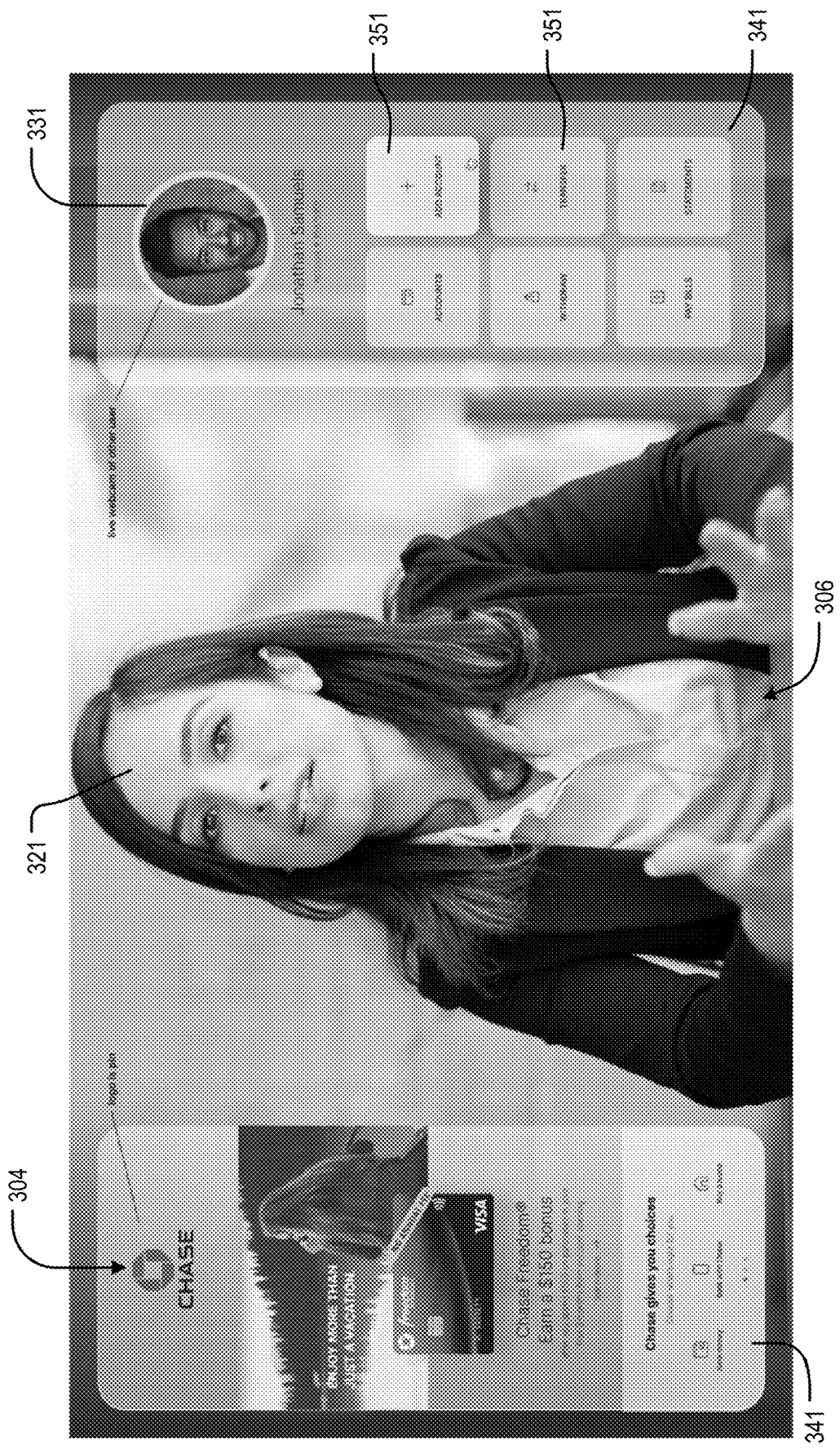
FIG. 7A is an illustration of an implementation of a method, according to an exemplary embodiment of the present disclosure.

With reference now to FIG. 7A through FIG. 7K, an exemplary implementation of a live stream video augmentation will be described. In the exemplary implementation, a user may be a bank teller 321 discussing a new savings account with a potential bank member 331. The bank teller 321 may initiate the video call with the potential bank member 331. Initially, the bank teller 321 may ask the potential bank member 331 various questions, such as their location, language preference, task they would like to accomplish, etc., to determine the appropriate reference patch that should be sent. For example, one reference patch can be transmitted if a user wants to open a new saving account, while a different reference patch can be transmitted if a user wants to apply for a loan. After the appropriate reference patch has been chosen, the bank teller 321 may include, within a video stream being transmitted from the bank teller to the potential bank member, a reference patch 304. In the example of FIG. 7A, the reference patch 304 is a logo. The transmitted video stream may include a video feed 306 generated by a camera associated with a device of the bank teller 321. Accordingly, the transmitted video stream may include an image of, for instance, a face of the bank teller 321 and the reference patch 304 therein. Upon receiving the video stream, a device of the potential bank member 331 may process the video stream and identify the reference patch 304. Accordingly, the device of the potential bank member 331 may obtain rendering instructions for an augmentation 341 corresponding to the reference patch 304 and then generate digital content as a local augmentation on a respective display of the device in order to allow the potential bank member 331 to be able to interact with the bank teller 321 and establish the new savings account. The rendering instructions can take into consideration various parameters related to the potential bank member 331 and/or their device to generate digital content tailored to their needs. For example, certain account information may be loaded automatically based on previous information provided by the potential bank member 331. The augmentation 341 may be generated on top of the live video stream 306 of the bank teller 321. The augmentation 341 can include a number of objects 351 to be displayed and may be configured to display different subsets of objects based on interactions of the potential bank member 331 with the augmentation 341, as the objects 351 can be interactive in some cases. This allows for the augmentation 341 to be updated in response to user interactions. As the potential bank member 331 interacts with the augmentation 341, their device can retrieve updated instructions for rendering different, updated objects 351 on the augmentation 341 in response to the potential bank member's 331 specific interactions with the device. Therefore, in theory, multiple potential bank members can open a new savings account by viewing the video stream without any two of them seeing the exact same set of objects in the digital content. The reference patches on the video stream can enable each electronic device for each potential bank member to generate digital content throughout the process that are specific to the potential bank member. For example, the digital content can include the bank member's name and personal information. The data collected by the digital content can be kept segregated and secure from data collected by digital content on other electronic devices.

Figure 7B:
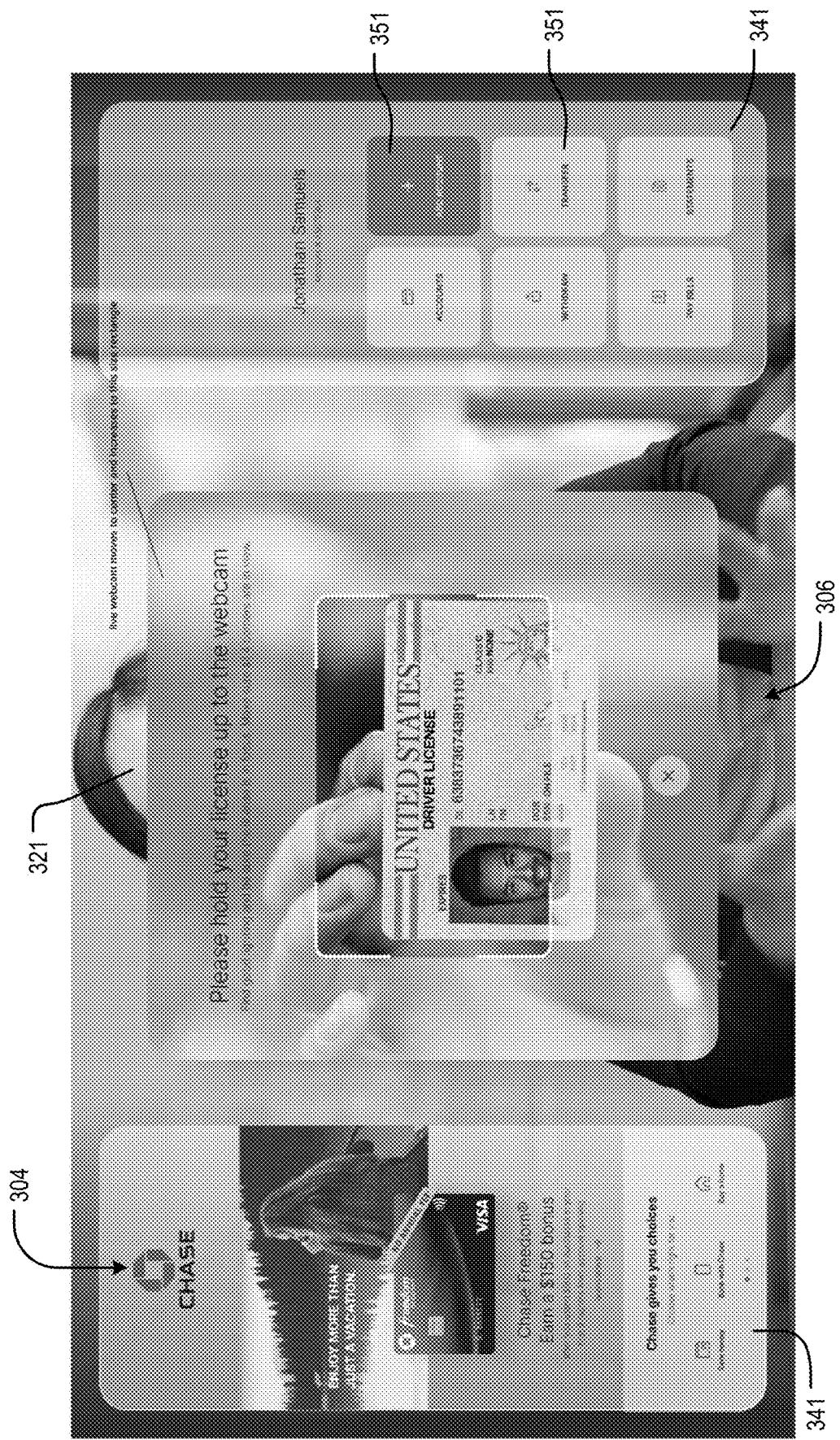
FIG. 7B is an illustration of an implementation of a method, according to an exemplary embodiment of the present disclosure.
Figure 7C:
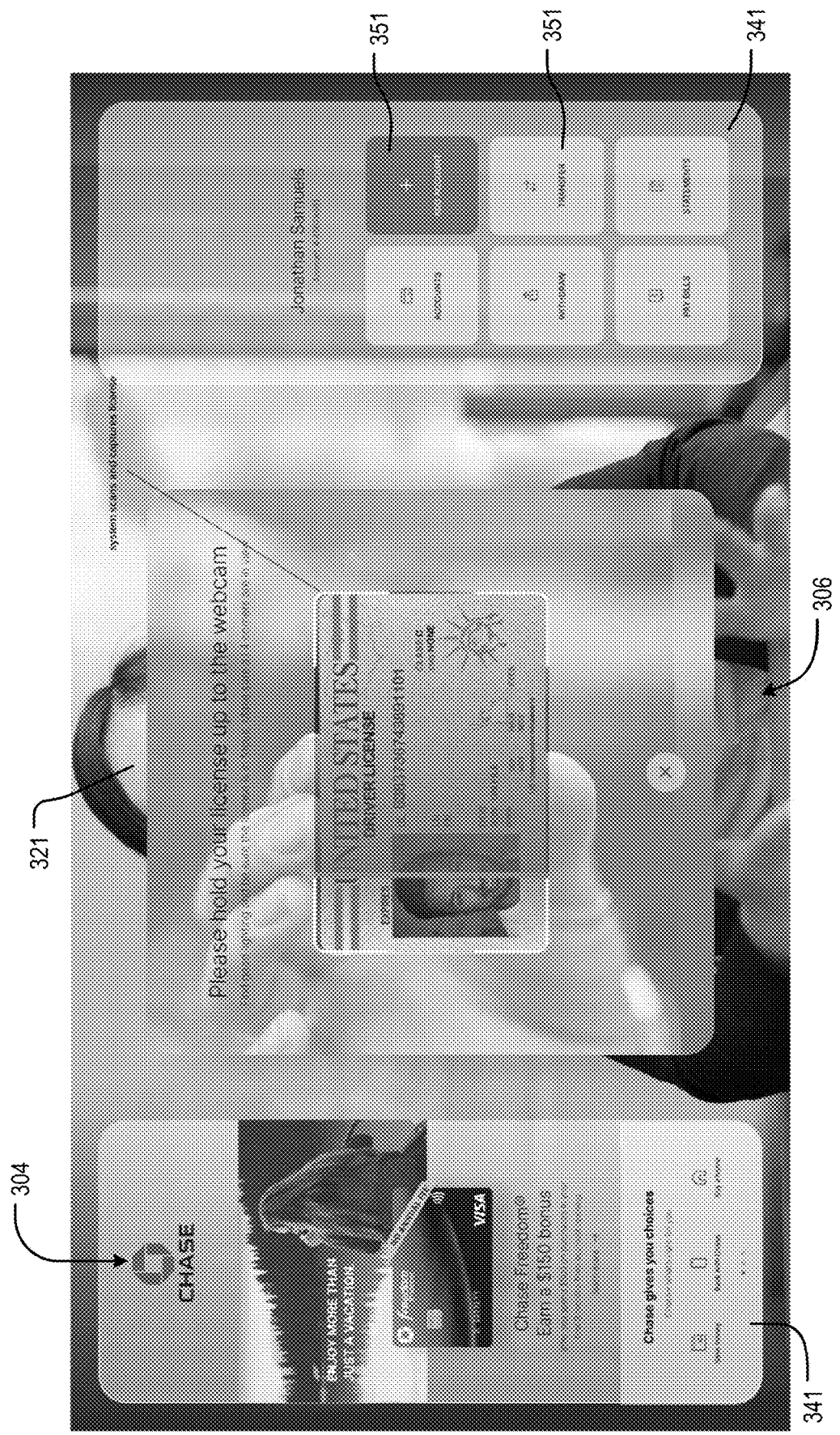
FIG. 7C is an illustration of an implementation of a method, according to an exemplary embodiment of the present disclosure.
Figure 7D:
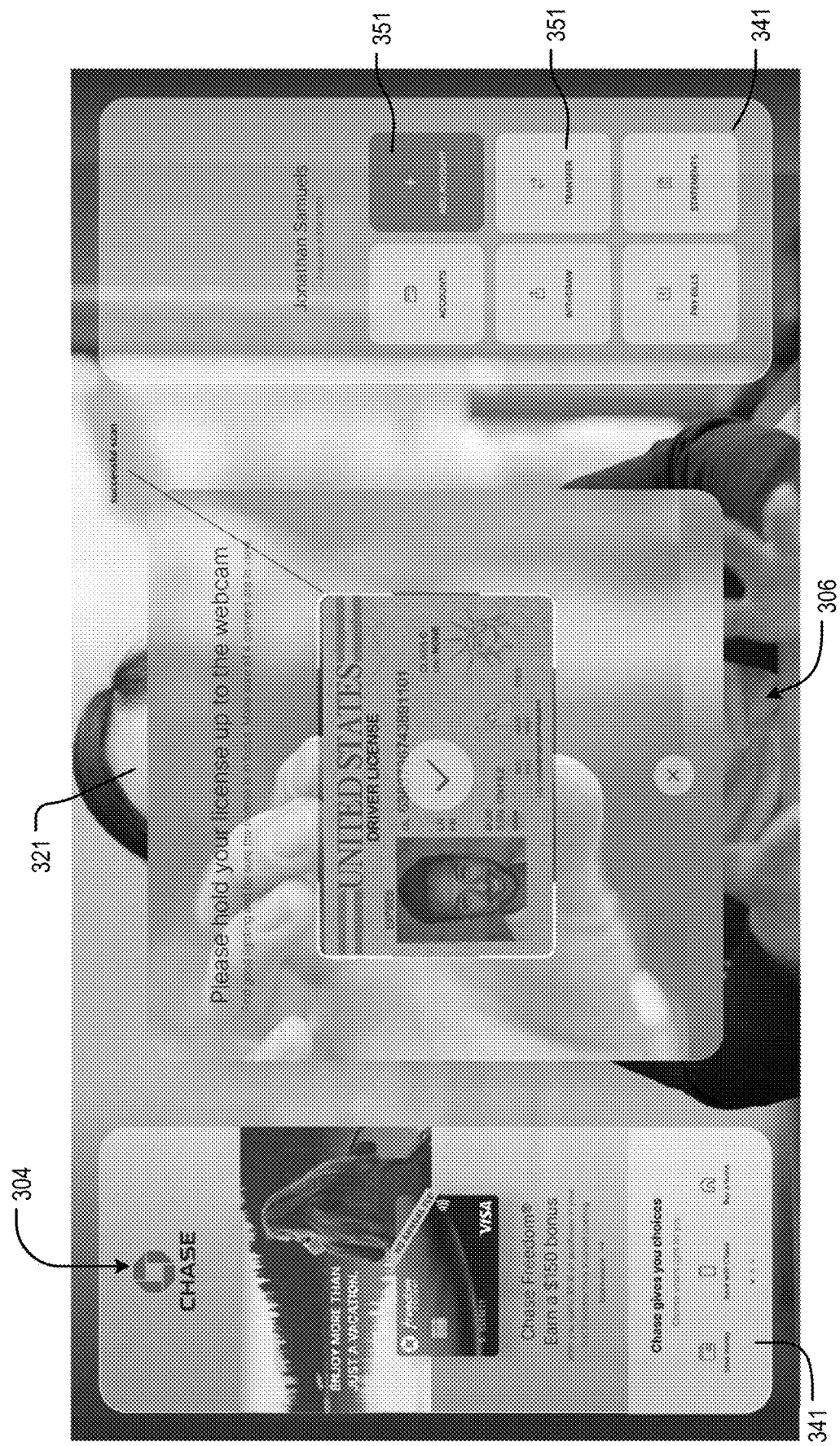
FIG. 7D is an illustration of an implementation of a method, according to an exemplary embodiment of the present disclosure.
Figure 7E:
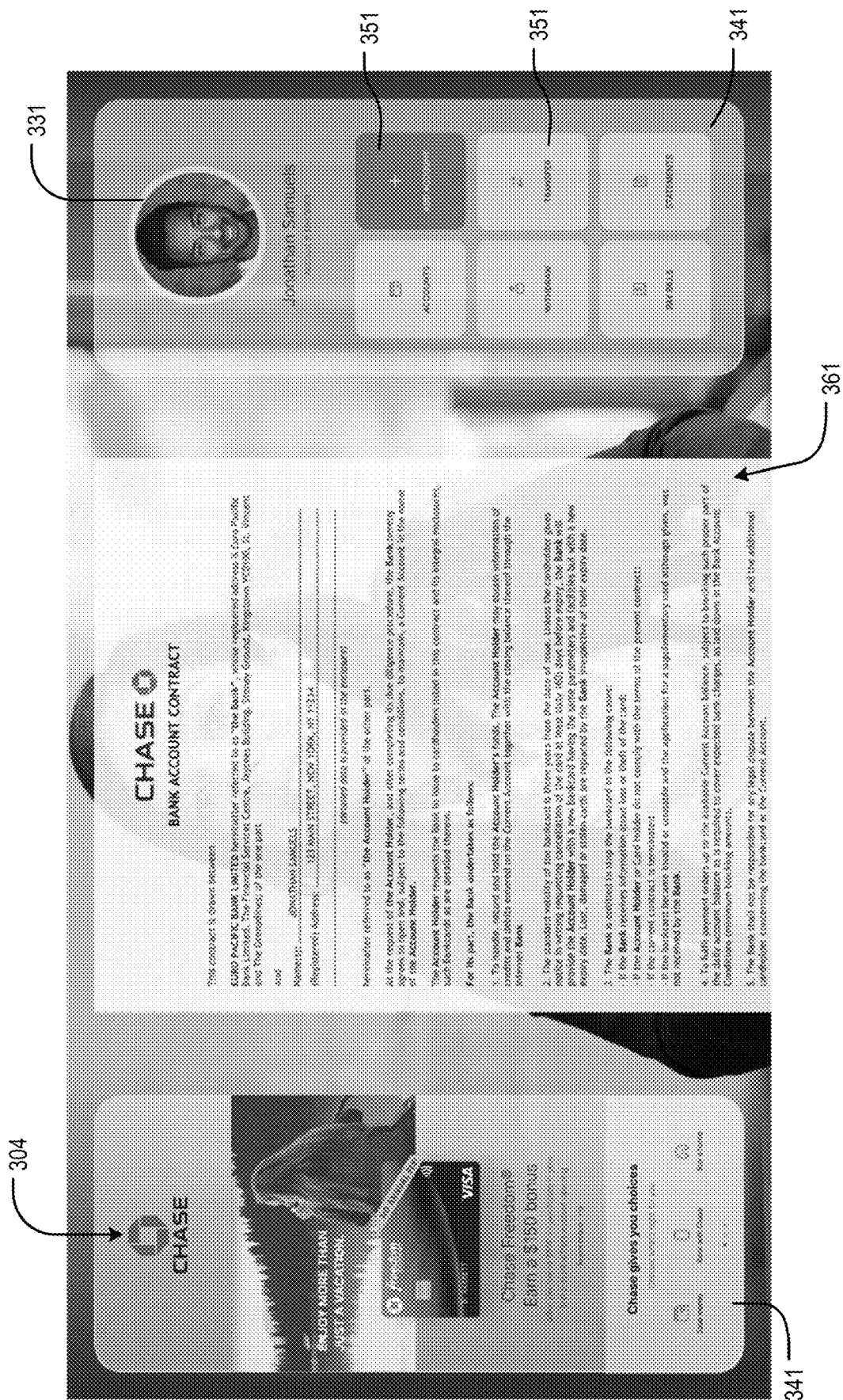
FIG. 7E is an illustration of an implementation of a method, according to an exemplary embodiment of the present disclosure.
Figure 7F:
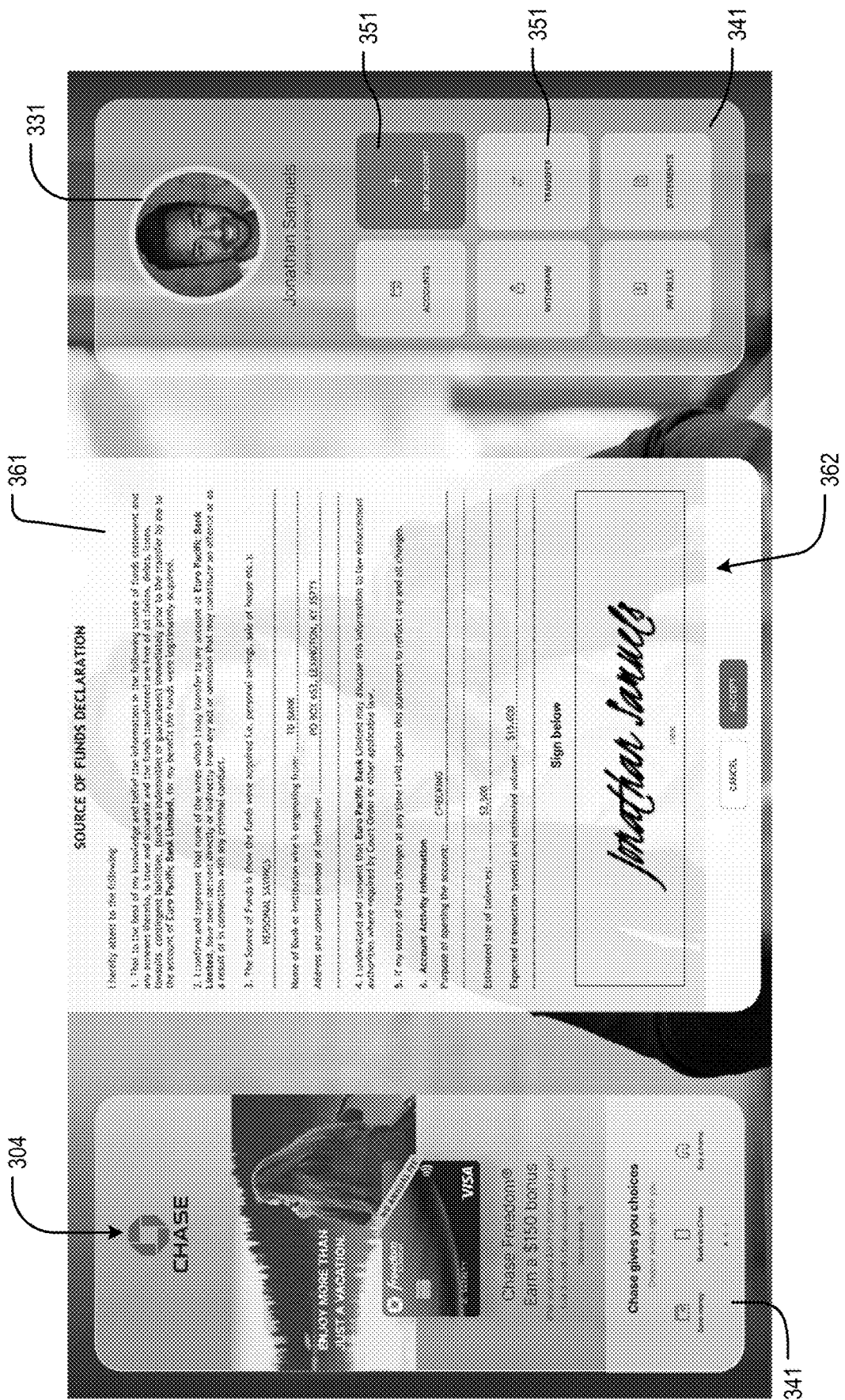
FIG. 7F is an illustration of an implementation of a method, according to an exemplary embodiment of the present disclosure.
Figure 7G:
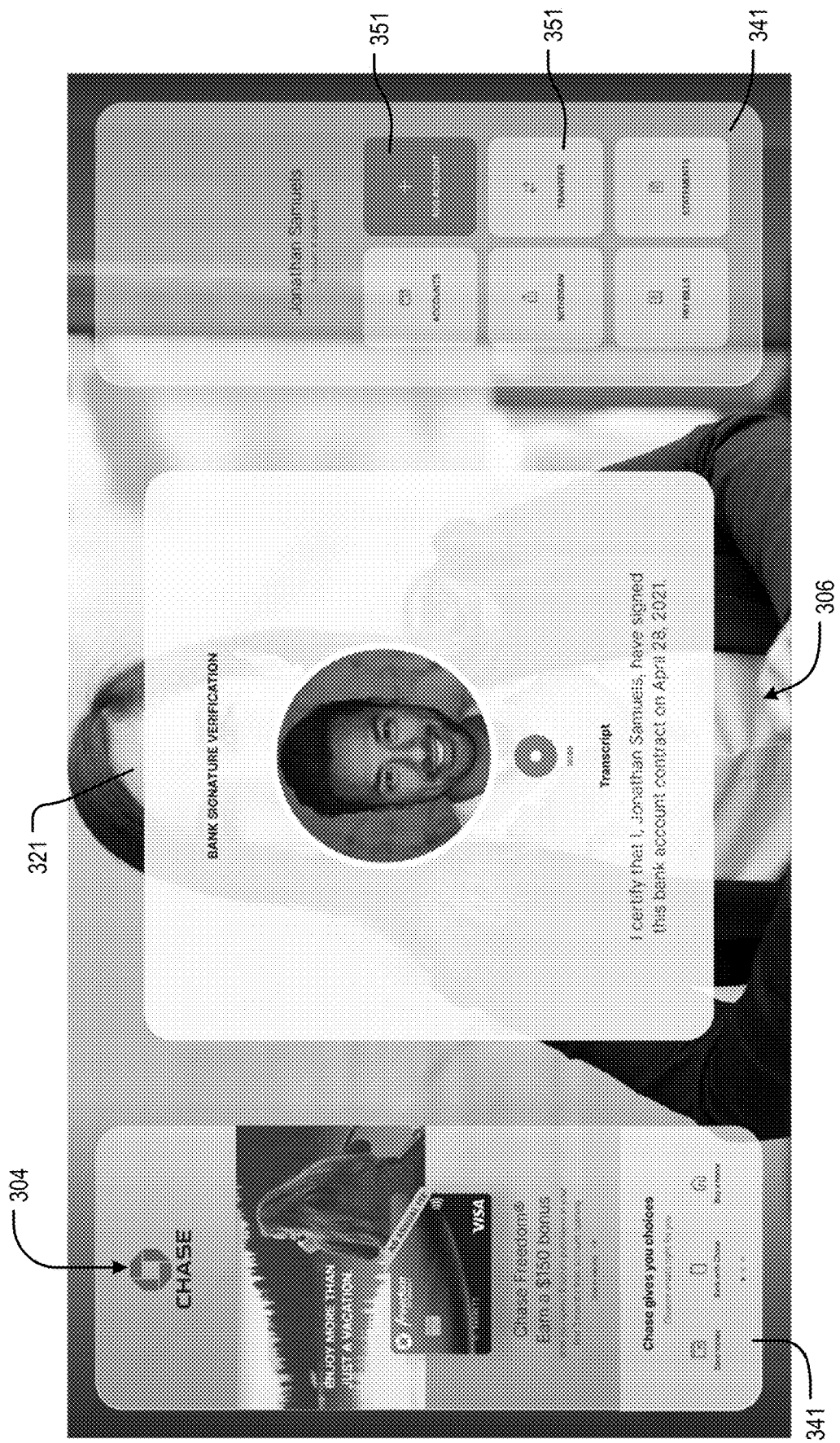
FIG. 7G is an illustration of an implementation of a method, according to an exemplary embodiment of the present disclosure.
Figure 7H:
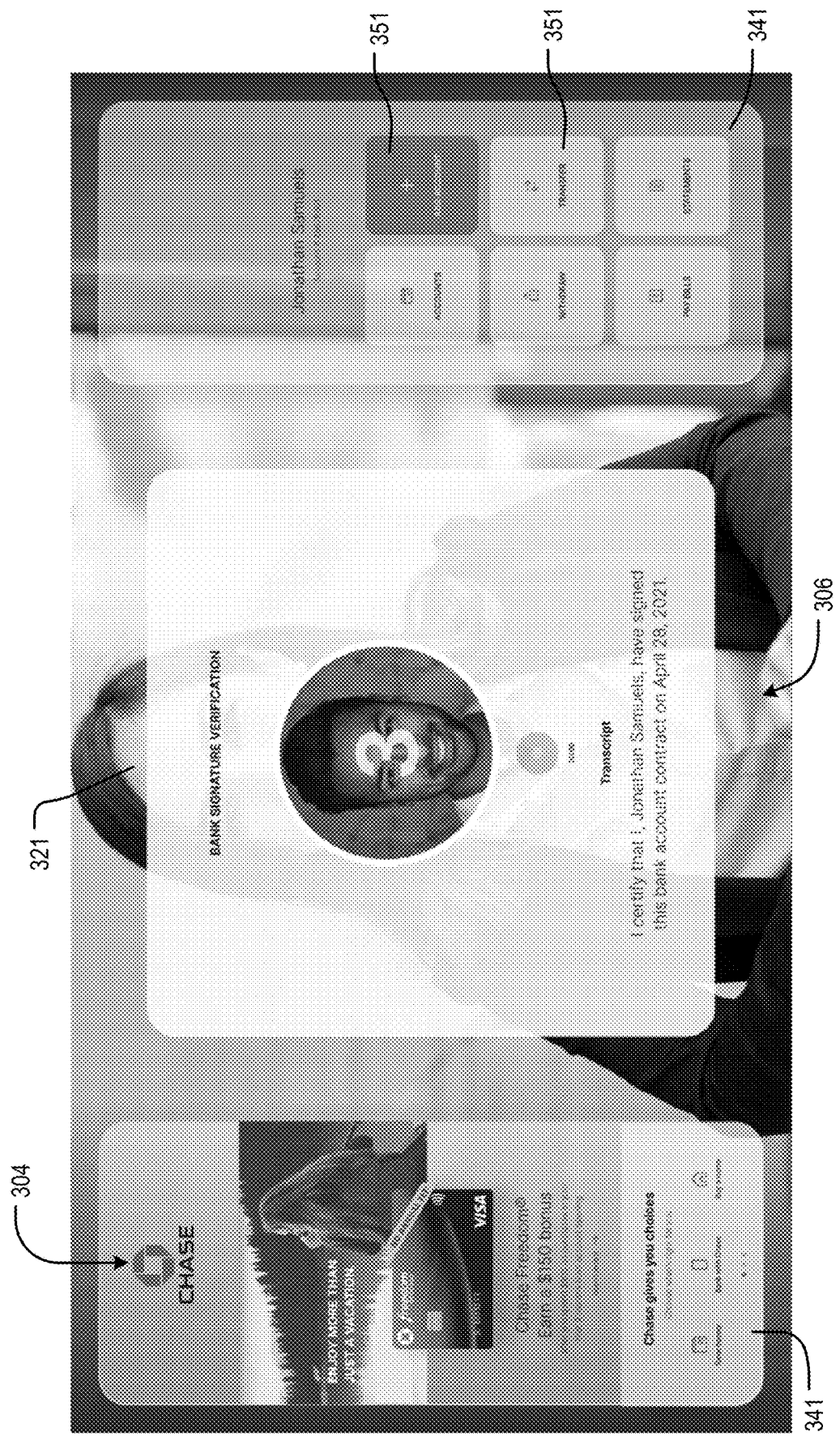
FIG. 7H is an illustration of an implementation of a method, according to an exemplary embodiment of the present disclosure.
Figure 7I:
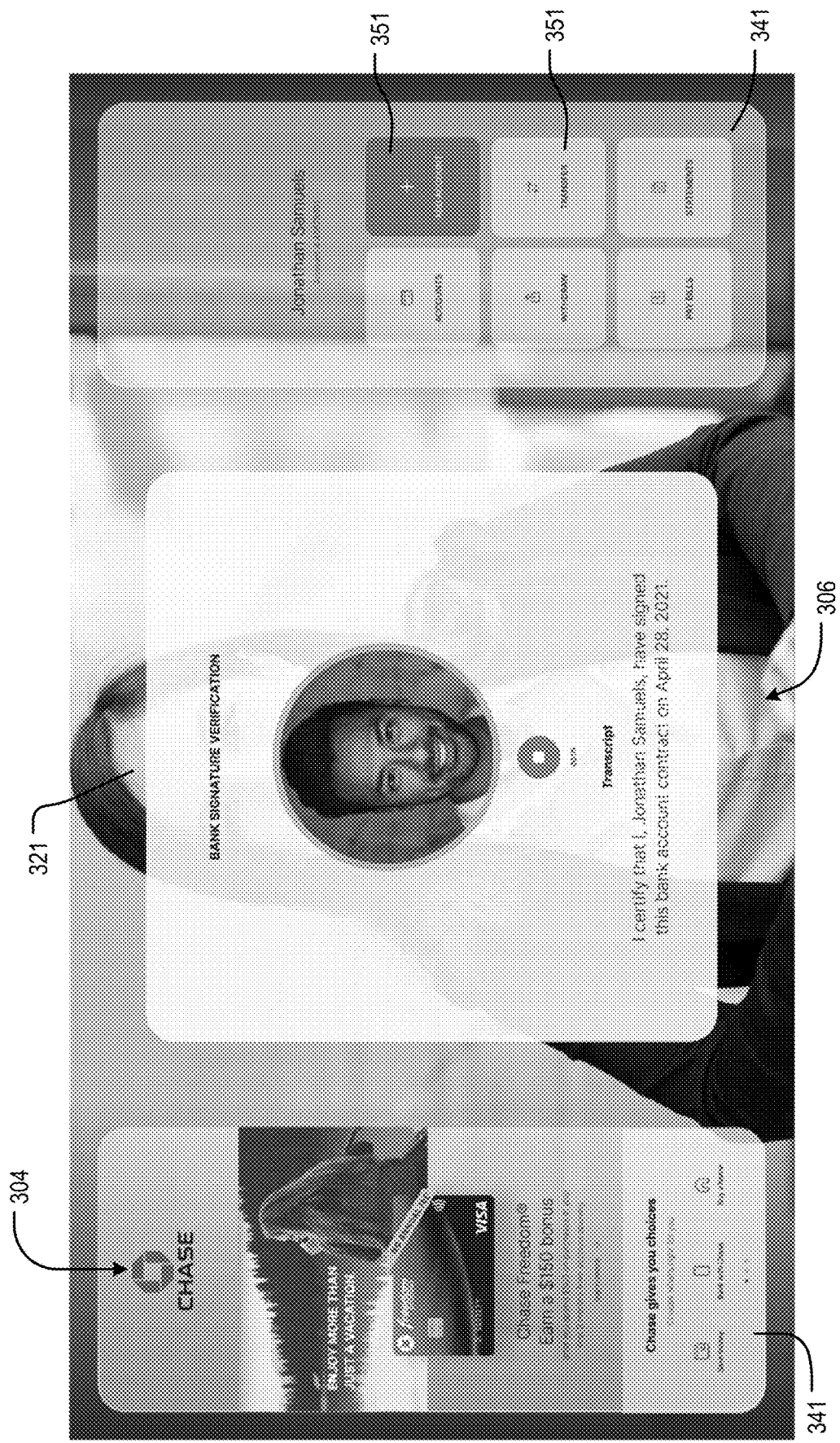
FIG. 7I is an illustration of an implementation of a method, according to an exemplary embodiment of the present disclosure.
Figure 7J:
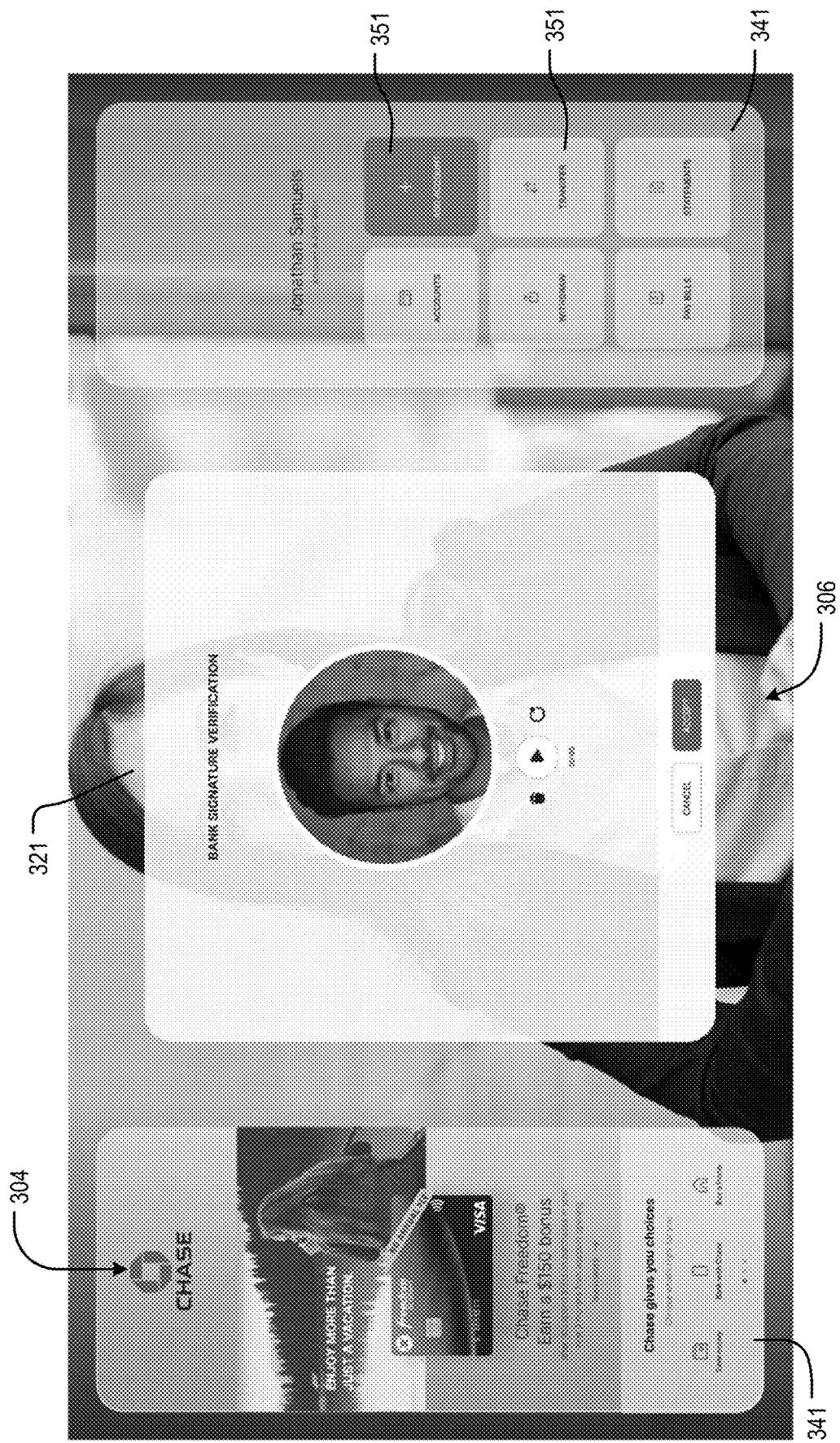
FIG. 7J is an illustration of an implementation of a method, according to an exemplary embodiment of the present disclosure.
Figure 7K:
FIG. 7K is an illustration of an implementation of a method, according to an exemplary embodiment of the present disclosure.

For instance, an updated augmentation may reflect a step-by-step process of opening the new savings account, the digital content being updated at each step according to the interactions with the device. With reference to FIG. 7B through FIG. 7D, the augmentation 341 may first require confirmation of the identity of the potential bank member 331. This can include instructing the potential bank member 331 to exhibit their driver's license such that an image of the driver's license can be obtained. As shown in FIG. 7C, a guide can be deployed and a confirmation graphic can be displayed, as in FIG. 7D, when an adequate image of the driver's license has been obtained. The confirmation of identity may also include instruction related to and acquisition of an image of the potential bank member 331. Next, the augmentation 341 may present a banking contract 361 to the potential bank member 331, as shown in FIG. 7E. As shown in the FIG. 7F, the potential bank member 331 may then review and provide a signature 362 if the banking contract 361 is approved. Lastly, the augmentation 341 can request the potential bank member 331 to provide verbal confirmation of the approval of the bank contract 361. As shown in FIG. 7G, the potential bank member 331 may be prompted with a transcript that is to be read back and recorded via the augmentation 341 to confirm the approval of the potential bank member 331. As shown in FIG. 7H and FIG. 7I, the potential bank member 331 may be shown a countdown and an indication of live recording. FIG. 7J illustrates an aspect of the augmentation 341 that allows the potential bank member 331 to review the recorded spoken transcript approving the bank contract 361. Once completed, as shown in FIG. 7K, the augmentation 341 can display a congratulatory graphic and welcome to the newest member of the bank. Each of these steps can be associated with a same reference patch corresponding to an augmentation that guides the 'new' bank member along the account setup process.

In one embodiment, a reference patch can correspond to a sequence of digital content where a history of digital content and/or interactions is used to determine a next digital content in the sequence that is retrieved. For example, the same reference patch can be used to trigger a sequence of digital content in order. In one embodiment, once an electronic device has displayed a first piece of digital content, the electronic device can be configured not to t display the first piece again but instead to progress through the sequence to a next piece of digital content. In one embodiment, the electronic device and/or a server can log which digital content has been retrieved and displayed in order to queue the correct next piece. In one embodiment, the history and sequence can be preserved even if the reference patch is no longer displayed. For example, a first piece of digital content in a sequence is displayed when a reference patch is visible in a window. The window containing the reference patch is then closed, and the reference patch and the digital content are no longer displayed. When the window is reopened and the reference patch is displayed, the electronic device can retrieve the next piece of digital content in the sequence rather than repeating the first piece. In one embodiment, the history of accessed and displayed digital content can be stored for a single session, e.g., on volatile memory.

In one embodiment of the present disclosure, the reference patch can be used to create digital content for a presenter device wherein the augmentations for the presenter device are not visible on other electronic devices receiving, displaying, or interacting with the displayed data. In one embodiment, the presenter device refers to an electronic device (for example, the first device 701 in FIG. 1 or device 201 in FIG. 6C) used to create, present, control, and/or share the displayed data with at least one second electronic device (for example, the second client/user device 702 in FIG. 1 or device 205 in FIG. 6C). For example, as illustrated in FIG. 6C, a presenter device is sharing a presentation to an audience. The presenter device 201 shares its screen with a plurality of audience devices 205, 207. A reference patch on the screen enables the presenter device 201 to overlay presenter augmentations wherein the presenter augmentations consist of digital content that is only visible on the presenter device 201. In one embodiment, the same reference patch is displayed on the presenter device as well as at least one second electronic device. However, the digital content displayed on the presenter device and the at least one second electronic device are different, and the presenter augmentations are only accessed and displayed on the presenter device. For example, the presenter device 201 displays digital content 213a with a status message. The status message of digital content 213a is only visible on the presenter device 201, while the audience devices 205, 207 display different digital content, 213b and 213c, respectively.

In one embodiment, the presenter device can be configured to retrieve the presenter augmentations from a networked device 750 (for example, a server) when the reference patch is identified. The server can verify that the device is a presenter device before providing the presenter augmentation. In one embodiment, the server can verify the device using at least one device parameter, including, but not limited to, a location, a model, a software version, a usage history, and/or a security configuration. In one embodiment, the server can verify a user account associated with the device. In one embodiment, a device is considered a presenter device if the device is broadcasting data to at least one second electronic device, e.g., via screensharing, via a networked connection. In one embodiment, the presenter augmentations can be stored locally on the presenter device, e.g., in memory space. Thus, only a presenter device is able to access the presenter augmentations.

Examples of digital content for a presenter device include, but are not limited to, text (e.g., a script, presentation notes, questions, answers, chat functions), images, audio, and video. In one embodiment, presenter augmentations can include dynamic digital content. Digital content that is only visible on the presenter device can be presented in a presenter layer, while digital content that is visible on the plurality of second electronic devices is presented in a projector layer on each of the plurality of second electronic devices wherein the presenter layer and the projector layer are overlaid on top of the original displayed data. In one embodiment, the projector layer can be visible on the presenter device as well as the plurality of second electronic devices. Digital content on the presenter layer can also be communicated to and/or duplicated on the projector layer to be displayed on the plurality of second electronic devices. The presenter layer allows a presenter or presenters to view dynamic content that enhances the presentation without negatively impacting the viewers' viewing experience. Limiting the presenter layer to the presenter data can also maintain data confidentiality.

In one embodiment, the presenter augmentations can be displayed using interactive display objects (e.g., tabs, windows) wherein the presenter can use the presenter device to select an interactive display object (e.g., clicking a tab) in order to display a presenter augmentation. In one embodiment, presenter augmentations can be prepared and stored in memory (e.g., local memory, cloud-based memory) before the displayed data is displayed. In one embodiment, presenter augmentations can be created and/or edited in real time or near real time while the displayed data is being displayed.

In one embodiment, the presenter device can use audio data and/or image data to update the dynamic digital content of a presenter augmentation. In one embodiment, the presenter device is configured to use artificial intelligence to process audio data (e.g., automatic speech recognition, speech-to-text, natural language processing) and/or image data (e.g., computer vision, image recognition). For example, the presenter device can include a microphone wherein the microphone captures audio data. A presenter augmentation can include a script wherein the script scrolls to present text that matches what the presenter is saying, thus providing a smart teleprompter system. In another example, the presenter augmentation can alert the presenter when the presenter is speaking too quickly or too slowly. In one embodiment, the presenter device is configured to recognize spoken keywords and topics and display additional information as digital content in a presenter augmentation. In one embodiment, the additional details can be stored on a server and communicated to the presenter device as digital content in response to live audio data captured by the presenter device. In another example, the presenter device can include a camera. The camera captures images of the presenter, and the presenter augmentation can include suggestions for body language and/or facial expressions based on the image data.

In one embodiment, dynamic presenter augmentations can be updated in real time or near real time as a presentation progresses to provide the most useful information to a presenter. For example, the dynamic presenter augmentations include speaking notes including, but not limited to, pacing prompts (e.g., slow down, speed up, take a break), timestamp or scheduling information, additional information related to displayed data being displayed, and/or feedback from the plurality of second electronic devices. In one embodiment, the dynamic presenter augmentations can include a live audio and/or video feed, e.g., from a third-party electronic device. For example, a public speaking coach is observing the presentation on a third-party electronic device and provides live feedback to the presenter device via a video feed from the third-party electronic device. The presenter device displays the video chat while the plurality of second electronic devices in the audience do not display the video chat.

In one embodiment, the presenter augmentations can be based on audio data, image data, and/or input from the plurality of second electronic devices. In one embodiment, a projector augmentation can include questions for audience members, wherein answers to the questions can be input to at least one of the plurality of second electronic devices. The answers can be input as audio data, image data, text data, and/or through interactions with the electronic device, e.g., clicking on a response. The interactions and inputs with the projector layer are then displayed on the presenter layer. In one embodiment, data can be communicated between layers via a networked device 750, e.g., a server. For example, a response to a question displayed as an augmentation on a projector layer on an electronic device (e.g., a second client/user device 702) is stored in a server. The networked device 750 then communicates the response to the presenter device (e.g., a first device 701) to be displayed as digital content on a presenter layer. In another example, the presenter augmentations can be based on audience sentiment data. There is a variety of data that can be used to determine audience sentiment, including, but not limited to, image and/or audio data (e.g., facial expressions, body language, spoken reactions), social media data, and device interactions (e.g., volume adjustments, clicks). Projector augmentations can also include questions about audience sentiment and interest. In one embodiment, the server aggregates, compiles, and/or analyzes the audience sentiment data to create an object for presenter augmentation. In one embodiment, the processor circuitry on a presenter device is configured to aggregate, compile, and/or analyze the audience sentiment data from a plurality of second electronic devices.

In one embodiment, presenter augmentations and the presenter layer can be viewed on a plurality of presenter devices. Each of the plurality of presenter devices is also configured to create and/or edit the presenter augmentations. Sharing the presenter augmentations across a plurality of devices is useful for joint presentations or to divide responsibilities during a live session. In one embodiment, an electronic device is identified and distinguished as a presenter device via a user profile associated with the electronic device. In one embodiment, a networked device 750 grants access to a set of user profiles to view, create, and/or edit the presenter augmentations. Each user profile is then verified against the set of user profiles. In one embodiment, an electronic device can be granted access to the presenter augmentations via an access code. In one embodiment, biometric identification can be used to determine whether an electronic device can access the presenter augmentations. In a non-limiting example, a presenter layer can be used as a communication channel between the plurality of presenter devices. A live chat function is displayed as digital content in a presenter augmentation, and each of the plurality of electronic devices accessing the presenter augmentation can send and receive text data through the live chat. Video, image, and audio data are also compatible as means of communication enabled by presenter augmentations. In one embodiment, each of the plurality of presenter devices is configured to display a different presenter augmentation upon identifying a single reference patch. For example, presenter augmentations in different languages are provided to presenter devices based on the respective locations of the presenter devices, as described previously in the present disclosure.

Figure 8A:
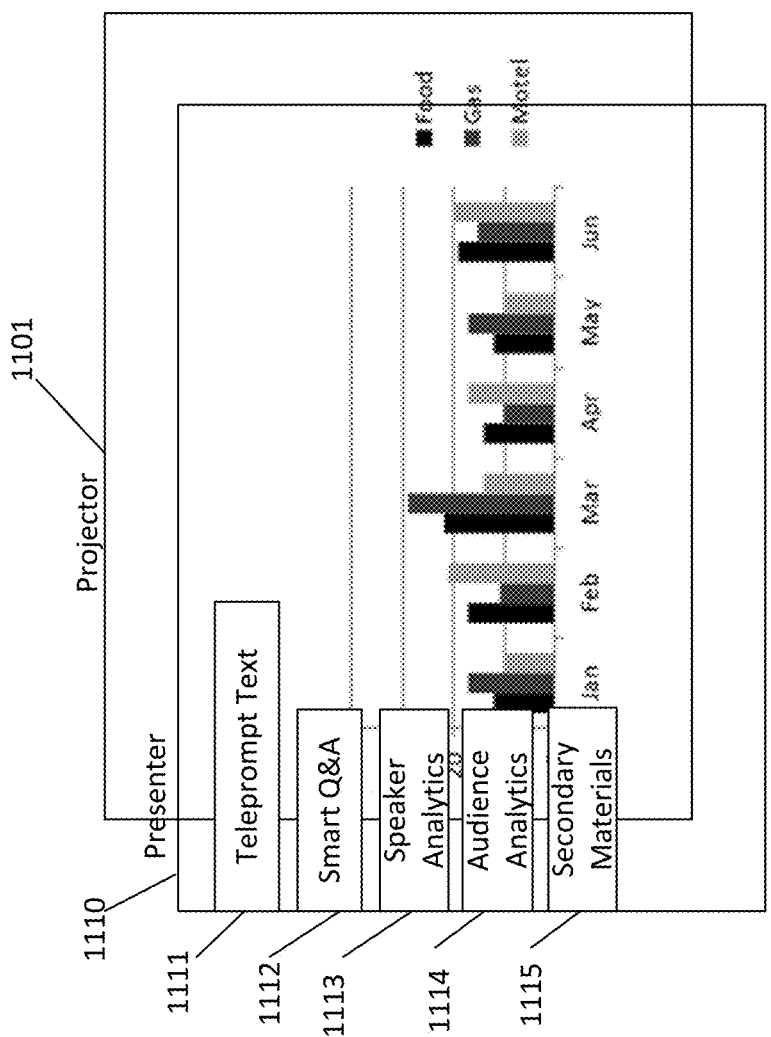
FIG. 8A is an illustration of an exemplary user experience of a dynamic overlay, according to an embodiment of the present disclosure.

FIG. 8A shows an exemplary embodiment of augmented digital content generated by an electronic device, e.g., a first device 701 or method of the present disclosure. Layer 1101 comprises displayed data that is displayed on at least one second electronic device, including a projector layer. For example, layer 1101 includes displayed data from a presentation. In one embodiment, a presenter device (e.g., the first device 701) streams the presentation to the at least one second electronic device (e.g., the second client/user device 702). Layer 1110 is a presenter layer, which is an overlay comprising one or more dynamic digital content tabs 1111, 1112, 1113, 1114, and 1115. Layer 1110 is only visible on the presenter device, while layer 1101 is visible on both the presenter device and the at least one second electronic device. In one embodiment, layer 1110 is located on top of layer 1101. In one embodiment, layer 1110 is located below layer 1101.

Figure 8B:
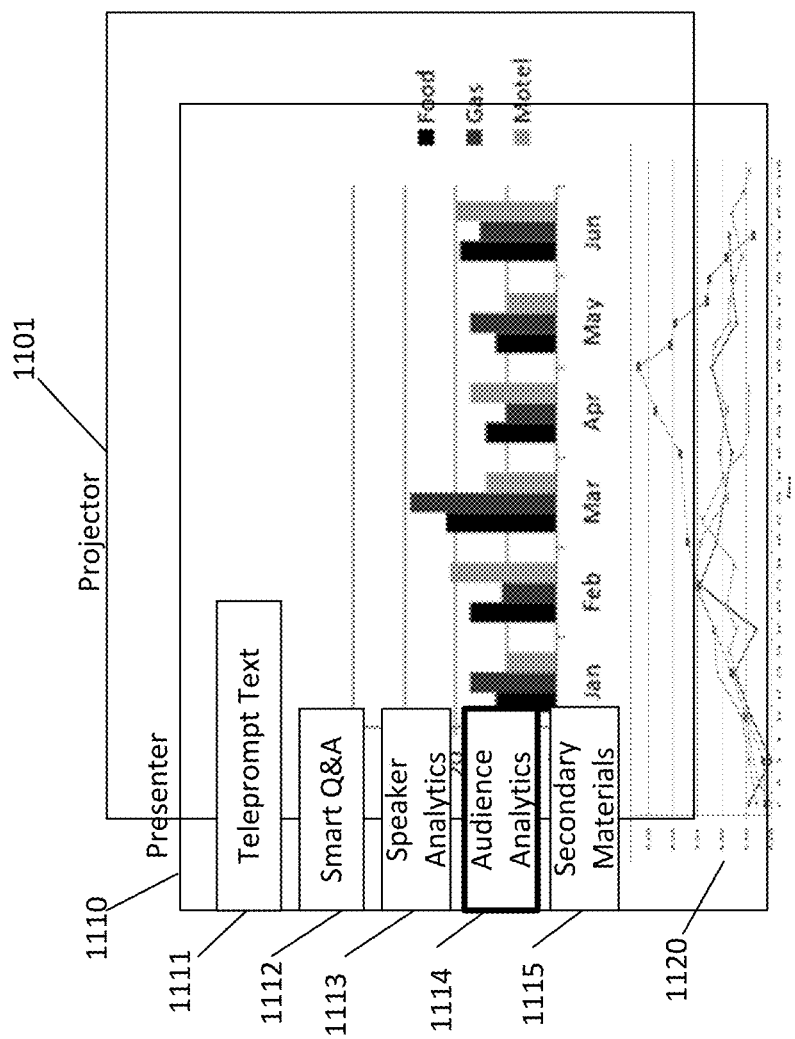
FIG. 8B is an illustration of an exemplary user experience of a dynamic overlay, according to an embodiment of the present disclosure.

FIG. 8B illustrates an example embodiment wherein dynamic content tab 1114 is selected, resulting in additional digital content 1120 being added to the presenter layer 1110. In one embodiment, the digital content 1120 is added to the presenter layer 1110 in a place where there is empty space in layer 1101 (e.g., no text and/or images) so as not to obscure the displayed data in layer 1101. In one embodiment, the empty space is determined by memory inspection (e.g., RAM inspection, frame buffer inspection). In one embodiment, the empty space is determined using computer vision. In one embodiment, the digital content 1120 can be stored on the networked device 750. When the dynamic content tab 1114 is selected, the presenter device 701 retrieves the digital content 1120 from the networked device 750 to display in the presenter layer 1110.

Figure 8C:
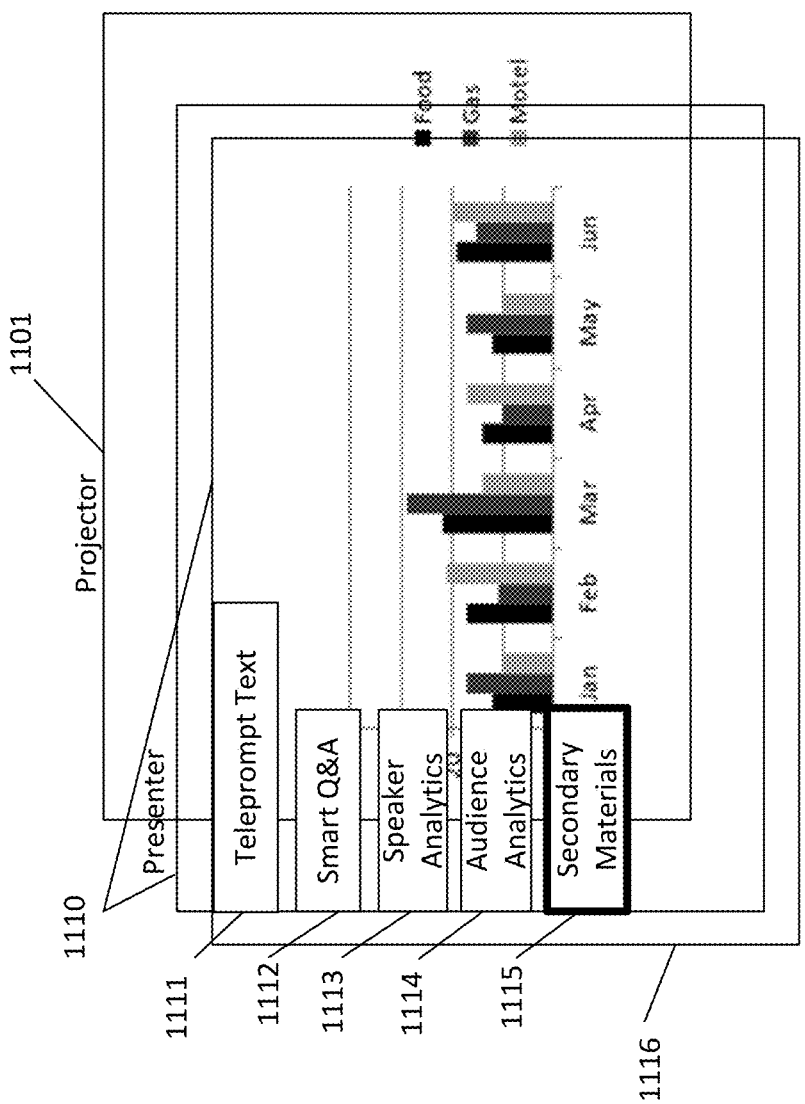
FIG. 8C is an illustration of an exemplary user experience of a dynamic overlay, according to an embodiment of the present disclosure.

FIG. 8C illustrates an example embodiment wherein dynamic content tab 1115 is selected, resulting in an additional augmentation layer 1116, wherein the additional augmentation layer 1116 includes digital content. The augmentation layer 1116 can only be visible on the presenter device. In one embodiment, the digital content and the original displayed data of layer 1101 are both visible on the presenter device. In one embodiment, the augmentation layer 1116 is displayed in front of layer 1101 such that overlapping digital content obscures the displayed data of layer 1101. In one embodiment, augmentation layer 1116 is displayed behind layer 1101 such that overlapping digital content is obscured (i.e., not visible) by the displayed data of layer 1101. The augmentation layer 1116 can also be displayed in front of or behind the presenter layer 1110. In one embodiment, the augmentation layer 1116 is merged with the presenter layer 1110.

Figure 8D:
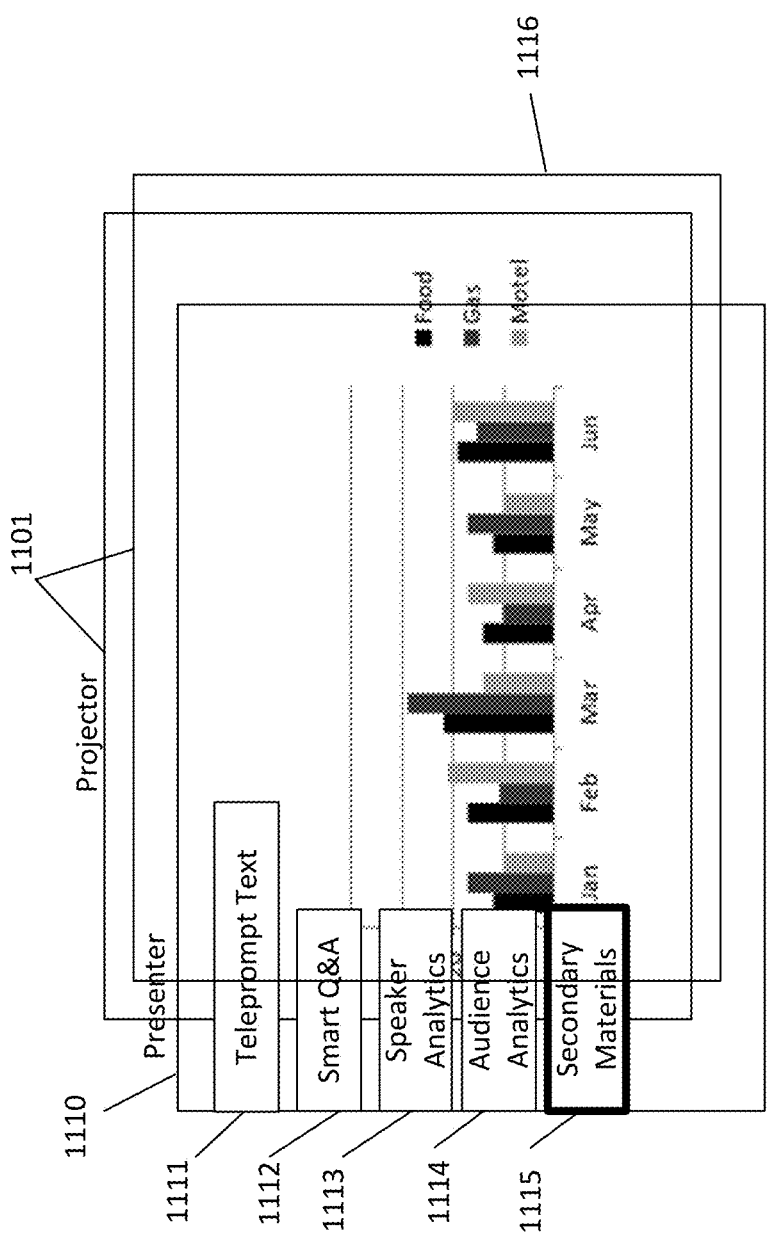
FIG. 8D is an illustration of an exemplary user experience of a dynamic overlay, according to an embodiment of the present disclosure.

FIG. 8D illustrates an example embodiment wherein the augmentation layer 1116 is made available to the at least one second electronic device. In one embodiment, the at least one second electronic device is able to access the augmentation layer 1116 from the networked device 750 and display the digital content. In one embodiment, a portion of the digital content is displayed on the at least one second electronic device. The presenter device is configured to select the portion of the digital content that is visible on the at least one second electronic device, e.g., by transporting the portion to the at least one second electronic device. In one embodiment, the presenter device is configured to remove a digital object from a presenter layer 1110 and insert the digital object into another layer. In one embodiment, the presenter device can change the visibility and/or the layer location of digital content by modifying a frame buffer. In one embodiment, the presenter device can modify the frame buffer by changing pixel values in the frame buffer. In one embodiment, the at least one second electronic device merges and displays the digital content as part of layer 1101. In one embodiment, the at least one second electronic device displays the digital content as the additional augmentation layer 1116. In one embodiment, the digital content of the augmentation layer 1116 is stored locally on the at least one second electronic device. The ability to move digital content between layers is useful for sharing digital content between a presenter device and a second electronic device while maintaining separate displays. As when in the presenter layer 1110, the augmentation layer 1116 can be displayed in front of or behind layer 1101.

Figure 9:
FIG. 9 is a flowchart of a method, according to an exemplary embodiment of the present disclosure.

FIG. 9 is a flowchart outlining a method 900 for a plurality of second electronic devices displaying digital content based on a reference patch according to one embodiment of the present disclosure.

Step 901 of method 900 is displaying, by a plurality of second electronic devices, displayed data transmitted from a first electronic device over a communication network.

Step 903 of method 900 is analyzing/observing, by the plurality of second electronic devices, a frame representing a section of a stream of displayed data that is being displayed by said each second electronic devices. In an example, the observation may be performed within a frame buffer of processing circuitry of each second electronic device.

Step 905 of method 900 is identifying, by the plurality of second electronic devices, a reference patch within a frame of the displayed data. Each of the plurality of second electronic devices is configured to identify a reference patch within a frame of the displayed data using, by way of example and not by limitation, the methods described in FIGS. 3A-3C and FIGS. 4A-4C, respectively.

Step 906 of method 900 is retrieving, by at least one of the plurality of second electronic devices, secondary digital content associated with the reference patch and a device parameter of each respective device of the plurality of second electronic devices. In other words, each reference patch can have a unique identifier that, upon being identified at step 905 of method 900, can be used to obtain secondary digital content for overlaying on a display of a device. Furthermore, each device can have a unique device parameter that can allow customization of the retrieved secondary digital content. As previously discussed, different rendering instructions for generating different sets of objects can be obtained depending on various parameters, such as user preferences.

Step 907 of method 900 is overlaying, by the at least one of the plurality of second electronic devices, objects associated with the reference patch within a transparent layer of a display based on the instructions, the transparent layer of the display overlaying native layers of the display configured to display the displayed data.

Step 909 of method 900 is displaying updated objects associated with the reference patch within the transparent layer of the display based on interactions of a user with the objects. In other embodiments, step 909 is optional. In one embodiment, the objects associated with the reference patch are different for each of the plurality of second electronic devices.

Step 911 of method 900 is ceasing the displaying of the objects associated with the reference patch within the transparent layer of the display when the reference patch is not identified within the frame of the displayed data. In one embodiment, if step 909 is not performed, step 911 is performed after step 907. In an embodiment, step 911 is optional.

Embodiments of the subject matter and the functional operations described in this specification can be implemented by digital electronic circuitry, in tangibly embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory program carrier for execution by, or to control the operation of data processing apparatus. The computer storage medium can be a machine-readable storage device, a machine-readable storage substrate, a random or serial access memory device, or a combination of one or more of them.

The term "data processing apparatus" refers to data processing hardware and may encompass all kinds of apparatus, devices, and machines for processing data, including by way of example a programmable processor, a computer, or multiple processors or computers. The apparatus can also be or further include special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, Subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA an ASIC.

Computers suitable for the execution of a computer program include, by way of example, general or special purpose microprocessors or both, or any other kind of central processing unit. Generally, a CPU will receive instructions and data from a read-only memory or a random access memory or both. Elements of a computer are a CPU for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few. Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more Such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients (user devices) and servers. A client and server are generally remote from each other and typically interact through a communication network. The relationship of client and server arises by virtue of computer programs running on the respective computers and having a client-server relationship to each other. In an embodiment, a server transmits data, e.g., an HTML page, to a user device, e.g., for purposes of displaying data to and receiving user input from a user interacting with the user device, which acts as a client. Data generated at the user device, e.g., as a result of the user interaction, can be received from the user device at the server.

Electronic user device 20 shown in FIG. 10 can be an example of one or more of the devices shown in FIG. 1. In an embodiment, the electronic user device 20 may be a smartphone. However, the skilled artisan will appreciate that the features described herein may be adapted to be implemented on other devices (e.g., a laptop, a tablet, a server, an e-reader, a camera, a navigation device, etc.). The exemplary user device 20 of FIG. 10 includes processing circuitry, as discussed above. The processing circuitry includes one or more of the elements discussed next with reference to FIG. 10. The electronic user device 20 may include other components not explicitly illustrated in FIG. 10 such as a CPU, GPU, frame buffer, etc. The electronic user device 20 includes a controller 410 and a wireless communication processor 402 connected to an antenna 401. A speaker 404 and a microphone 405 are connected to a voice processor 403.

The controller 410 may include one or more processors/processing circuitry (CPU, GPU, or other circuitry) and may control each element in the user device 20 to perform functions related to communication control, audio signal processing, graphics processing, control for the audio signal processing, still and moving image processing and control, and other kinds of signal processing. The controller 410 may perform these functions by executing instructions stored in a memory 450. Alternatively or in addition to the local storage of the memory 450, the functions may be executed using instructions stored on an external device accessed on a network or on a non-transitory computer readable medium.

The memory 450 includes but is not limited to Read Only Memory (ROM), Random Access Memory (RAM), or a memory array including a combination of volatile and non-volatile memory units. The memory 450 may be utilized as working memory by the controller 410 while executing the processes and algorithms of the present disclosure. Additionally, the memory 450 may be used for long-term storage, e.g., of image data and information related thereto.

The user device 20 includes a control line CL and data line DL as internal communication bus lines. Control data to/from the controller 410 may be transmitted through the control line CL. The data line DL may be used for transmission of voice data, displayed data, etc.

The antenna 401 transmits/receives electromagnetic wave signals between base stations for performing radio-based communication, such as the various forms of cellular telephone communication. The wireless communication processor 402 controls the communication performed between the user device 20 and other external devices via the antenna 401. For example, the wireless communication processor 402 may control communication between base stations for cellular phone communication.

The speaker 404 emits an audio signal corresponding to audio data supplied from the voice processor 403. The microphone 405 detects surrounding audio and converts the detected audio into an audio signal. The audio signal may then be output to the voice processor 403 for further processing. The voice processor 403 demodulates and/or decodes the audio data read from the memory 450 or audio data received by the wireless communication processor 402 and/or a short-distance wireless communication processor 407. Additionally, the voice processor 403 may decode audio signals obtained by the microphone 405.

The exemplary user device 20 may also include a display 420, a touch panel 430, an operation key 440, and a short-distance communication processor 407 connected to an antenna 406. The display 420 may be a Liquid Crystal Display (LCD), an organic electroluminescence display panel, or another display screen technology. In addition to displaying still and moving image data, the display 420 may display operational inputs, such as numbers or icons which may be used for control of the user device 20. The display 420 may additionally display a GUI for a user to control aspects of the user device 20 and/or other devices. Further, the display 420 may display characters and images received by the user device 20 and/or stored in the memory 450 or accessed from an external device on a network. For example, the user device 20 may access a network such as the Internet and display text and/or images transmitted from a Web server.

The touch panel 430 may include a physical touch panel display screen and a touch panel driver. The touch panel 430 may include one or more touch sensors for detecting an input operation on an operation surface of the touch panel display screen. The touch panel 430 also detects a touch shape and a touch area. Used herein, the phrase "touch operation" refers to an input operation performed by touching an operation surface of the touch panel display with an instruction object, such as a finger, thumb, or stylus-type instrument. In the case where a stylus or the like is used in a touch operation, the stylus may include a conductive material at least at the tip of the stylus such that the sensors included in the touch panel 430 may detect when the stylus approaches/contacts the operation surface of the touch panel display (similar to the case in which a finger is used for the touch operation).

In certain aspects of the present disclosure, the touch panel 430 may be disposed adjacent to the display 420 (e.g., laminated) or may be formed integrally with the display 420. For simplicity, the present disclosure assumes the touch panel 430 is formed integrally with the display 420 and therefore, examples discussed herein may describe touch operations being performed on the surface of the display 420 rather than the touch panel 430. However, the skilled artisan will appreciate that this is not limiting.

For simplicity, the present disclosure assumes the touch panel 430 is a capacitance-type touch panel technology. However, it should be appreciated that aspects of the present disclosure may easily be applied to other touch panel types (e.g., resistance-type touch panels) with alternate structures.

In certain aspects of the present disclosure, the touch panel 430 may include transparent electrode touch sensors arranged in the X-Y direction on the surface of transparent sensor glass.

The touch panel driver may be included in the touch panel 430 for control processing related to the touch panel 430, such as scanning control. For example, the touch panel driver may scan each sensor in an electrostatic capacitance transparent electrode pattern in the X-direction and Y-direction and detect the electrostatic capacitance value of each sensor to determine when a touch operation is performed. The touch panel driver may output a coordinate and corresponding electrostatic capacitance value for each sensor. The touch panel driver may also output a sensor identifier that may be mapped to a coordinate on the touch panel display screen. Additionally, the touch panel driver and touch panel sensors may detect when an instruction object, such as a finger is within a predetermined distance from an operation surface of the touch panel display screen. That is, the instruction object does not necessarily need to directly contact the operation surface of the touch panel display screen for touch sensors to detect the instruction object and perform processing described herein. For example, in an embodiment, the touch panel 430 may detect a position of a user's finger around an edge of the display panel 420 (e.g., gripping a protective case that surrounds the display/touch panel). Signals may be transmitted by the touch panel driver, e.g. in response to a detection of a touch operation, in response to a query from another element based on timed data exchange, etc.

The touch panel 430 and the display 420 may be surrounded by a protective casing, which may also enclose the other elements included in the user device 20. In an embodiment, a position of the user's fingers on the protective casing (but not directly on the surface of the display 420) may be detected by the touch panel 430 sensors. Accordingly, the controller 410 may perform display control processing described herein based on the detected position of the user's fingers gripping the casing. For example, an element in an interface may be moved to a new location within the interface (e.g., closer to one or more of the fingers) based on the detected finger position.

Further, in an embodiment, the controller 410 may be configured to detect which hand is holding the user device 20, based on the detected finger position. For example, the touch panel 430 sensors may detect a plurality of fingers on the left side of the user device 20 (e.g., on an edge of the display 420 or on the protective casing), and detect a single finger on the right side of the user device 20. In this exemplary scenario, the controller 410 may determine that the user is holding the user device 20 with his/her right hand because the detected grip pattern corresponds to an expected pattern when the user device 20 is held only with the right hand.

The operation key 440 may include one or more buttons or similar external control elements, which may generate an operation signal based on a detected input by the user. In addition to outputs from the touch panel 430, these operation signals may be supplied to the controller 410 for performing related processing and control. In certain aspects of the present disclosure, the processing and/or functions associated with external buttons and the like may be performed by the controller 410 in response to an input operation on the touch panel 430 display screen rather than the external button, key, etc. In this way, external buttons on the user device 20 may be eliminated in lieu of performing inputs via touch operations, thereby improving watertightness.

The antenna 406 may transmit/receive electromagnetic wave signals to/from other external apparatuses, and the short-distance wireless communication processor 407 may control the wireless communication performed between the other external apparatuses. Bluetooth, IEEE 802.11, and near-field communication (NFC) are non-limiting examples of wireless communication protocols that may be used for inter-device communication via the short-distance wireless communication processor 407.

The user device 20 may include a motion sensor 408. The motion sensor 408 may detect features of motion (i.e., one or more movements) of the user device 20. For example, the motion sensor 408 may include an accelerometer to detect acceleration, a gyroscope to detect angular velocity, a geomagnetic sensor to detect direction, a geo-location sensor to detect location, etc., or a combination thereof to detect motion of the user device 20. In an embodiment, the motion sensor 408 may generate a detection signal that includes data representing the detected motion. For example, the motion sensor 408 may determine a number of distinct movements in a motion (e.g., from start of the series of movements to the stop, within a predetermined time interval, etc.), a number of physical shocks on the user device 20 (e.g., a jarring, hitting, etc., of the electronic device), a speed and/or acceleration of the motion (instantaneous and/or temporal), or other motion features. The detected motion features may be included in the generated detection signal. The detection signal may be transmitted, e.g., to the controller 410, whereby further processing may be performed based on data included in the detection signal. The motion sensor 408 can work in conjunction with a Global Positioning System (GPS) section 460. The information of the present position detected by the GPS section 460 is transmitted to the controller 410. An antenna 461 is connected to the GPS section 460 for receiving and transmitting signals to and from a GPS satellite.

The user device 20 may include a camera section 409, which includes a lens and shutter for capturing photographs of the surroundings around the user device 20. In an embodiment, the camera section 409 captures surroundings of an opposite side of the user device 20 from the user. The images of the captured photographs can be displayed on the display panel 420. A memory section saves the captured photographs. The memory section may reside within the camera section 109 or it may be part of the memory 450. The camera section 409 can be a separate feature attached to the user device 20 or it can be a built-in camera feature.

An example of a type of computer is shown in FIG. 11. The computer 500 can be used for the operations described in association with any of the computer-implement methods described previously, according to one implementation. For example, the computer 500 can be an example of devices 701, 702, 70n, 7001, or a server (such as networked device 750). The computer 700 includes processing circuitry, as discussed above. The networked device 750 may include other components not explicitly illustrated in FIG. 11 such as a CPU, GPU, frame buffer, etc. The processing circuitry includes one or more of the elements discussed next with reference to FIG. 11. In FIG. 11, the computer 500 includes a processor 510, a memory 520, a storage device 530, and an input/output device 540. Each of the components 510, 520, 530, and 540 are interconnected using a system bus 550. The processor 510 is capable of processing instructions for execution within the system 500. In one implementation, the processor 510 is a single-threaded processor. In another implementation, the processor 510 is a multi-threaded processor. The processor 510 is capable of processing instructions stored in the memory 520 or on the storage device 530 to display graphical information for a user interface on the input/output device 540.

The memory 520 stores information within the computer 500. In one implementation, the memory 520 is a computer-readable medium. In one implementation, the memory 520 is a volatile memory unit. In another implementation, the memory 520 is a non-volatile memory unit.

The storage device 530 is capable of providing mass storage for the computer 500. In one implementation, the storage device 530 is a computer-readable medium. In various different implementations, the storage device 530 may be a floppy disk device, a hard disk device, an optical disk device, or a tape device.

The input/output device 540 provides input/output operations for the computer 500. In one implementation, the input/output device 540 includes a keyboard and/or pointing device. In another implementation, the input/output device 540 includes a display unit for displaying graphical user interfaces.

Next, a hardware description of a device 601 according to exemplary embodiments is described with reference to FIG. 12. In FIG. 12, the device 601, which can be the above described devices of FIG. 1, includes processing circuitry, as discussed above. The processing circuitry includes one or more of the elements discussed next with reference to FIG. 12. The device 701, may include other components not explicitly illustrated in FIG. 12 such as a CPU, GPU, frame buffer, etc. In FIG. 12, the device 701 includes a CPU 600 which performs the processes described above/below. The process data and instructions may be stored in memory 602. These processes and instructions may also be stored on a storage medium disk 604 such as a hard drive (HDD) or portable storage medium or may be stored remotely. Further, the claimed advancements are not limited by the form of the computer-readable media on which the instructions of the inventive process are stored. For example, the instructions may be stored on CDs, DVDs, in FLASH memory, RAM, ROM, PROM, EPROM, EEPROM, hard disk or any other information processing device with which the device 601 communicates, such as a server or computer.

Further, the claimed advancements may be provided as a utility application, background daemon, or component of an operating system, or combination thereof, executing in conjunction with CPU 600 and an operating system such as Microsoft Windows, UNIX, Solaris, LINUX, Apple MAC-OS and other systems known to those skilled in the art.

The hardware elements in order to achieve the device 601 may be realized by various circuitry elements, known to those skilled in the art. For example, CPU 600 may be a Xenon or Core processor from Intel of America or an Opteron processor from AMD of America, or may be other processor types that would be recognized by one of ordinary skill in the art. Alternatively, the CPU 600 may be implemented on an FPGA, ASIC, PLD or using discrete logic circuits, as one of ordinary skill in the art would recognize. Further, CPU 600 may be implemented as multiple processors cooperatively working in parallel to perform the instructions of the processes described above. CPU 600 can be an example of the CPU illustrated in each of the devices of FIG. 1.

The device 601 in FIG. 12 also includes a network controller 606, such as an Intel Ethernet PRO network interface card from Intel Corporation of America, for interfacing with network 650 (also shown in FIG. 1), and to communicate with the other devices of FIG. 1. As can be appreciated, the network 650 can be a public network, such as the Internet, or a private network such as an LAN or WAN network, or any combination thereof and can also include PSTN or ISDN sub-networks. The network 650 can also be wired, such as an Ethernet network, or can be wireless such as a cellular network including EDGE, 3G, 4G and 5G wireless cellular systems. The wireless network can also be WiFi, Bluetooth, or any other wireless form of communication that is known.

The device 601 further includes a display controller 608, such as a NVIDIA GeForce GTX or Quadro graphics adaptor from NVIDIA Corporation of America for interfacing with display 610, such as an LCD monitor. A general purpose I/O interface 612 interfaces with a keyboard and/or mouse 614 as well as a touch screen panel 616 on or separate from display 610. General purpose I/O interface also connects to a variety of peripherals 618 including printers and scanners.

A sound controller 620 is also provided in the device 601 to interface with speakers/microphone 622 thereby providing sounds and/or music.

The general purpose storage controller 624 connects the storage medium disk 604 with communication bus 626, which may be an ISA, EISA, VESA, PCI, or similar, for interconnecting all of the components of the device 601. A description of the general features and functionality of the display 610, keyboard and/or mouse 614, as well as the display controller 608, storage controller 624, network controller 606, sound controller 620, and general purpose I/O interface 612 is omitted herein for brevity as these features are known.

Figure 13:
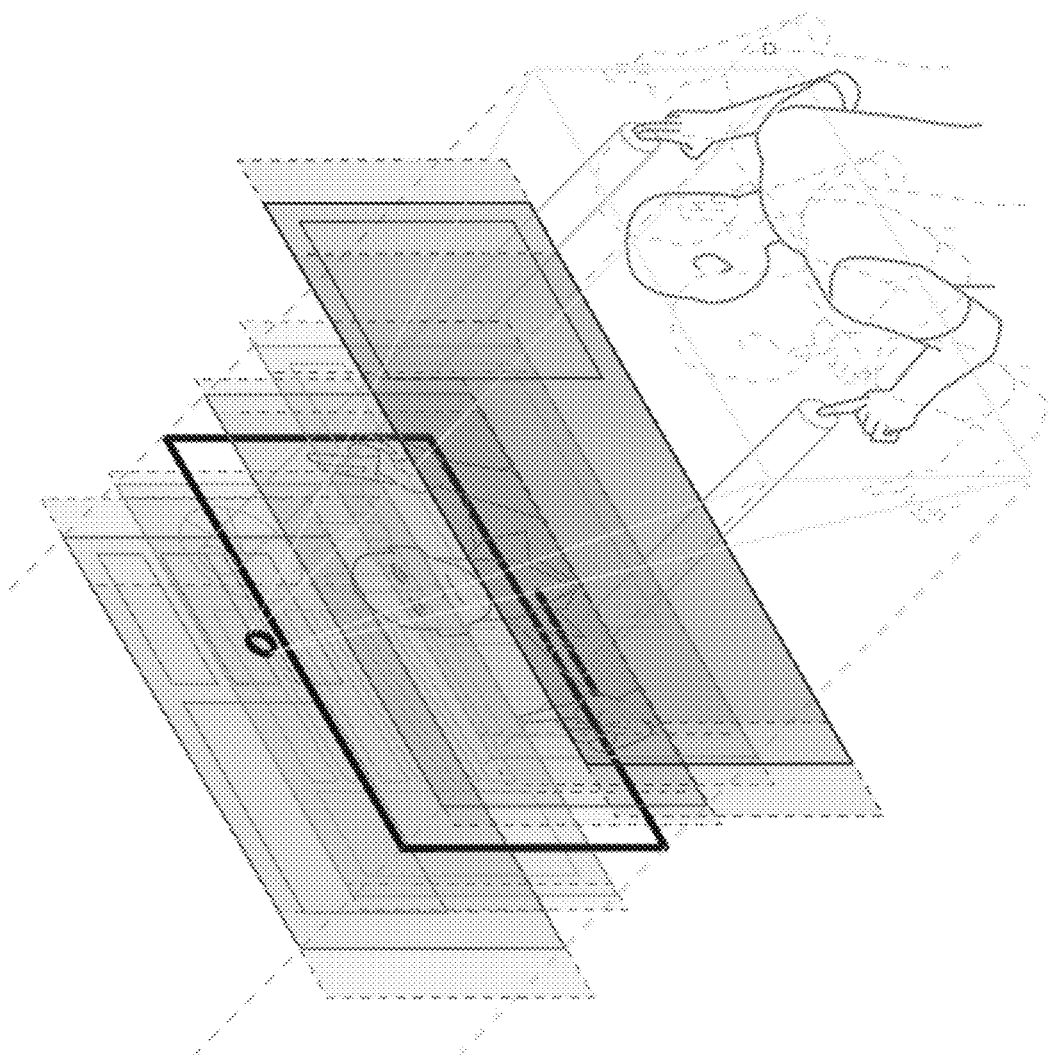
FIG. 13 is an example of Transparent Computing.

As shown in FIG. 13, in some embodiments, one or more of the disclosed functions and capabilities may be used to enable a volumetric composite of content-activated layers of Transparent Computing, content-agnostic layers of Transparent Computing and/or camera-captured layers of Transparent Computing placed visibly behind 2-dimensional or 3-dimensional content displayed on screens, placed in front of 2-dimensional or 3-dimensional content displayed on screens, placed inside of 3-dimensional content displayed on screens and/or placed virtually outside of the display of screens. Users can interact via Touchless Computing with any layer in a volumetric composite of layers of Transparent Computing wherein a user's gaze, gestures, movements, position, orientation, or other characteristics observed by a camera are used as the basis for selecting and interacting with objects in any layer in the volumetric composite of layers of Transparent Computing to execute processes on computing devices.

In some embodiments, one or more of the disclosed functions and capabilities may be used to enable users to see a volumetric composite of layers of Transparent Computing from a 360-degree Optical Lenticular Perspective wherein a user's gaze, gestures, movements, position, orientation, or other characteristics observed by cameras are a basis to calculate, derive and/or predict the 360-degree Optical Lenticular Perspective from which users see the volumetric composite of layers of Transparent Computing displayed on screens. Further, users can engage with a 3-dimensional virtual environment displayed on screens consisting of layers of Transparent Computing placed behind the 3-dimensional virtual environment displayed on screens, placed in front of a 3-dimensional virtual environment displayed on screens, and/or placed inside of the a 3-dimensional virtual environment displayed on screens wherein users can select and interact with objects in any layer of Transparent Computing to execute processes on computing devices while looking at the combination of the 3-dimensional virtual environment and the volumetric composite of layers of Transparent Computing from any angle of the 360-degree Optical Lenticular Perspective available to users.

Obviously, numerous modifications and variations are possible in light of the above teachings. It is therefore to be understood that within the scope of the appended claims, embodiments of the present disclosure may be practiced otherwise than as specifically described herein.

Embodiments of the present disclosure may also be as set forth in the following parentheticals.

In an embodiment, a device communicating with a remote device over a data communication network includes: processing circuitry, including a graphics processing unit (GPU), configured to access a frame buffer of the GPU, analyze, in the frame buffer of the GPU, a frame representing a section of a stream of displayed data that is being displayed by the device, based on the analyzed frame, identify a reference patch that includes a unique identifier associated with secondary digital content that is insertable in the displayed data that is being displayed by the device, the unique identifier including encoded data that identifies the secondary digital content, a location address of the secondary digital content at the remote device, and display parameters of the secondary digital content when inserted in the displayed data; retrieve the secondary digital content from the remote device via the data communication network based on the unique identifier and a device parameter of the device, the secondary digital content being customized to the device based on the unique identifier and the device parameter of the device, the device parameter of the device being different from a device parameter of another device that also receives a reference patch; and after retrieving the secondary digital content from the remote device, overlay the secondary digital content into the displayed data in accordance with display parameters of the customized secondary digital content.

In an embodiment, the reference patch received by the device is a same reference patch as the reference patch received by the another device.

In an embodiment, the device parameter of the device includes a device location, a device type, an internet protocol (IP) address, a security protocol, or a user preference.

In an embodiment, the processing circuitry is further configured to update the secondary digital content based on an input received at the device.

In an embodiment, the processing circuitry is further configured to decode the encoded data using a key of the device based on the device parameter of the device, the key of the device being different from a key of the another device.

In an embodiment, the processing circuitry is further configured to overlay the secondary digital content into the displayed data by overlaying the secondary digital content into the displayed data in accordance with the display parameters of the customized secondary digital content and a user preference of the device, the user preference of the device being different from a user preference of the another device.

In an embodiment, a portion of the retrieved secondary digital content is overlayed into the displayed data, the portion of retrieved secondary digital content being based on the user preference of the device.

A method of communicating with a remote device over a data communication network includes: accessing a frame buffer of a graphics processing unit (GPU); analyzing, in the frame buffer of the GPU, a frame representing a section of a stream of displayed data that is being displayed by a first device; based on the analyzed frame, identifying a reference patch that includes a unique identifier associated with secondary digital content that is insertable in the displayed data that is being displayed by the first device, the unique identifier including encoded data that identifies the secondary digital content, a location address of the secondary digital content at the remote device, and display parameters of the secondary digital content when inserted in the displayed data; retrieving the secondary digital content from the remote device via the data communication network based on the unique identifier and a device parameter of the first device, the secondary digital content being customized to the first device based on the unique identifier and the device parameter of the first device, the device parameter of the first device being different from a device parameter of a second device that also receives a reference patch; and after retrieving the secondary digital content from the remote device, overlaying the secondary digital content into the displayed data in accordance with the display parameters of the customized secondary digital content.

In an embodiment, the reference patch received by the first device is a same as the reference patch received by the second device.

In an embodiment, the device parameter of the first device includes a device location, a device type, an internet protocol (IP) address, a security protocol, or a user preference.

In an embodiment, the method further comprises updating the secondary digital content based on an input received at the first device.

In an embodiment, the method further comprises decoding the encoded data using a key of the first device based on the device parameter of the first device, the key of the first device being different from a key of the second device.

In an embodiment, the overlaying the secondary digital content into the displayed data further comprises overlaying the secondary digital content into the displayed data in accordance with the display parameters of the customized secondary digital content and a user preference of the first device, the user preference of the first device being different from a user preference of the second device.

In an embodiment, a portion of the retrieved secondary digital content is overlayed into the displayed data, the portion of retrieved secondary digital content being based on the user preference of the first device.

A non-transitory computer-readable storage medium for storing computer-readable instructions that, when executed by a computer, causes the computer to perform a method, the method including: accessing a frame buffer of a graphics processing unit (GPU); analyzing, in the frame buffer of the GPU, a frame representing a section of a stream of displayed data that is being displayed by a first device; based on the analyzed frame, identifying a reference patch that includes a unique identifier associated with secondary digital content that is insertable in the displayed data that is being displayed by the first device, the unique identifier including encoded data that identifies the secondary digital content, a location address of the secondary digital content at a remote device, and display parameters of the secondary digital content when inserted in the displayed data; retrieving the secondary digital content from the remote device via a data communication network based on the unique identifier and a device parameter of the first device, the secondary digital content being customized to the first device based on the unique identifier and the device parameter of the first device, the device parameter of the first device being different from a device parameter of a second device that also receives a reference patch; and after retrieving the secondary digital content from the remote device, overlaying the secondary digital content into the displayed data in accordance with the display parameters of the customized secondary digital content.

In an embodiment, the reference patch received by the first device is a same reference patch as the reference patch received by the second device.

In an embodiment, the device parameter of the first device includes a device location, a device type, an internet protocol (IP) address, a security protocol, or a user preference.

In an embodiment, the method further comprising updating the secondary digital content based on an input received at the first device.

In an embodiment, the method further comprising decoding the encoded data using a key of the first device based on the device parameter of the first device, the key of the first device being different from a key of the second device.

In an embodiment, the overlaying the secondary digital content into the displayed data further comprises overlaying the secondary digital content into the displayed data in accordance with the display parameters of the customized secondary digital content and a user preference of the first device, the user preference of the first device being different from a user preference of the second device.

While this specification contains many specific implementation details, these should not be construed as limitations on the scope of what may be claimed, but rather as descriptions of features that may be specific to particular embodiments.

Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

Thus, the foregoing discussion discloses and describes merely exemplary embodiments of the present disclosure. As will be understood by those skilled in the art, the present disclosure may be embodied in other specific forms without departing from the spirit thereof. Accordingly, the disclosure of the present disclosure is intended to be illustrative, but not limiting of the scope of the disclosure, as well as other claims. The disclosure, including any readily discernible variants of the teachings herein, defines, in part, the scope of the foregoing claim terminology such that no inventive subject matter is dedicated to the public.

The invention claimed is:

1. A device communicating with a remote device over a data communication network, the device comprising:
   processing circuitry, including a graphics processing unit (GPU), configured to
      access a frame buffer of the GPU,
      analyze, in the frame buffer of the GPU, a frame representing a section of a stream of displayed data that is being displayed by the device,
      based on the analyzed frame, identify a reference patch in the frame buffer that includes a unique identifier associated with secondary digital content that is insertable in the displayed data that is being displayed by the device, the unique identifier including encoded data that identifies the secondary digital content, a location address of the secondary digital content at the remote device, a size of the secondary digital content when inserted in the displayed data, and display parameters of the secondary digital content when inserted in the displayed data;
      retrieve the secondary digital content from the remote device via the data communication network based on the unique identifier and a device parameter of the device, the secondary digital content being customized to the device based on the unique identifier and the device parameter of the device such that the secondary digital content is different among different devices, the device parameter of the device being different from a device parameter of another device that also receives a reference patch; and
      after retrieving the secondary digital content from the remote device, overlay the secondary digital content into the displayed data in accordance with display parameters of the customized secondary digital content, such that the secondary digital content is overlaid onto an object present in a first area of the displayed data, while the reference patch is located in a second area that is different from the first area.

2. The device of claim 1, wherein the reference patch received by the device is a same reference patch as the reference patch received by the another device.

3. The device of claim 1, wherein the device parameter of the device includes a device type, an internet protocol (IP) address, a security protocol, or a user preference.

4. The device of claim 1, wherein the processing circuitry is further configured to update the secondary digital content based on an input received at the device.

5. The device of claim 1, wherein the processing circuitry is further configured to decode the encoded data using a key of the device based on the device parameter of the device, the key of the device being different from a key of the another device.

6. The device of claim 1, wherein the processing circuitry is further configured to overlay the secondary digital content into the displayed data by overlaying the secondary digital content into the displayed data in accordance with the display parameters of the customized secondary digital content and a user preference of the device, the user preference of the device being different from a user preference of the another device.

7. The device of claim 6, wherein a portion of the retrieved secondary digital content is overlaid into the displayed data, the portion of the retrieved secondary digital content being based on the user preference of the device.

8. The device of claim 1, wherein the processing circuitry is configured to identify the reference patch in the frame buffer by processing attributes of each pixel included in the frame representing the section of the stream of the displayed data and detecting groups of pixels within the frame with a predetermined pattern of pixel luma and chroma manipulation.

9. A method of communicating with a remote device over a data communication network, comprising:
   accessing a frame buffer of a graphics processing unit (GPU);
   analyzing, in the frame buffer of the GPU, a frame representing a section of a stream of displayed data that is being displayed by a first device;
   based on the analyzed frame, identifying a reference patch in the frame buffer that includes a unique identifier associated with secondary digital content that is insertable in the displayed data that is being displayed by the first device, the unique identifier including encoded data that identifies the secondary digital content, a location address of the secondary digital content at the remote device, a size of the secondary digital content when inserted in the displayed data, and display parameters of the secondary digital content when inserted in the displayed data;
   retrieving the secondary digital content from the remote device via the data communication network based on the unique identifier and a device parameter of the first device, the secondary digital content being customized to the first device based on the unique identifier and the device parameter of the first device such that the secondary digital content is different among different devices, the device parameter of the first device being different from a device parameter of a second device that also receives a reference patch; and
   after retrieving the secondary digital content from the remote device, overlaying the secondary digital content into the displayed data in accordance with the display parameters of the customized secondary digital content, such that the secondary digital content is overlaid onto an object present in a first area of the displayed data, while the reference patch is located in a second area that is different from the first area.

10. The method of claim 9, wherein the reference patch received by the first device is a same as the reference patch received by the second device.

11. The method of claim 9, wherein the device parameter of the first device includes a device location, a device type, an internet protocol (IP) address, a security protocol, or a user preference.

12. The method of claim 9, further comprising updating the secondary digital content based on an input received at the first device.

13. The method of claim 9, further comprising decoding the encoded data using a key of the first device based on the device parameter of the first device, the key of the first device being different from a key of the second device.

14. The method of claim 9, wherein the overlaying the secondary digital content into the displayed data further comprises overlaying the secondary digital content into the displayed data in accordance with the display parameters of the customized secondary digital content and a user prefer-ence of the first device, the user preference of the first device being different from a user preference of the second device.

15. The method of claim 14, wherein a portion of the retrieved secondary digital content is overlaid into the displayed data, the portion of the retrieved secondary digital content being based on the user preference of the first device.

16. A non-transitory computer-readable storage medium for storing computer-readable instructions that, when executed by a computer, cause the computer to perform a method, the method comprising:
   accessing a frame buffer of a graphics processing unit (GPU);
   analyzing, in the frame buffer of the GPU, a frame representing a section of a stream of displayed data that is being displayed by a first device;
   based on the analyzed frame, identifying a reference patch in the frame buffer that includes a unique identifier associated with secondary digital content that is insertable in the displayed data that is being displayed by the first device, the unique identifier including encoded data that identifies the secondary digital content, a location address of the secondary digital content at a remote device, a size of the secondary digital content when inserted in the displayed data, and display parameters of the secondary digital content when inserted in the displayed data;
   retrieving the secondary digital content from the remote device via a data communication network based on the unique identifier and a device parameter of the first device, the secondary digital content being customized to the first device based on the unique identifier and the device parameter of the first device such that the secondary digital content is different among different devices, the device parameter of the first device being different from a device parameter of a second device that also receives a reference patch; and
   after retrieving the secondary digital content from the remote device, overlaying the secondary digital content into the displayed data in accordance with the display parameters of the customized secondary digital content, such that the secondary digital content is overlaid onto an object present in a first area of the displayed data, while the reference patch is located in a second area that is different from the first area.

17. The non-transitory computer-readable storage medium according to claim 15, wherein the reference patch received by the first device is a same reference patch as the reference patch received by the second device.

18. The non-transitory computer-readable storage medium according to claim 15, wherein the device parameter of the first device includes a device location, a device type, an internet protocol (IP) address, a security protocol, or a user preference.

19. The non-transitory computer-readable storage medium according to claim 15, the method further comprising updating the secondary digital content based on an input received at the first device.

20. The non-transitory computer-readable storage medium according to claim 15, the method further comprising decoding the encoded data using a key of the first device based on the device parameter of the first device, the key of the first device being different from a key of the second device.

21. The non-transitory computer-readable storage medium according to claim 15, wherein the overlaying the secondary digital content into the displayed data further comprises overlaying the secondary digital content into the displayed data in accordance with the display parameters of the customized secondary digital content and a user preference of the first device, the user preference of the first device being different from a user preference of the second device.

* * * * *